(12) United States Patent
Boesel et al.

(10) Patent No.: US 7,406,102 B2
(45) Date of Patent: Jul. 29, 2008

(54) MULTI-MODE METHOD AND APPARATUS FOR PERFORMING DIGITAL MODULATION AND DEMODULATION

(75) Inventors: Robert W. Boesel, San Diego, CA (US); Theodore J. Myers, San Diego, CA (US); Tien Q. Nguyen, San Diego, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 1027 days.

(21) Appl. No.: 10/613,476

(22) Filed: Jul. 2, 2003

(65) Prior Publication Data

US 2004/0071104 A1    Apr. 15, 2004

Related U.S. Application Data

(60) Provisional application No. 60/393,633, filed on Jul. 3, 2002.

(51) Int. Cl.
*H04L 12/28* (2006.01)
(52) U.S. Cl. ............................ 370/505; 370/537
(58) Field of Classification Search ............ 370/503
See application file for complete search history.

(56) References Cited

U.S. PATENT DOCUMENTS

| | | | |
|---|---|---|---|
| 4,347,580 A | 8/1982 | Bond | |
| 4,484,028 A | 11/1984 | Kelley et al. | |
| 4,550,414 A | 10/1985 | Guinon et al. | |
| 4,841,574 A | 6/1989 | Pham et al. | |
| 5,164,959 A | 11/1992 | Cai et al. | |
| 5,838,671 A * | 11/1998 | Ishikawa et al. | 370/335 |
| 5,864,714 A | 1/1999 | Tal et al. | |
| 5,892,980 A | 4/1999 | Tal et al. | |
| 5,963,563 A * | 10/1999 | Tomikura et al. | 370/486 |
| 6,115,728 A | 9/2000 | Nakai et al. | |
| 6,122,444 A | 9/2000 | Shen et al. | |
| 6,167,062 A * | 12/2000 | Hershey et al. | 370/503 |
| 6,577,649 B1 * | 6/2003 | Leibowitz et al. | 370/503 |
| 6,615,307 B1 | 9/2003 | Roohparvar | |
| 6,650,140 B2 | 11/2003 | Lee et al. | |
| 6,714,527 B2 | 3/2004 | Kim et al. | |
| 6,721,295 B1 | 4/2004 | Brown | |
| 6,795,489 B2 | 9/2004 | Joshi et al. | |
| 6,853,839 B2 | 2/2005 | Usuda et al. | |
| 6,985,516 B1 | 1/2006 | Easton et al. | |
| 2001/0002199 A1 * | 5/2001 | Hershey et al. | 370/505 |
| 2001/0038633 A1 | 11/2001 | Robertson et al. | |
| 2002/0094017 A1 | 7/2002 | Wang | |
| 2002/0176489 A1 | 11/2002 | Sriram et al. | |
| 2003/0099210 A1 * | 5/2003 | O'Toole et al. | 370/311 |
| 2003/0147365 A1 | 8/2003 | Terasawa et al. | |
| 2004/0165567 A1 | 8/2004 | Kim et al. | |

* cited by examiner

*Primary Examiner*—Creighton H Smith
(74) *Attorney, Agent, or Firm*—Foley & Lardner, LLP

(57) ABSTRACT

A method of multi-mode communications includes receiving signals from multiple sources at a plurality of sample buffers, referencing the plurality of sample buffers for a first source at one time and referencing the plurality of sample buffers for a second source at another time, and communicating data from the referenced plurality of sample buffers to a processing unit. The processing unit concurrently receives inputs from buffers in the plurality of sample buffers and outputs to other buffers in the plurality of sample buffers.

19 Claims, 37 Drawing Sheets

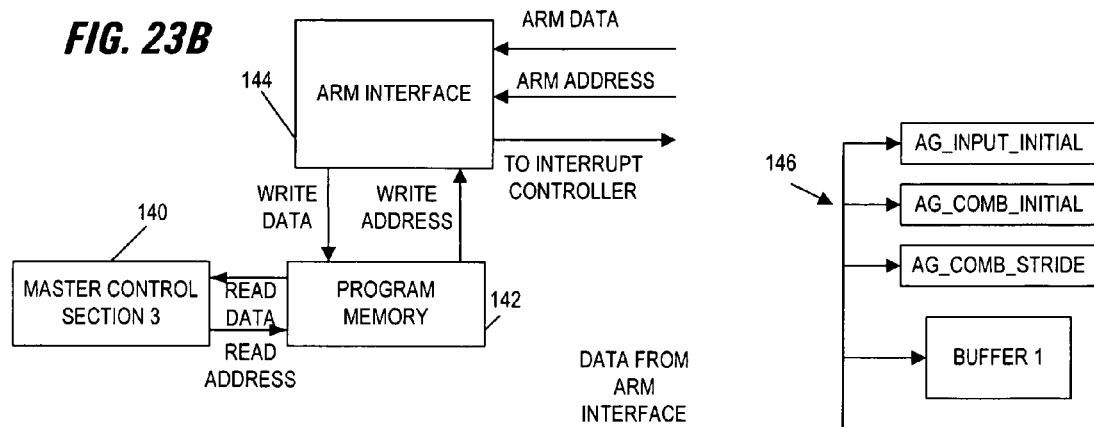
FIG. 23B
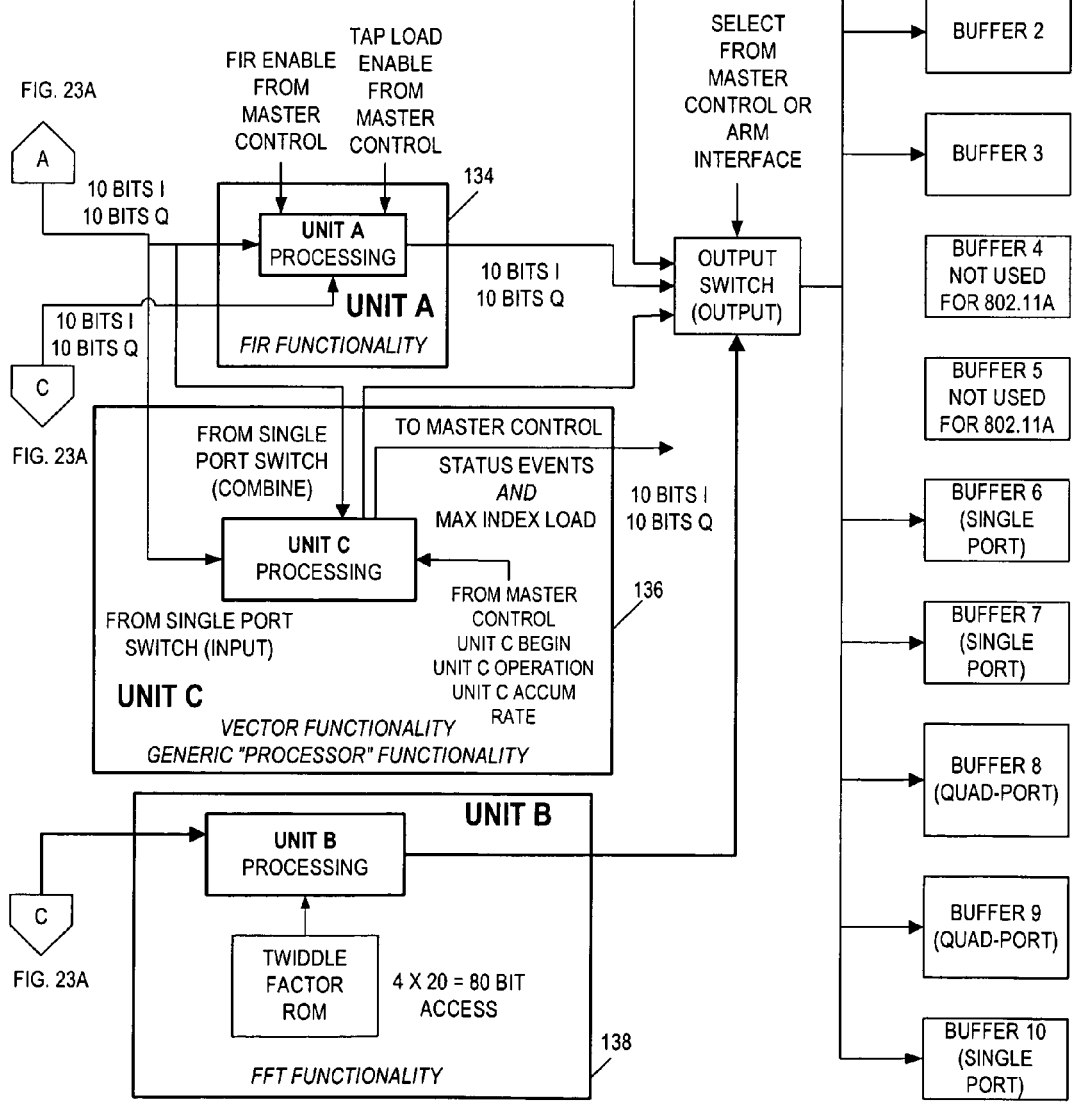

MULTI-MODE METHOD AND APPARATUS FOR PERFORMING DIGITAL MODULATION AND DEMODULATION

CROSS REFERENCE TO RELATED APPLICATIONS

The present application is related to and claims priority from U.S. Provisional Patent Application No. 60/393,633 entitled METHOD AND APPARATUS FOR DEMODULATING SPREAD SPECTRUM SIGNALS IN MULTI-PATH ENVIRONMENT, filed on Jul. 3, 2002.

The present application is also related to U.S. patent application Ser. No. 10/613,825 entitled VIRTUAL FINGER METHOD AND APPARATUS FOR PROCESSING DIGITAL COMMUNICATION SIGNALS; U.S. patent application Ser. No. 10/613,897 entitled BUFFER METHOD AND APPARATUS FOR PROCESSING DIGITAL COMMUNICATION SIGNALS; U.S. patent application Ser. No. 10/613,477 entitled SEARCHING METHOD AND APPARATUS FOR PROCESSING DIGITAL COMMUNICATION SIGNALS; and U.S. patent application Ser. No. 10/613,853 entitled FLEXIBLE METHOD AND APPARATUS FOR PERFORMING DIGITAL MODULATION AND DEMODULATION, all of which are assigned to the same assignee as the present application and are filed on an even date herewith.

FIELD OF THE INVENTION

The present invention is related to communication systems capable of communicating signals. More particularly, the present invention relates to a universal method and apparatus for processing digital communication signals.

BACKGROUND OF THE INVENTION

In general, conventional digital communication systems include a baseband subsystem in which received signals are demodulated and transmitted signals are modulated. Demodulators in baseband subsystems have been implemented using an application specific integrated circuit (ASIC) or a digital signal processor (DSP) or combination thereof. However, known demodulator implementations suffer from significant drawbacks.

FIG. 1 illustrates a conventional implementation of a spread-spectrum demodulator 10. The demodulator 10 includes a combiner 12 that combines symbols received from Fingers 1, 2, through Finger N (hereinafter referred collectively as fingers 14). Fingers 14 are instantiations of hardware logic for each multi-path processing entity, or "path." The combiner 12 de-skews or aligns in time the symbols from the fingers 14 and adds the symbols together to form an estimate of the transmitted symbol value. Once steady-state is reached, an output of the combiner 12 occurs synchronously with the symbol reception at the antenna.

Demodulator 10 has several disadvantages. For example, several disadvantages in using the demodulator 10 result from the synchronous processing based on clock signal from a master timer 16. Another disadvantage is that the demodulator 10 uses multiple, static instantiations of the fingers 14. The number of fingers 14 is selected based on the worst-case channel condition possible, representing the largest possible number of gates needed. To support more and more multi-path signals and to be compatible with advanced wireless techniques such as MIMO (multiple input multiple output antennas), current conventional architectures have been instantiating more and more fingers. More fingers require more power.

Another disadvantage of the demodulator 10 is a slow assignment or de-assignment of fingers 14, thereby wasting power. Turning on and off fingers 14 via assignment and de-assignment is a relatively slow process. As a result, there is a significant lag between a path dying and a finger shutting off. This results in higher power consumption with no corresponding gain in performance.

Yet another disadvantage of the demodulator 10 results from the use of a clock with the fingers 14 and the fact that the fingers 14 operate in parallel. All of the fingers 14 are synchronized based on a clock signal, regardless of whether a specific finger is used (assigned) and for how long it is used. A clocked finger, even when de-assigned, still consumes considerable power.

Even when a finger is assigned and demodulating a strong, needed path, it is still being clocked at a rate greatly in excess of the rate that useful output is being produced. As such, power is wasted. In general, clock buffers use ⅓ of device power, even if no useful processing is performed.

Yet another drawback to the demodulator 10 is the design of static bit widths, which are set for worst-case operation. This design causes excessive power consumption when the full number of bits is not required for demodulation. Most of the time, less bits are actually needed.

Another drawback to the demodulator is that its construction makes a MIMO solution costly and ineffective from a power standpoint. In the case of Multiple Outputs (MO), the number of fingers must be doubled to achieve the intended diversity effect. For Multiple Input (MI) techniques, such as STS and STTD, a multiplier must be added to each finger and all fingers are forced to always process both incoming antenna streams. This inefficiency results in more fingers, which only magnifies the power problems discussed above.

Thus, there is a need to reduce circuit complexity, gate count, and power consumption by using a single demodulation element that is capable of demodulating multi-path spread spectrum signals in an optimum manner. Further, there is a need to provide an improved method of demodulating multi-path signals. Further still, there is a need for a flexible method and apparatus for performing digital modulation and demodulation. Yet further, there is a need to have common circuitry for both transmit and receive operations in a digital communication system.

SUMMARY OF THE INVENTION

An exemplary embodiment relates to a method of multi-mode communications. The method includes receiving signals from multiple sources at a plurality of sample buffers, referencing the plurality of sample buffers for a first source at one time and referencing the plurality of sample buffers for a second source at another time, and communicating data from the referenced plurality of sample buffers to a processing unit. The processing unit concurrently receives inputs from buffers in the plurality of sample buffers and outputs to other buffers in the plurality of sample buffers.

Another exemplary embodiment relates to a method of multi-mode digital communications. The method includes asynchronously processing received communication samples at a processing unit. The communication samples processed by the processing unit correspond to more than one communication protocol specification. The method also includes controlling the processing unit by programmed instructions.

Another exemplary embodiment relates to a system for multi-mode communications. The system includes means for receiving signals from multiple sources at a plurality of sample buffers, means for referencing the plurality of sample buffers for a first source at one time and referencing the plurality of sample buffers for a second source at another time, and means for communicating data from the referenced plurality of sample buffers to a processing unit. The processing unit concurrently receives inputs from buffers in the plurality of sample buffers and outputs to other buffers in the plurality of sample buffers.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements, and.

DETAILED DESCRIPTION OF EXEMPLARY EMBODIMENTS

Figure 1:
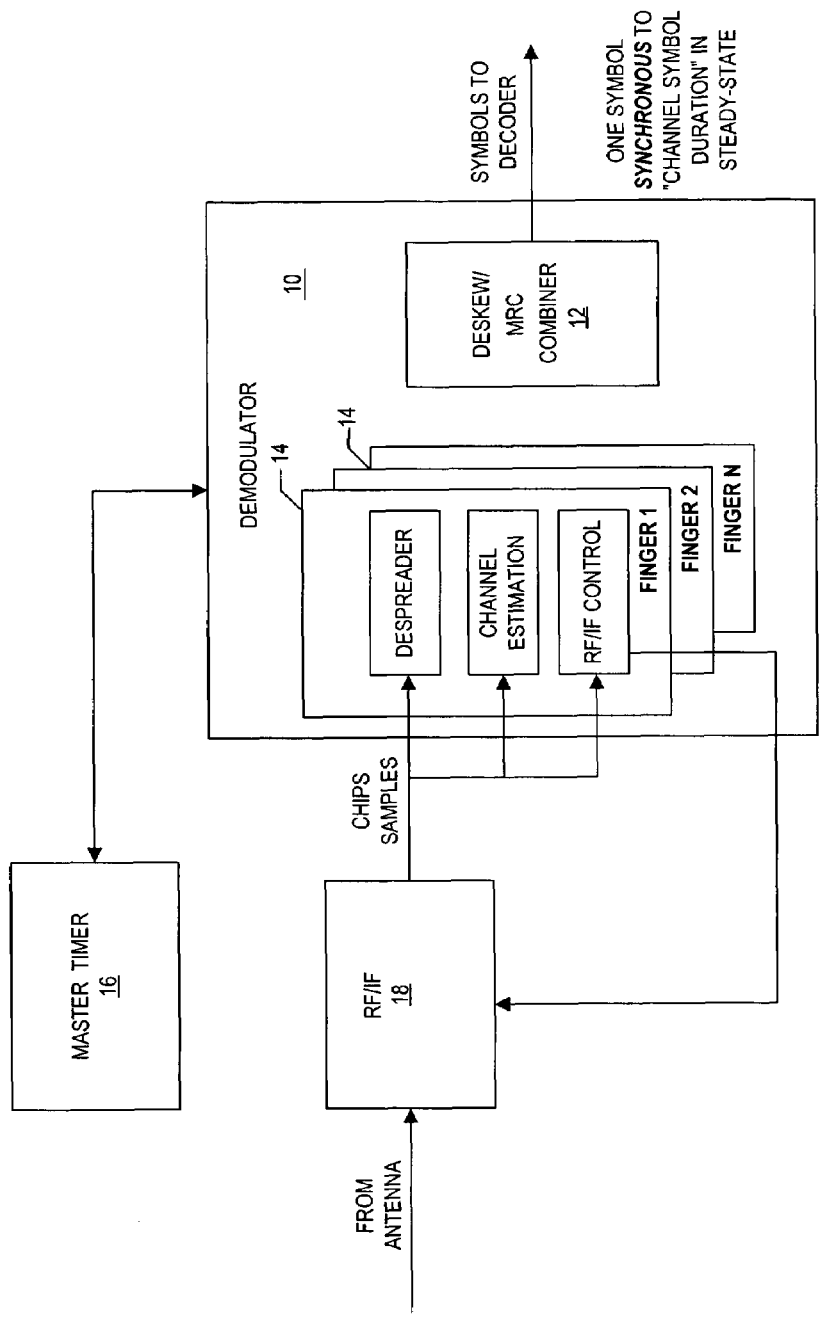
FIG. 1 is a diagrammatic representation of a conventional spread spectrum demodulator.
Figure 2:
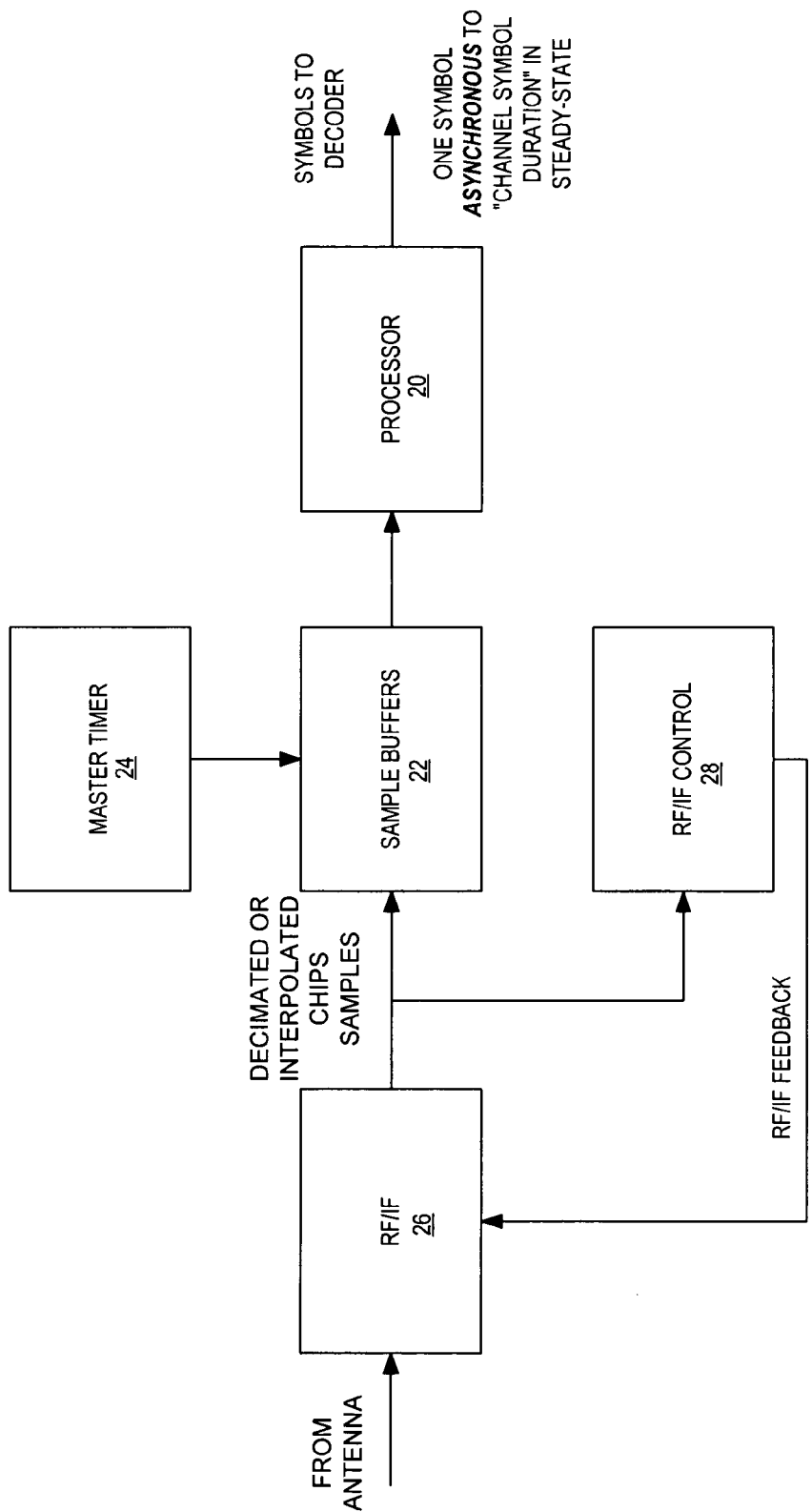
FIG. 2 is a diagrammatic representation of a multi-path processing system in accordance with an exemplary embodiment

In accordance with at least one exemplary embodiment, FIG. 2 illustrates a multi-path communication processing system including a processor 20 that receives signals in the form of sub-chip samples from sample buffers 22. Sample buffers 22 receive timing input from a master timer 24 and chip samples (modulated signals in a spread spectrum system) from a receiver 26. The receiver 26 can be a radio frequency (RF) or an intermediate frequency (IF) type receiver. The chip samples provided to sample buffers 22 can be decimated or interpolated. A control 28 provides feedback to the receiver 26.

Sample buffers 22 can store an amount of data referred to as a "Symbol Group." Advantageously, sample buffers 22 make it possible for the processor 20 to not be synchronously clocked by the sample rate because the processor 20 can obtain data from sample buffers 22 as needed. In this way, the processor 20 operates as more like a processor than an application specific integrated circuit (ASIC), working at the fastest clock rate that the silicon technology will support.

Figure 3:
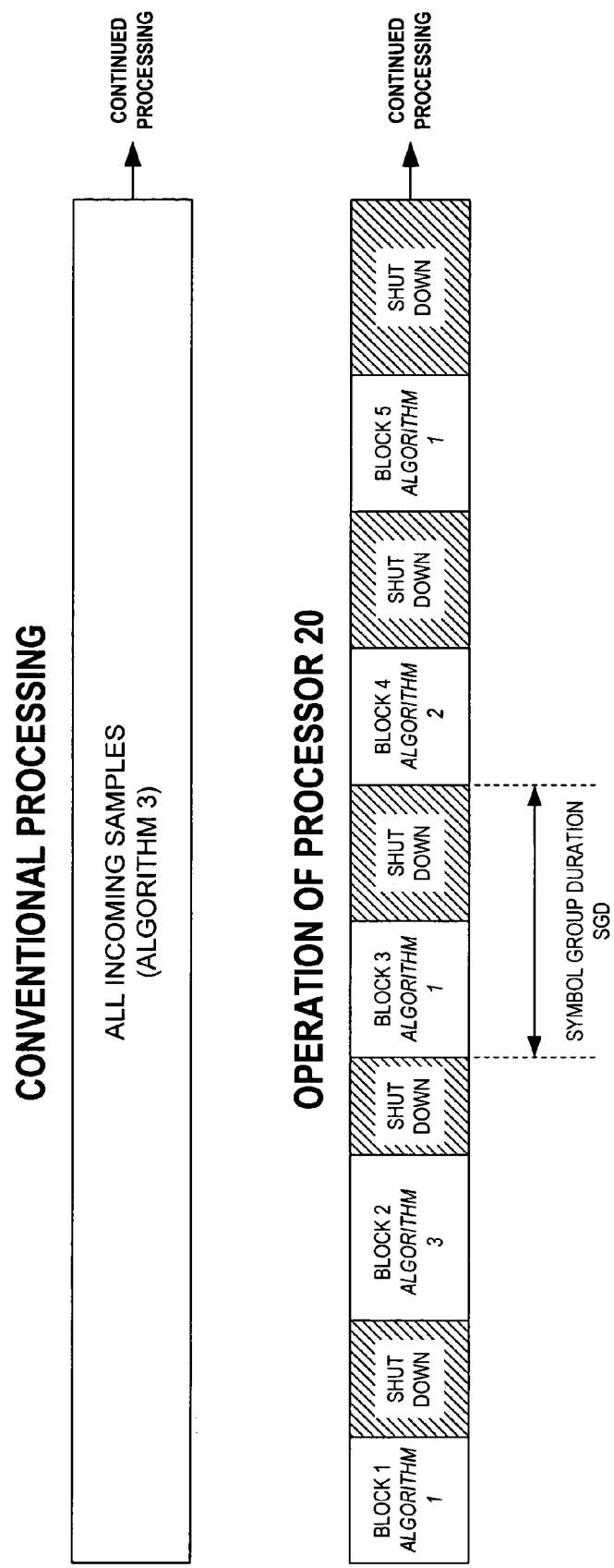
FIG. 3 is a diagrammatic representation comparing the operation of a conventional demodulator with the demodulator of the system of FIG. 2.

FIG. 3 illustrates operation of the processor 20 compared to operation of a conventional synchronous implementation. Whereas the conventional implementation operates continuously and relatively uniformly on incoming chips, the processor 20 does the required amount of processing at the fastest clock rate available in a serial fashion. This speed enables the processor 20 to finish its processing before the time needed for the next buffer to fill and require servicing (i.e., a Symbol Group Duration). The processor 20 can be shut down (i.e., the clock is gated off) until the completion of the Symbol Group Duration. As also shown in FIG. 3 by the width of block sections, the given amount of processing may vary from Symbol Group to Symbol Group.

In an exemplary embodiment, the processor 20 is configured to provide dynamic path processing. This dynamic path processing can be referred to as a "virtual finger" feature because the multi-path communication paths, or fingers, are not actual hardwired circuits but rather paths defined using various algorithms. During the period of inactivity between completion of processing and waiting for the sample buffer to synchronously fill (the shaded regions), the clock is disabled. This can be seen in FIG. 3 in the shaded "Shut Down" region. As a result, there is no idle power loss from the processor 20 due to capacitive loading on the clock tree resulting from clock ticks on the circuitry without activity. In conventional systems using an ASIC for demodulation operations, only a small fraction of the clock ticks produce useful output from the ASIC.

As an example of why the processing time varies, consider the case where three "fingers" are assigned, but two of these "fingers" are assigned to multi-path components in a deep fade so as to render them non-productive in the demodulation process. The amount of time that the processor 20 would be actively processing this block would be approximately ⅓ of the worst case. This varying number of fingers is just one example of the dynamic processing capability.

Another example of the dynamic processing ability of the processor 20 is the dynamic setting of bit-widths. Dynamically processing the bits is particularly beneficial since less bits are usually needed to produce a decodable output than the instantaneous worst case. By processing less bits on average, less power is consumed.

Bits can be treated like paths, in that they can be separately processed, because of the linearity in most demodulation processing (e.g., de-spreading, accumulation, MRC) such that many bits can be divided into sub-units of bits. If the processor 20 were designed in this fashion, it would be composed of small bit-width circuitry. In the presence of a fade, where more bits are necessary on a given path, the same path would be processed several times, each on a different sub-unit of bits (i.e. first the LSB sub-unit and last the MSB sub-unit). Each time a sub-unit is processed, the de-spreaded output is appropriately shifted and accumulated into a symbol buffer. Such processing is simply another kind of Accumulated Maximal Ratio Combining (A-MRC) algorithm with the paths being replaced by sub-units of bits in the algorithm.

Another exemplary way the processor 20 can dynamically set bit-widths is by using a programmable ASIC. If only a few bits are needed, the data is shifted to the right such that the number of toggling bits in the demodulator are reduced.

Advantageously, for products that already contain a processor (e.g., DSP, GSP, ARM) for various applications (e.g., voice processing, video drivers, MPEG, JPEG), the processor 20 can offload some of the low processing intensive operations that are typically forced into ASIC. The buffering nature of the processor 20 operation can be exploited to eliminate the stringent real-time DSP deadlines that typically force these operations into ASIC. Because samples are buffered, stringent real-time processor deadlines are no longer in force.

The dynamic selection of variables that control the majority of demodulation power consumption significantly optimizes power consumption. Thus, the processor can offload many relatively non-computationally intensive tasks including Multipath Finger Assignment, Equalization/Interpolation/MRC Tap Weight Calculation, NCO Stride Selection, and Time Tracking. Offloading this functionality into the processor 20 represents a saving in silicon area, yielding lower cost in addition to reduced development risks. Incorporating a processor into the demodulation algorithm reduces power consumption, too.

Figure 4:
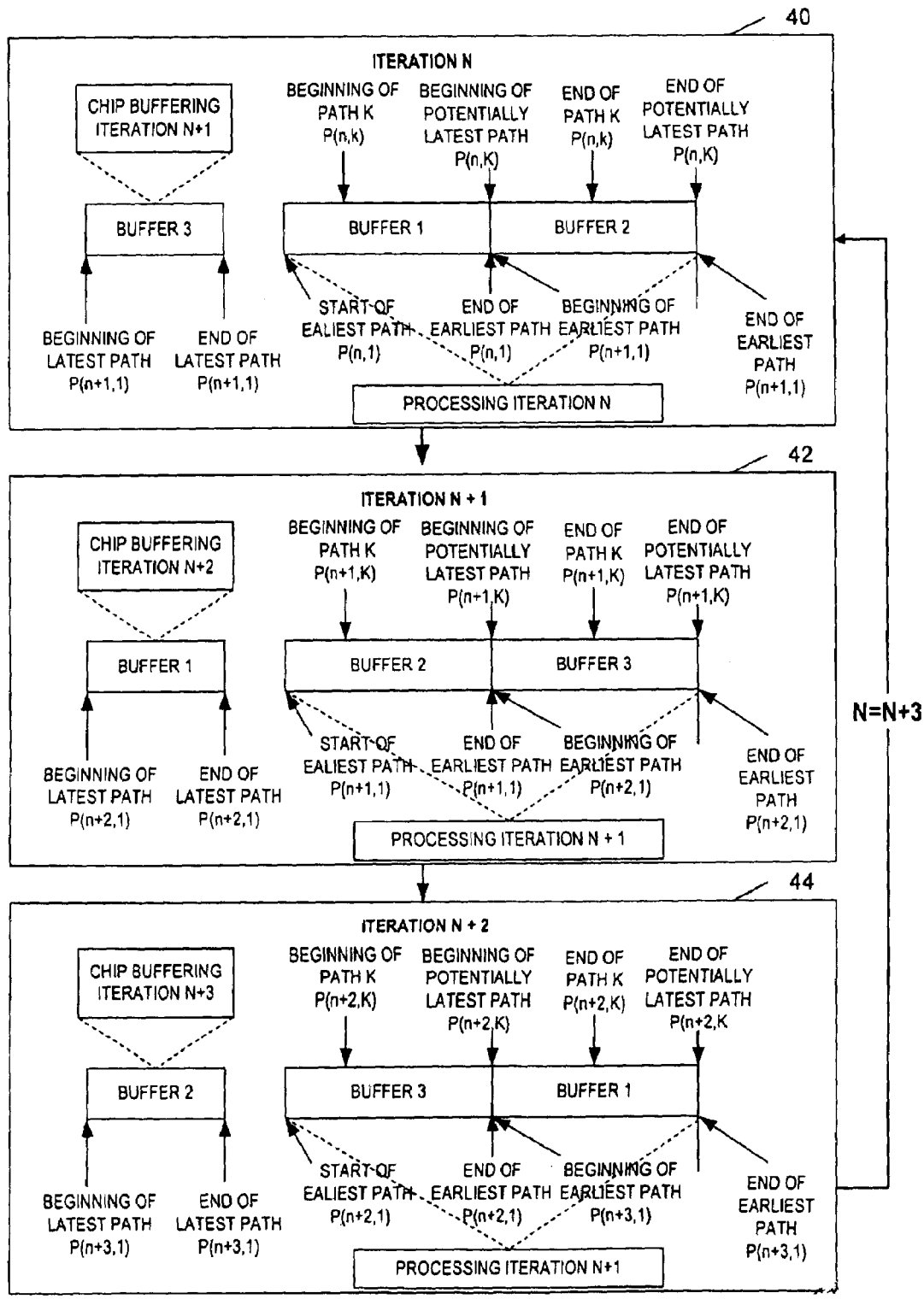
FIG. 4 is a diagrammatic representation of a minimal buffer operation in accordance with an exemplary embodiment.

FIG. 4 illustrates the operation of an exemplary buffering scheme. A "buffer" is a memory element including two sets of data/address ports—one for read and one for write. The buffer does not have to support simultaneous read/write access. Any given cycle is either read or write or both. The selection criteria of this exemplary buffer scheme is to use a small amount of RAM for the chip memory, yet have very simple operation of the processor. At any given time, the processor is processing on two of the buffers that are logically functioning as one.

A state 40 in FIG. 4 shows that during iteration N, Buffer 1 and Buffer 2 are serving as a single logical data source. With this scheme, all symbols whose earliest path begins in Buffer 1 are processed to completion (all multi-paths are combined), which entails using the chips in Buffer 2 for the later paths of these symbols. Those symbols whose earliest paths occur in Buffer 2 are not processed until iteration N+1 in a state 42 as shown in FIG. 4.

Meanwhile, Buffer 3 is receiving the samples occurring during the processing of the logical combination of Buffer 1 and Buffer 2. During iteration N+1 in state 42, the processor processes those symbols whose earliest path are in Buffer 2 while using the contents of Buffer 3 as the necessary later arriving paths which also must be present to complete the symbol processing. Advantageously, these operations allow for complete symbol processing during any iteration which eliminates the requirement of many state variables to keep track of the partial processing between iterations, and more complicated control logic to allow "fast-forwarding" through states to reach partial symbols.

The larger sample buffer size is used when other requirements drive the necessity of a larger buffer size. For example, consider the following: for protocols having continuous pilots (e.g., cdma2000, W-CDMA), the driving requirement of sample buffer size is the multi-path delay spread such that all data for symbol processing is accessible to the processor simultaneously. For burst-pilot wireless technologies such as 1xEV-DO, the burst spacing is the more stringent requirement for determining buffer size. The processor must have simultaneous access to all the data stored between pilot bursts, in addition to the later pilot burst for linear interpolation of the channel estimate to be performed which is vital for demodulation performance for the automatic frequency control (AFC) drift that is ever-present.

Figure 5:
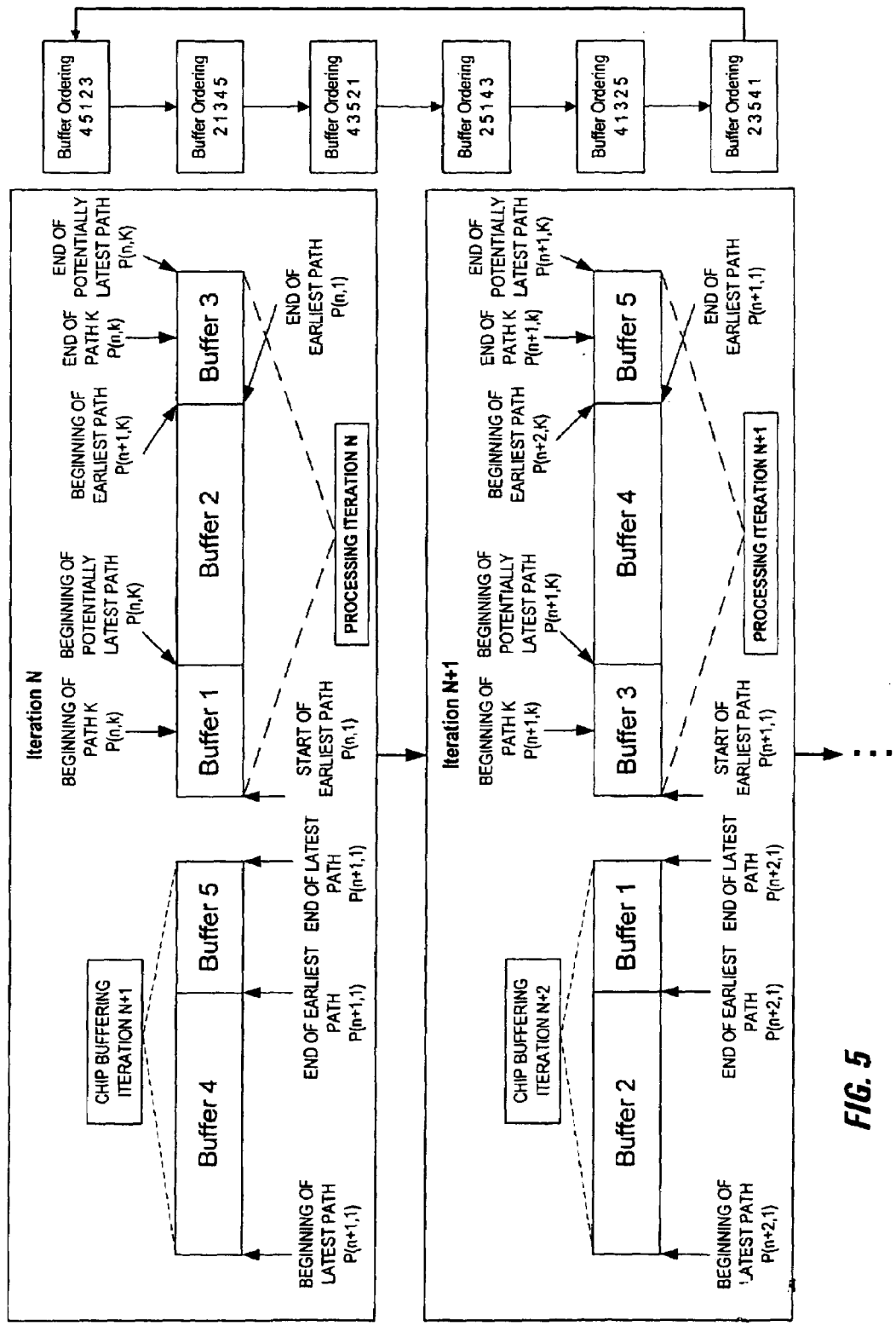
FIG. 5 is a diagrammatic representation of another exemplary buffer operation.

FIG. 5 illustrates an exemplary buffering scheme for wireless technologies that use burst-pilot. Initially, Buffers 1, 2, and 3 serve as a single logical data source to the processor 20 (FIG. 2). Buffers 4 and 5 serve as a single logical memory element that captures the synchronously arriving samples from the ADC. All symbols whose earliest arriving multi-path components are contained in Buffers 1 and 2 are completely processed during iteration N. This operation uses the samples in Buffer 3 in order to process the later arriving multi-path components. The processing of the symbols whose earliest arriving multi-path components are contained in Buffer 3 is deferred until iteration N+1. Therefore, during iteration N+1, Buffers 3, 4, and 5 serve as the single logical entity for processing.

Figure 6:
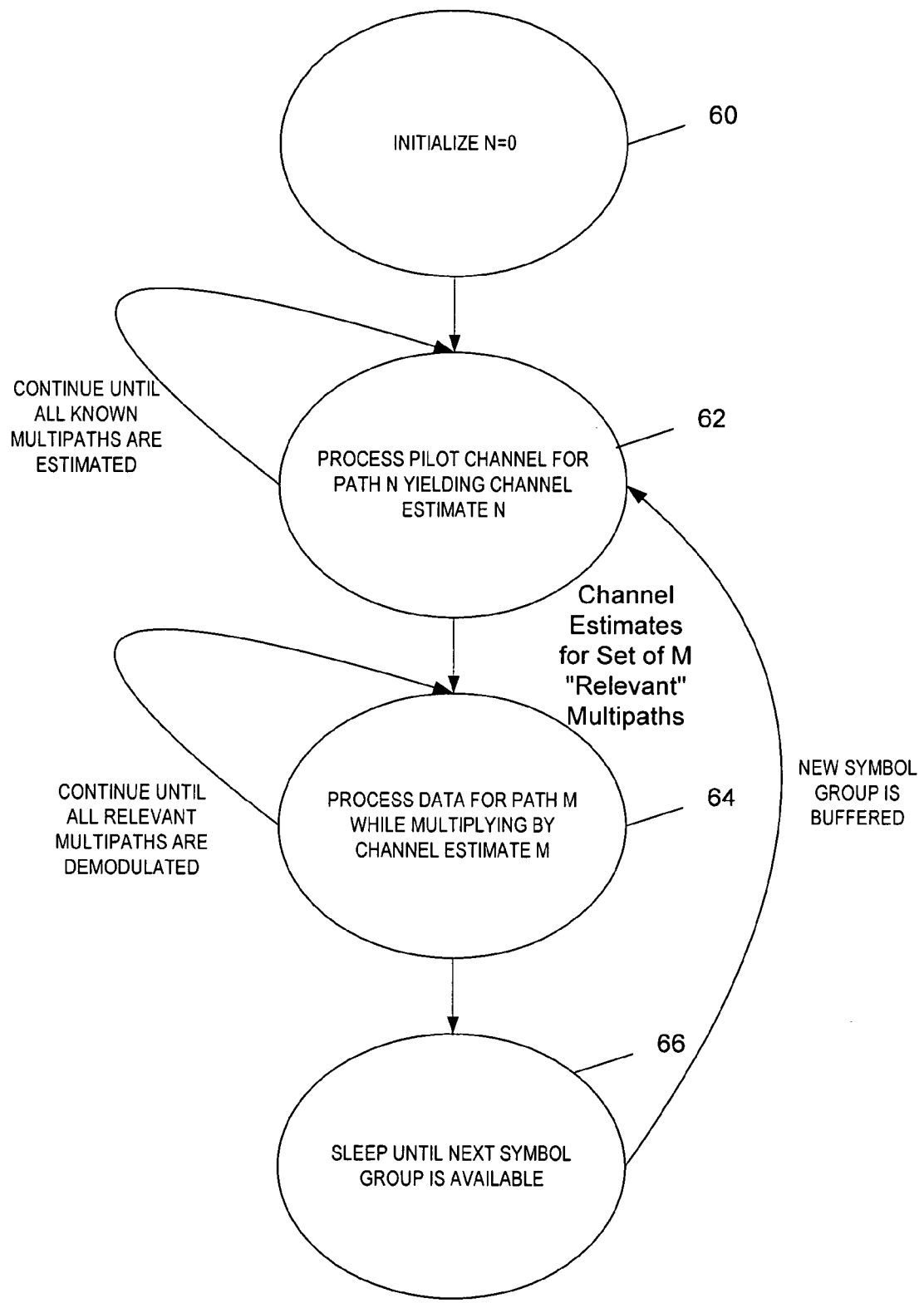
FIG. 6 is a diagrammatic representation of an Accumulated Maximal Ratio Combining (A-MRC) processing operation in accordance with an exemplary embodiment.

FIG. 6 illustrates operations in an Accumulated Maximal Ratio Combining (A-MRC) procedure of the processor 20 described with reference to FIG. 2. As can be seen here, operations are performed serially. In an operation 60, the number of paths, N, is set to zero. In an operation 62, a pilot channel for path N is processed, yielding a channel estimate. Operation 62 continues until all known multi-paths are estimated. Advantageously, the number of paths, N, can vary over time.

Once all known multi-paths are estimated, channel estimates for a set of M relevant multi-paths are used in data de-spreading of an operation 64. Notably, multi-paths can refer to communication signals from the one base station, other base stations, one antenna, or other antennas. In operation 64, data for path M is processed while multiplying by the channel estimate. Operation 64 continues until all relevant multi-paths for all channels are demodulated. In an operation 66, the processor sleeps until the next symbol group is available.

Figure 7:
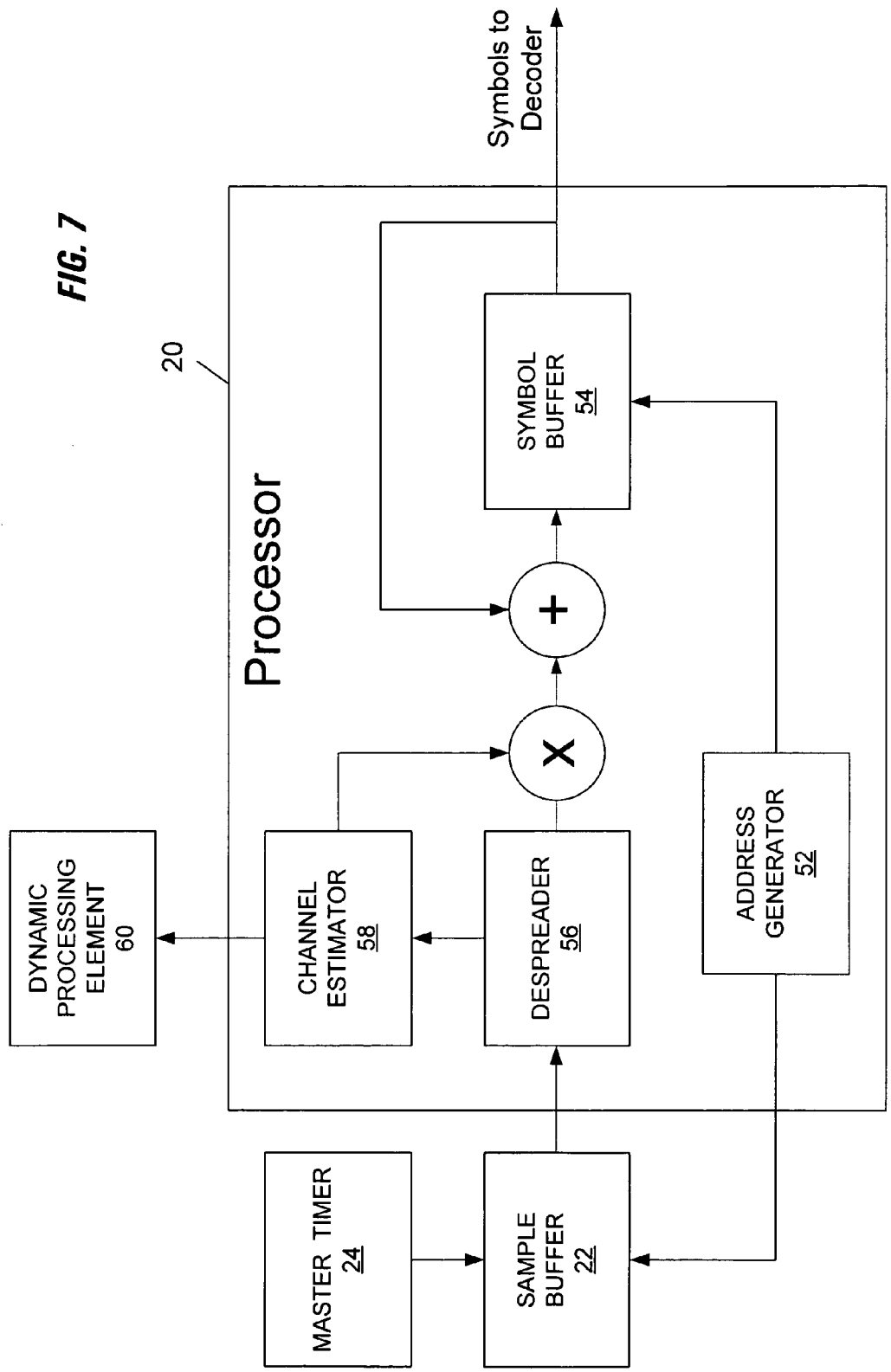
FIG. 7 is a diagrammatic representation of an Accumulated Maximal Ratio Combining (A-MRC) algorithm processing units in accordance with an exemplary embodiment.

FIG. 7 shows exemplary processing blocks of the processor 20 that are specific to the A-MRC algorithm. The Master Timer 24 is used to determine the beginning of the Processing Interval. At the beginning of the Processing Interval, the processor 20 begins processing of sub-chip samples.

An address generator 52 decimates the samples to the correct rate and phase by initializing to the buffer address corresponding to the desired sub-ship phase. To keep proper sub-chip phase alignment, the address generator 52 is advanced the number of sub-chips per chip. A despreader 56 and a channel estimator 58 serially despread and accumulate the paths into a Symbol Buffer 54.

Figure 8:
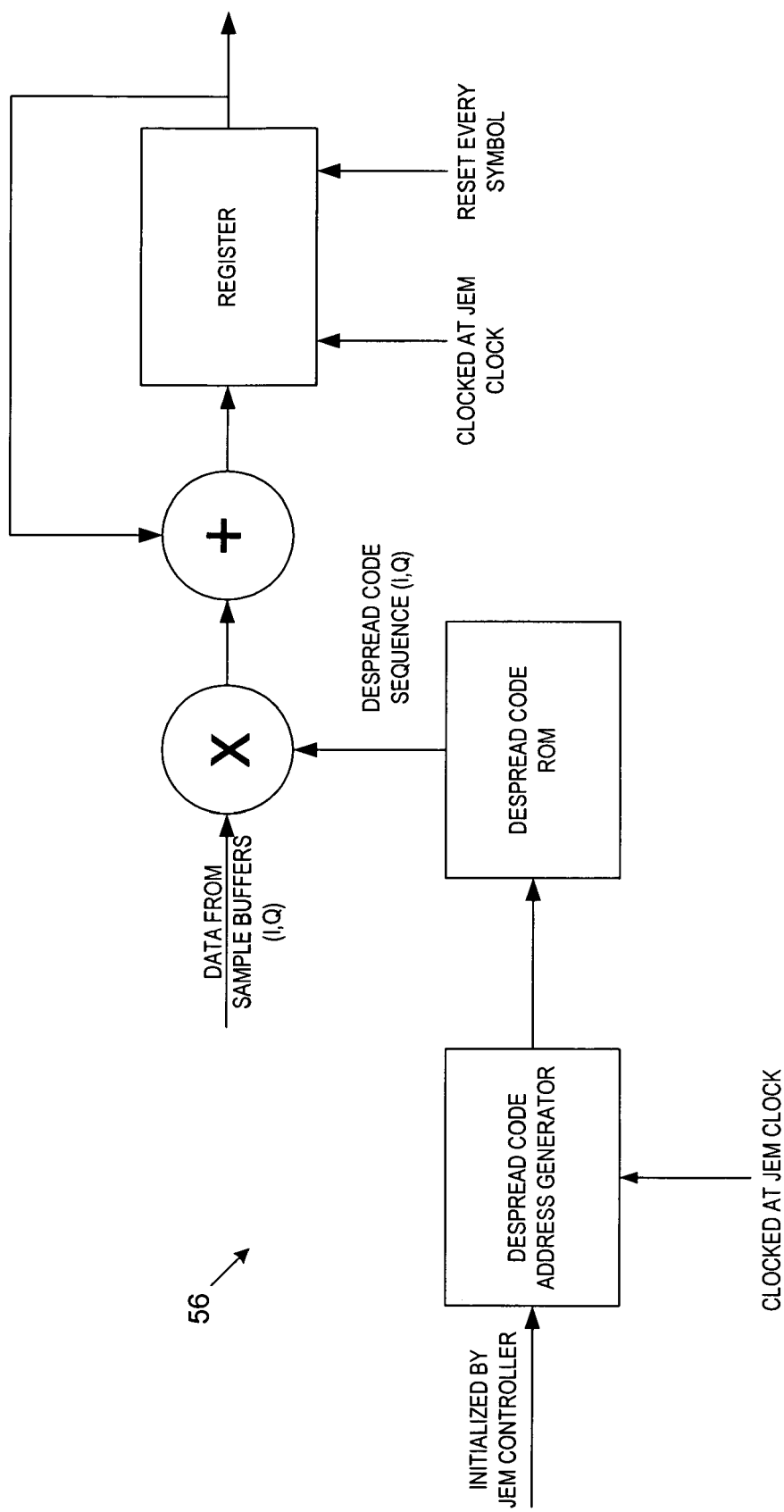
FIG. 8 is a diagrammatic representation of the Accumulated Maximal Ratio Combining (A-MRC) despreader of FIG. 7.

FIG. 8 illustrates the despreader 56 for the A-MRC algorithm. When performing the channel estimation, the despreader 56 operates by multiplying by the known pilot sequence, and inserting the correlation value into a channel estimator 58. During the demodulation of the data, the despreader 56 multiplies the on-phase sub-chip samples by the correct PN and channelization code (e.g., Walsh, OVSF, etc.) and outputs the value at symbol rate. The complex symbols are then multiplied by the channel estimate from the path and accumulated into the symbol buffer 54. In other words, the complex symbols are read, added to the current value, and written back into the symbol buffer 54. The MRC estimates are valid at the end of processing the relevant multi-paths and are ready for symbol processing (e.g., deinterleaving, depuncturing, and decoding).

Figure 9:
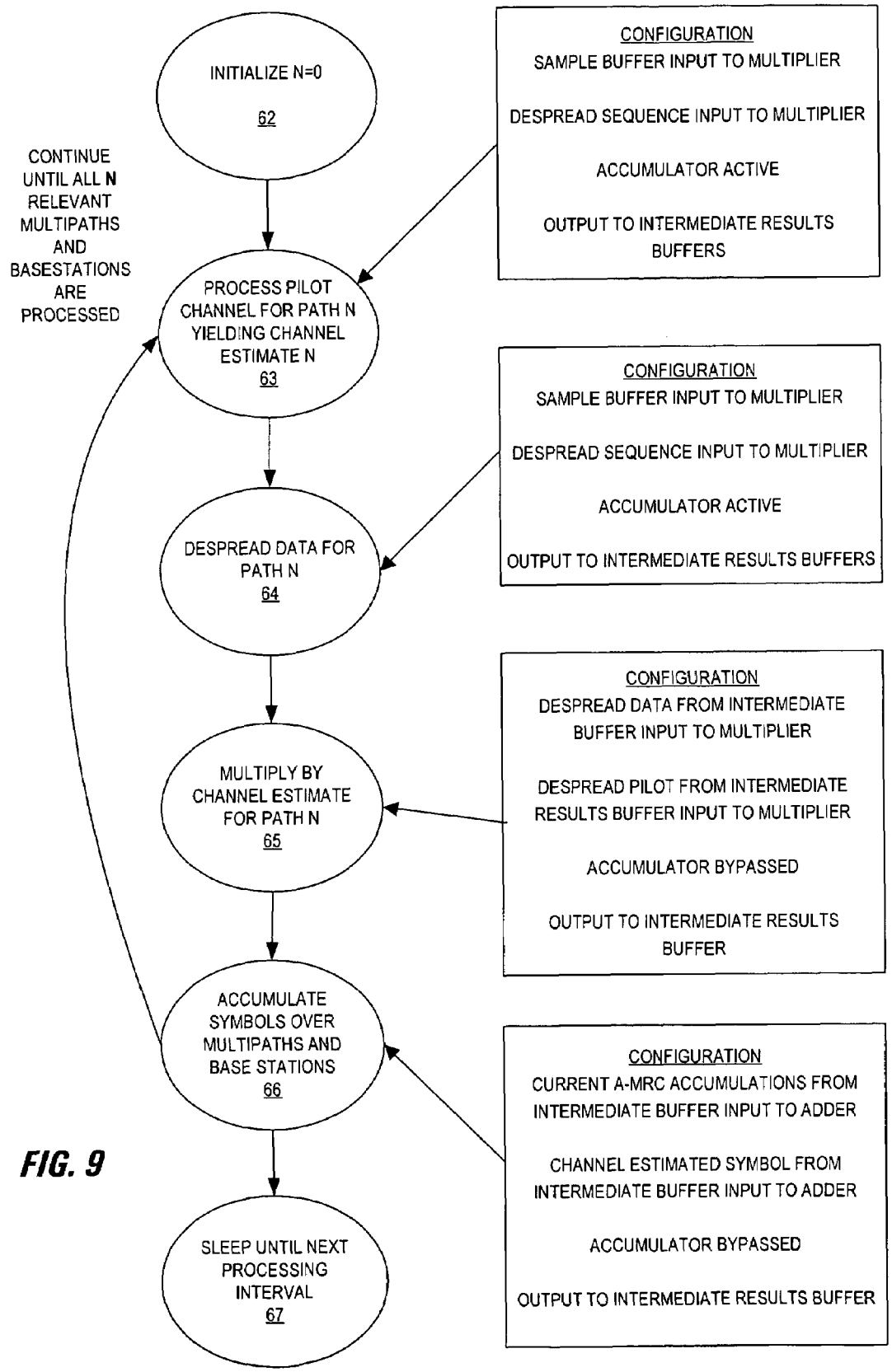
FIG. 9 is a diagrammatic representation of the Accumulated Maximal Ratio Combining (A-MRC) algorithm of FIG. 6 in greater detail.

FIG. 9 illustrates in more detail operations performed in the Accumulated Maximal Ratio Combining (A-MRC) procedure described with reference to FIG. 6. In a state 62, an multi-path counter, N, corresponding to which multi-path component is being processed, is set to zero. In a state 63, a pilot channel for path N is processed, yielding a channel estimate for path N. Pilot channel processing includes multiplying values from a sample buffer and a despread sequence generator. The samples from the pilot channel are accumulated and output to intermediate results buffers. As such, a channel estimates is established for a path N. In a state 64, data for path N is despread and output to the intermediate results buffer.

In a state 65, the channel estimate for path N is multiplied by the despread data of path N, the accumulator is bypassed, and the output is sent to intermediate buffers. In a state 66, symbols from the path N are accumulated over multi-paths and base stations. The current MRC accumulation of the group of symbols (which are initialized to zero for processing of the first path) from the intermediate buffer are added to the despread and channel estimated symbols from the intermediate buffer, the accumulator is bypassed, and output is sent to intermediate buffers. States 63-66 are repeated until all N relevant multi-paths and base stations are processed at which point, the current MRC accumulation is the final accumulation and this value is output to the symbol processor. Advantageously, this process may be repeated in the case where a receiver is demodulating several channels After that, in a state 67, the processor 20 sleeps until the next processing interval.

Figure 10:
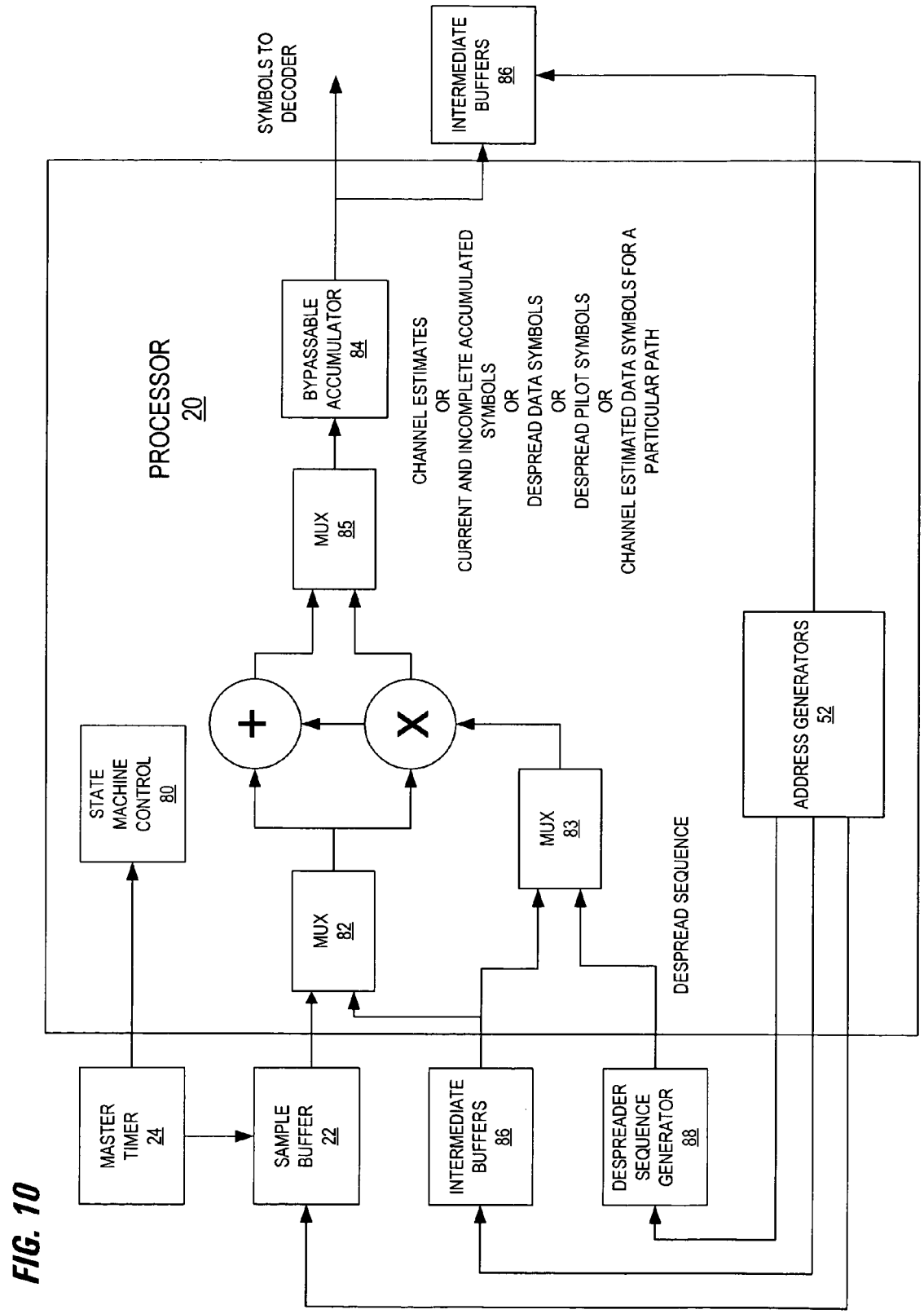
FIG. 10 is a diagrammatic representation of the Accumulated Maximal Ratio Combining (A-MRC) algorithm processing units of FIG. 7 in greater detail.

FIG. 10 illustrates in more detail the processing blocks specific to the A-MRC algorithm described with reference to FIG. 7. The processor 20 includes a state machine control 80 configured to change states as described with reference to FIG. 8. The processor 20 also includes multiplexers (MUX) 82, 83, and 85 directing input from the sample buffers 22, intermediate buffers 86, and despreader sequence generator 88. A bypassable accumulator 84 directs symbols to a decoder and intermediate buffers 86. The bypassable accumulator 84 can output channel estimates, current and incomplete accumulated symbols, despread data symbols, despread pilot symbols, or channel estimated data symbols for a particular path.

In operation, the sample buffer 22 inputs pilot symbols to MUX 82 and the despread sequence generator 88 inputs despread data to MUX 83. These inputs are multiplied and sent to bypassable accumulator 84 via MUX 85. The bypassable accumulator 84 outputs accumulated symbols to intermediate buffers 86. The control of where results are output is dependent upon the state diagram described with reference to FIG. 9.

The A-MRC algorithm serially accumulates to the correct MRC value. Each iteration of the processor 20 in the situation extracts a single multi-path component:

$$f_{i,n} = \sum_{j=1}^{J} c(s(i) + d*j - \tau_n) p_j^*$$

where $f_{i,n}$ is the extracted symbol estimate of the ith symbol for the nth multi-path, c(.) is the contents of the chip sample buffer, J is the spreading factor, s(i) is the beginning of the correlation for the $i^{th}$ symbol, $T_n$ is the multi-path delay, d is the decimation rate, and $p_j$ is the pseudo-nose sequence multiplied by the orthogonal channelization code.

This value is weighted and accumulated in the symbol buffer 54 of the processor 20 according to the following recursion relation $$s_i^0 = 0$$
$$S_i^{n+1} = s_i^n + \alpha_{i,n}^* f_{i,n}$$

where $\alpha_{i,n}$ is the channel estimate of multipath n during the $i^{th}$ symbol. The resultant MRC symbol attains its final value after the number of useful multipath iterations N as $$s_i^N = \sum_{n=1}^{N} \alpha_{i,n}^* f_{i,n}.$$

There are many potential criteria for path selection based on channel estimates. For example, criteria can include not to process paths that have an instantaneous power in excess of $T_1$ dB below the strongest instantaneous multi-path component. Paths that are substantially below a strongest path contribute little to the SNR of the resultant (especially in an interference dominated scenario). Another criteria can be to rank paths in order of strongest to weakest instantaneous powers and not process paths once a threshold of $T_2$ has been reached. This represents a condition where de-codability has been reached and there is no need for processing any more multi-path components.

Greater capacity can be realized by multiple base station antennas referred to as Multiple Inputs (MI) and multiple receive antennas referred to as Multiple Outputs (MO). Together they become MIMO. Multiple transmit (TX) antennas and a single receive (RX) antenna is called Multiple Inputs Single Output (MISO). Having one TX antenna and multiple RX antennas is called Single Input Multiple Outputs (SIMO). MI provides a substantial diversity gain in fading channels, MO provides a diversity gain in addition to a beamforming gain.

Conventional ASIC implementations consist of dedicated fingers for each combination of TX and RX antennas (i.e. number of instantiations that is product of the number of transmit and receive antennas.) Advantageously, the processor 20 can process all links. In addition, the dynamic processing capabilities of the processor 20 allows a substantial power savings in that only the links (or multi-path within each link) that are sufficiently strong are processed.

Figure 11:
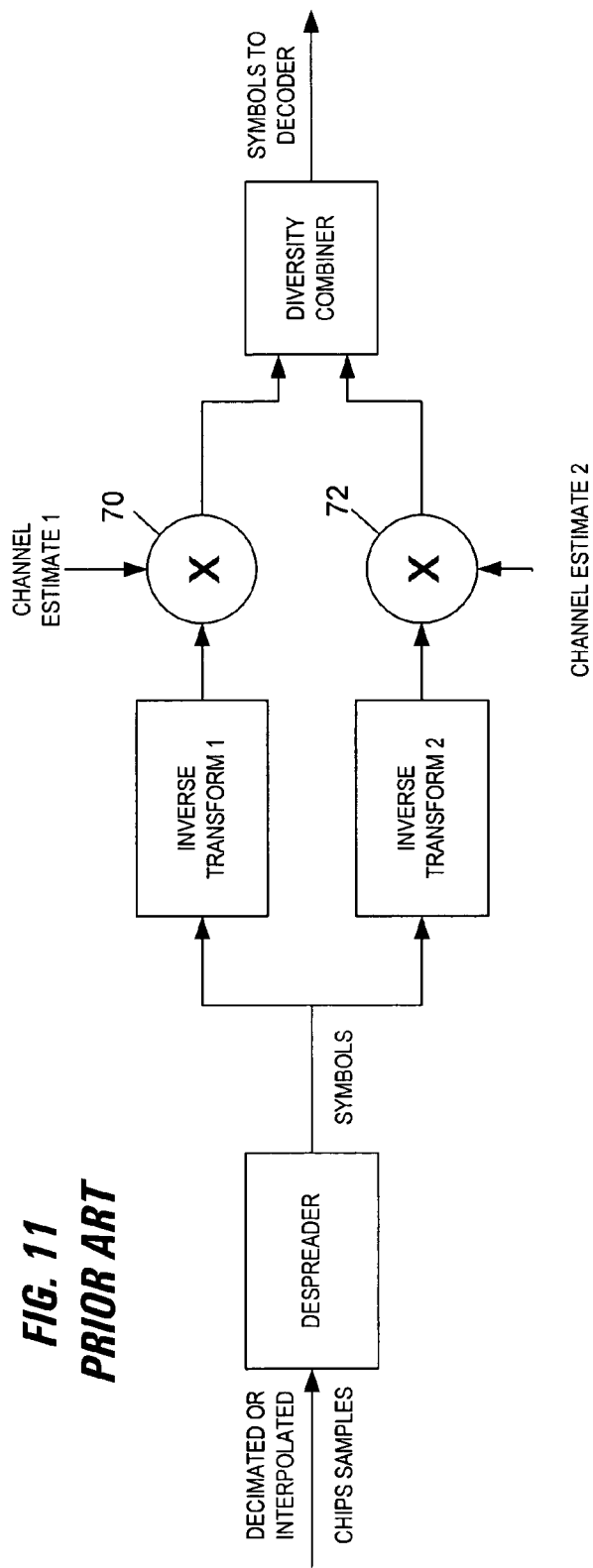
FIG. 11 is a diagrammatic representation of a conventional finger for Multiple Inputs (MI)

FIG. 11 illustrates a conventional finger supporting multiple input antenna (MI). As can be seen, such a finger is forced to contain two multipliers 70 and 72 plus some transformation logic to properly take advantage of the diversity. This results in at least two disadvantages. First, this results in increased cost of an additional multiplier and transform logic per finger. Second, the conventional finger, when enabled, is forced to always process all the incoming antenna path streams. This results in inefficiency in terms of power consumption.

Figure 12:
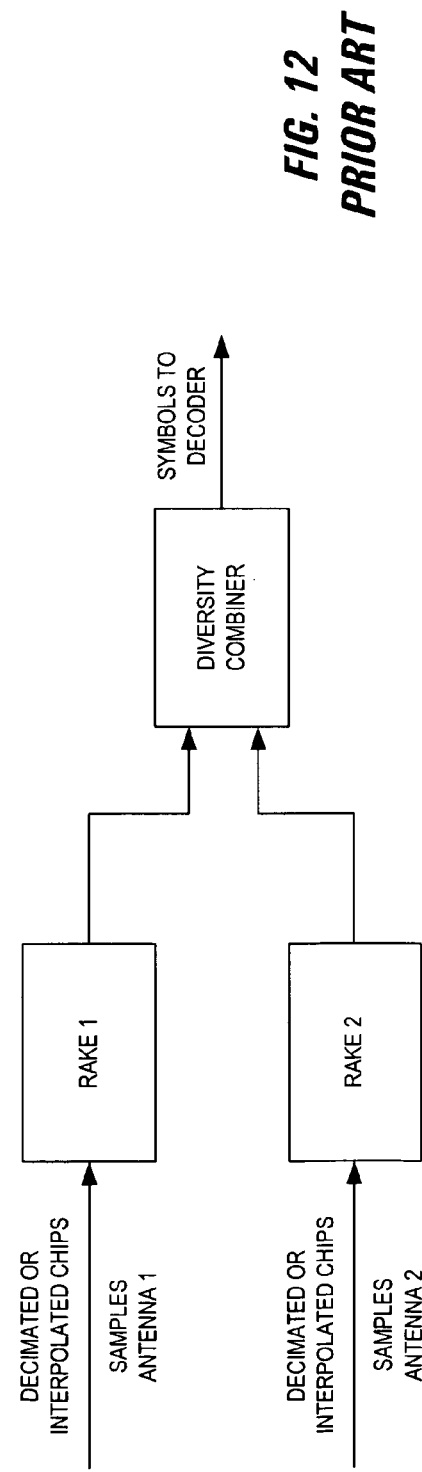
FIG. 12 is a diagrammatic representation of a conventional Multiple Outputs (MO) Receiver.

FIG. 12 illustrates a conventional receiver supporting multiple output antenna (MO). Two sets of conventional demodulators are instantiated and powered in order to support MO because there are two incoming streams from the RF that must be separately demodulated. Adding the two streams, for instance, is not a workable solution since the antennas by definition are out of phase with each other. Thus, in general, MO doubles the cost and power of a conventional implementation.

Figure 13:
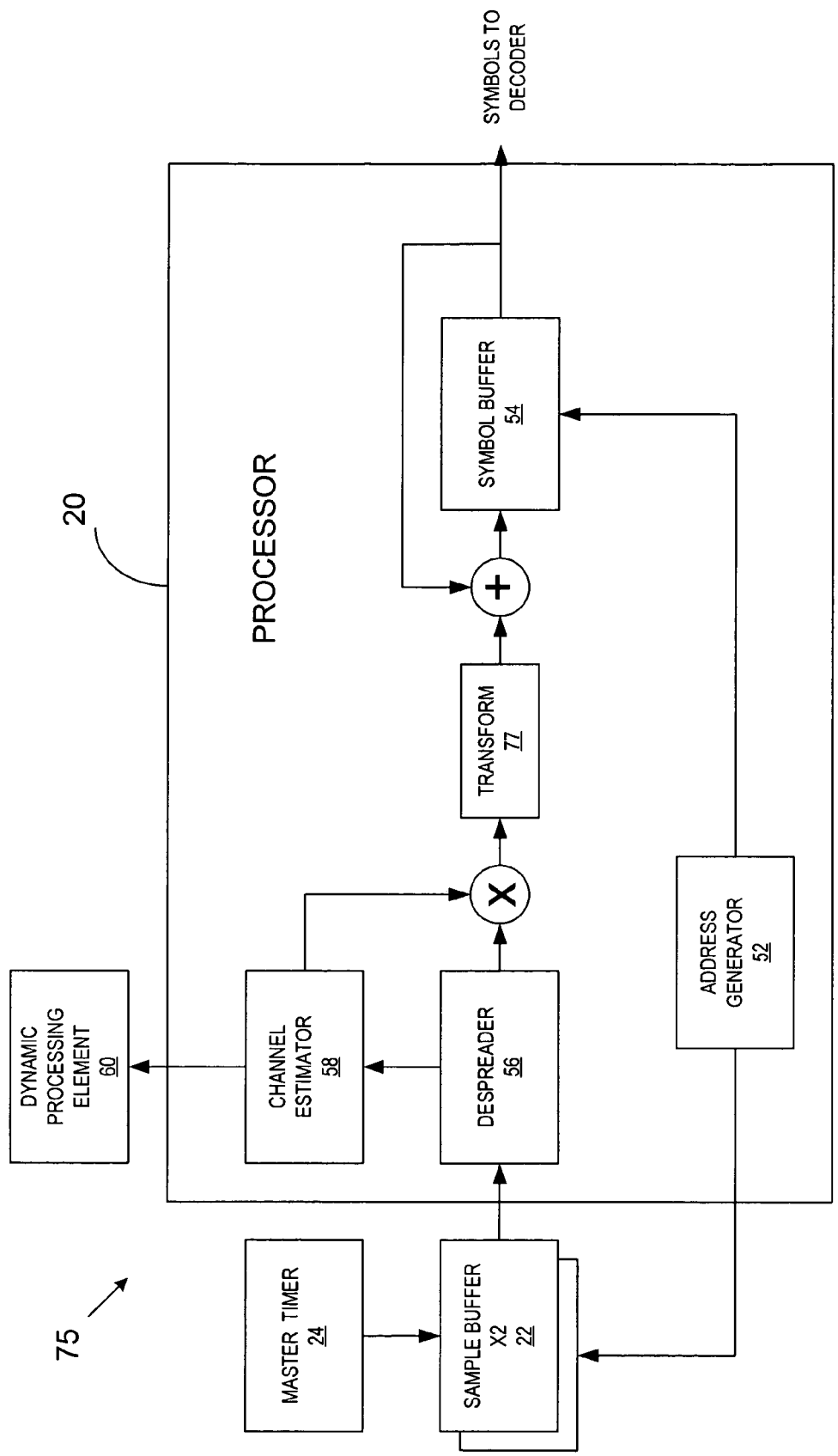
FIG. 13 is a diagrammatic representation of a processor for Accumulated Maximal Ratio Combining (A-MRC) with MIMO in accordance with an exemplary embodiment.

FIG. 13 illustrates a receiver 75 supporting full-fledged MIMO. The receiver 75 treats paths emanating from different BS antennas as well as paths coming from different RX antennas almost the same as another multi-path. With respect to MI, the only addition to the receiver 75 compared to the processing system of FIG. 7 is the necessity of a transformer 77 to handle such operations as STTD in WCDMA. Thus, the A-MRC algorithm can be almost exactly applied for MI with the difference that twice the number of paths could potentially be processed. With respect to MO, the only addition to the receiver 75 compared to the processing system of FIG. 7 is that the sample buffer 22 is doubled to support data coming in from both RF chains. As a result, there is substantial cost savings. With respect to MI, there is no need of an additional multiplier. With respect to MO, additional fingers are not needed. There is also substantial power savings. The processor 20 is not forced to process all combinations of transmit/receive paths in the fingers. Only those antenna paths that are sufficiently strong need to be processed.

In at least one exemplary embodiment, processor 20 is configured for operation with a "burst-pilot" signal where the information sent from the communication base-station used to estimate the cellular channel is time-division multiplexed so that it is present and not present in the forward-link signal at different times. In at least another exemplary embodiment, processor 20 is configured for operation with a "continuous-pilot" where the information sent from the communication base-station used to estimate the cellular channel is always present in the forward link signal transmitted by the base-station.

Figure 18:
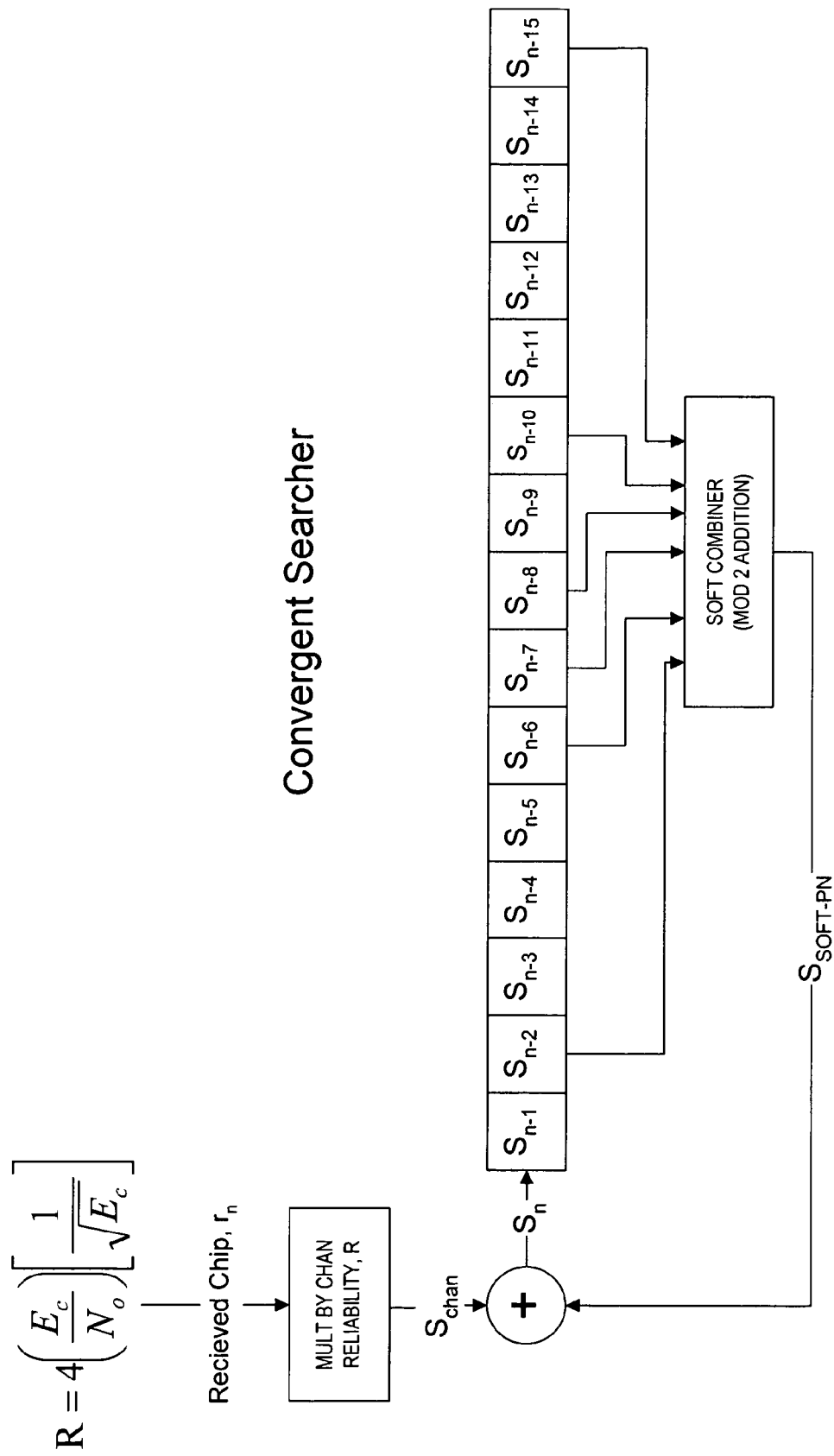
FIG. 18 is a diagrammatic representation of a convergent searcher operation in accordance with an exemplary embodiment.
Figure 19:
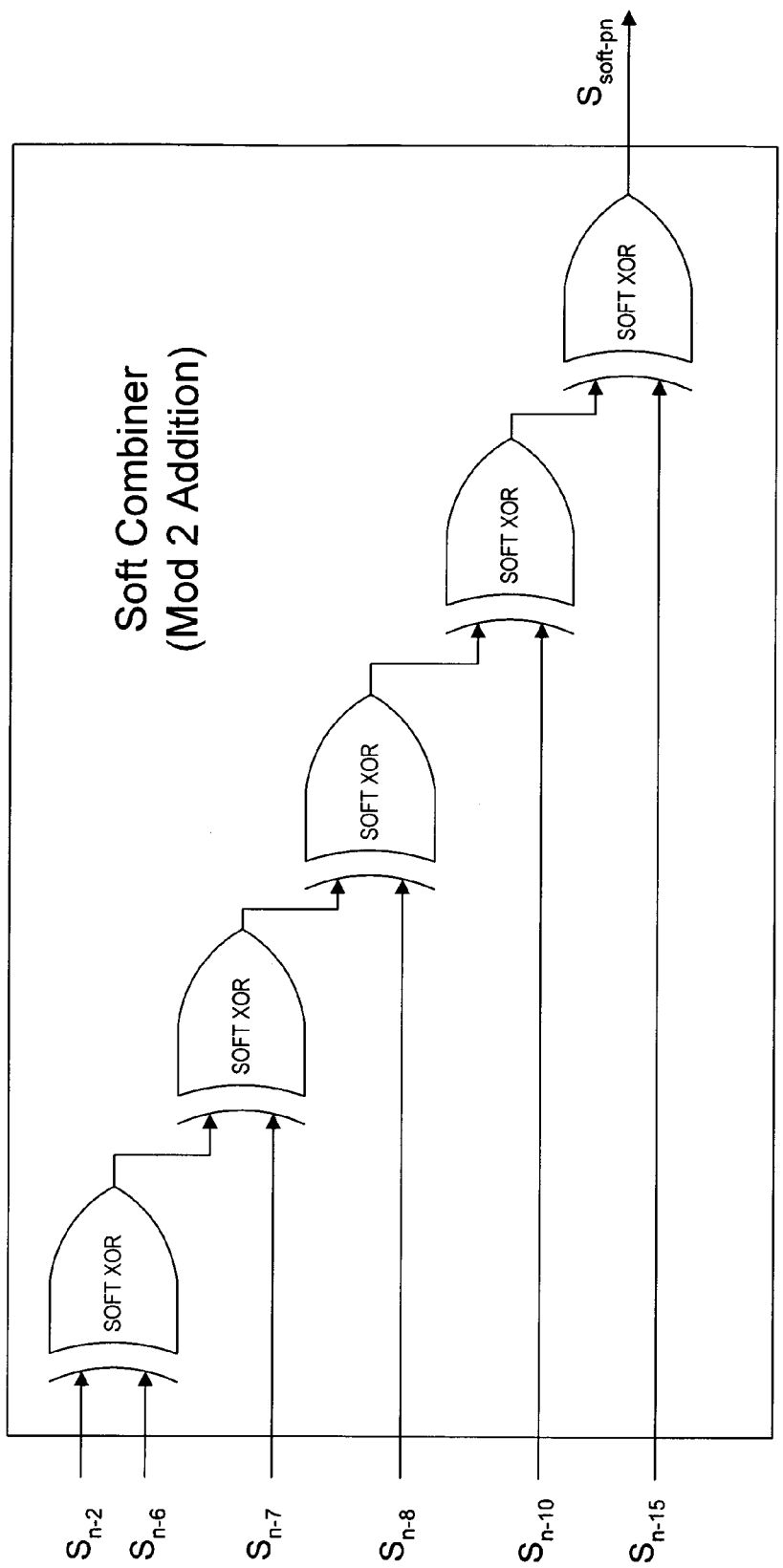
FIG. 19 is a diagrammatic representation of a soft combiner operation included in the convergent searcher operation of FIG. 18.

Finding the multi-path components in a timely manner so that they may contribute to the demodulation of the signal is one of the design challenges in a CDMA receiver implementation. Searching refers to the process of finding multi-path components in a rapidly changing environment. The processor 20 allows for enhanced searcher operation. The convergent searcher function described below with reference to FIGS. 18-19 is a distinct algorithm that allows for fast acquisition of multi-path components and enhances the performance of the CDMA receiver in a rapidly changing multi-path environment.

The processor 20 includes a scheme that does not require separate buffering for the windowed searching operation. As mentioned previously, conventional implementations generally consist of instantiations of "fingers" operating synchronously upon the samples in parallel. The processor 20 serially processes each multi-path one at a time where each iteration through the data is termed a "virtual finger." In addition, channel estimates performed by conventional ASIC hardware are performed by dedicated hardware in addition to the demodulation specific circuitry. The processor 20 does not have this limitation. The same circuitry can be used both for demodulation and channel estimation.

The way that the samples are buffered helps in the operation of the processor 20. In an exemplary embodiment, a three buffer scheme is used which gives access to the entire delay spread of the sub-chip samples to be demodulated by the processor 20. This minimal buffering scheme avoids the time delay of a two buffer scheme where the two physical buffers switch roles once the buffer receiving chips is full. Further, the buffering scheme has an entire multi-path spread worth of digital samples available during each processing iteration. In an alternative embodiment, a single dual-port memory is used to implement the buffering scheme.

Figure 14:
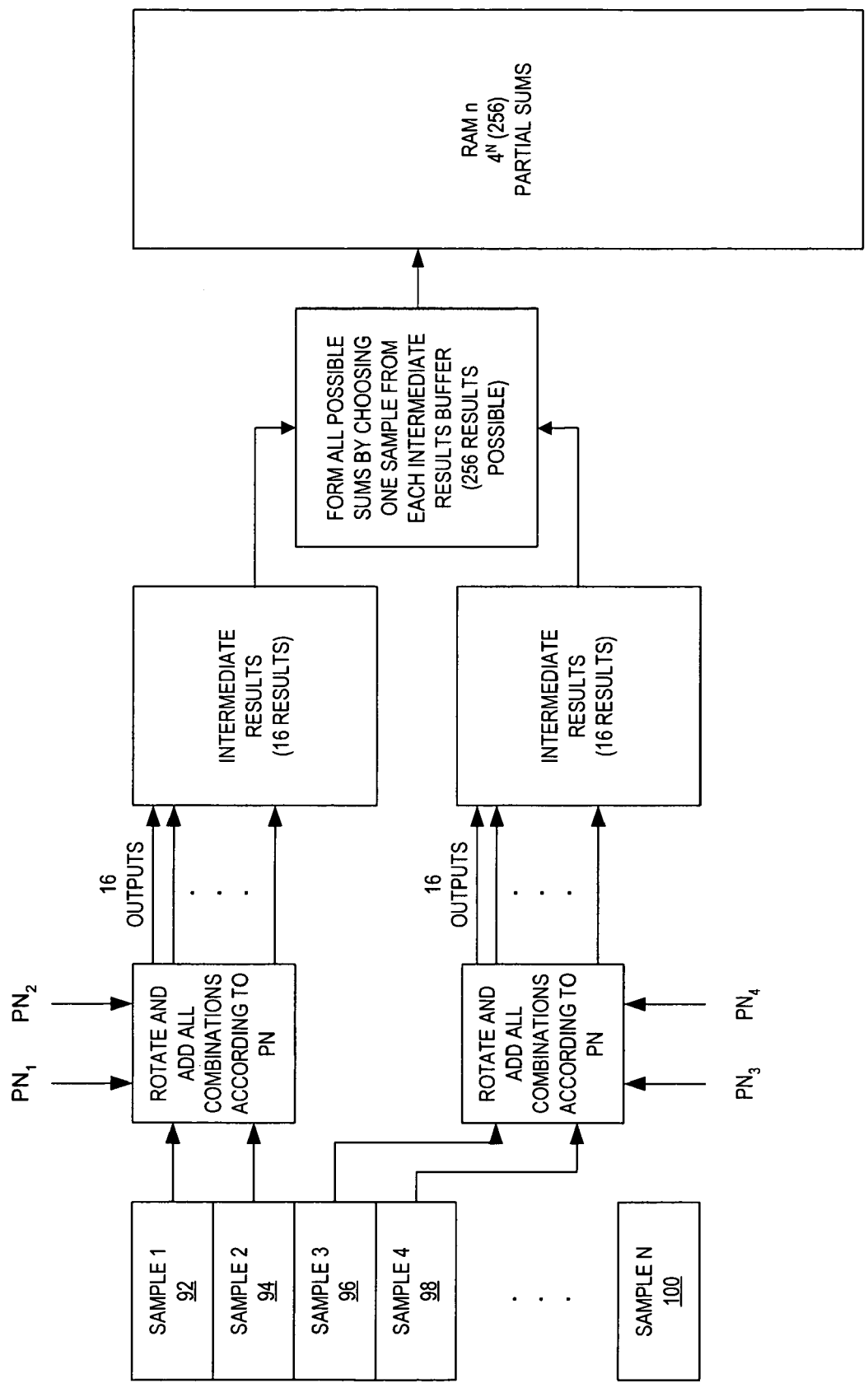
FIG. 14 is a diagrammatic representation of a first phase of an exemplary windowed search process.

FIG. 14 illustrates a first phase of an exemplary windowed search process. The process takes a set of digital complex samples 92, 94, 96, 98, and 100 and determines the correlation of these samples with various hypothesis. In the first phase, all combinations of 4 adjacent chips (samples 92, 94, 96, 98, and 100) are computed for a number of adjacent sets of 4 chips.

Figure 15:
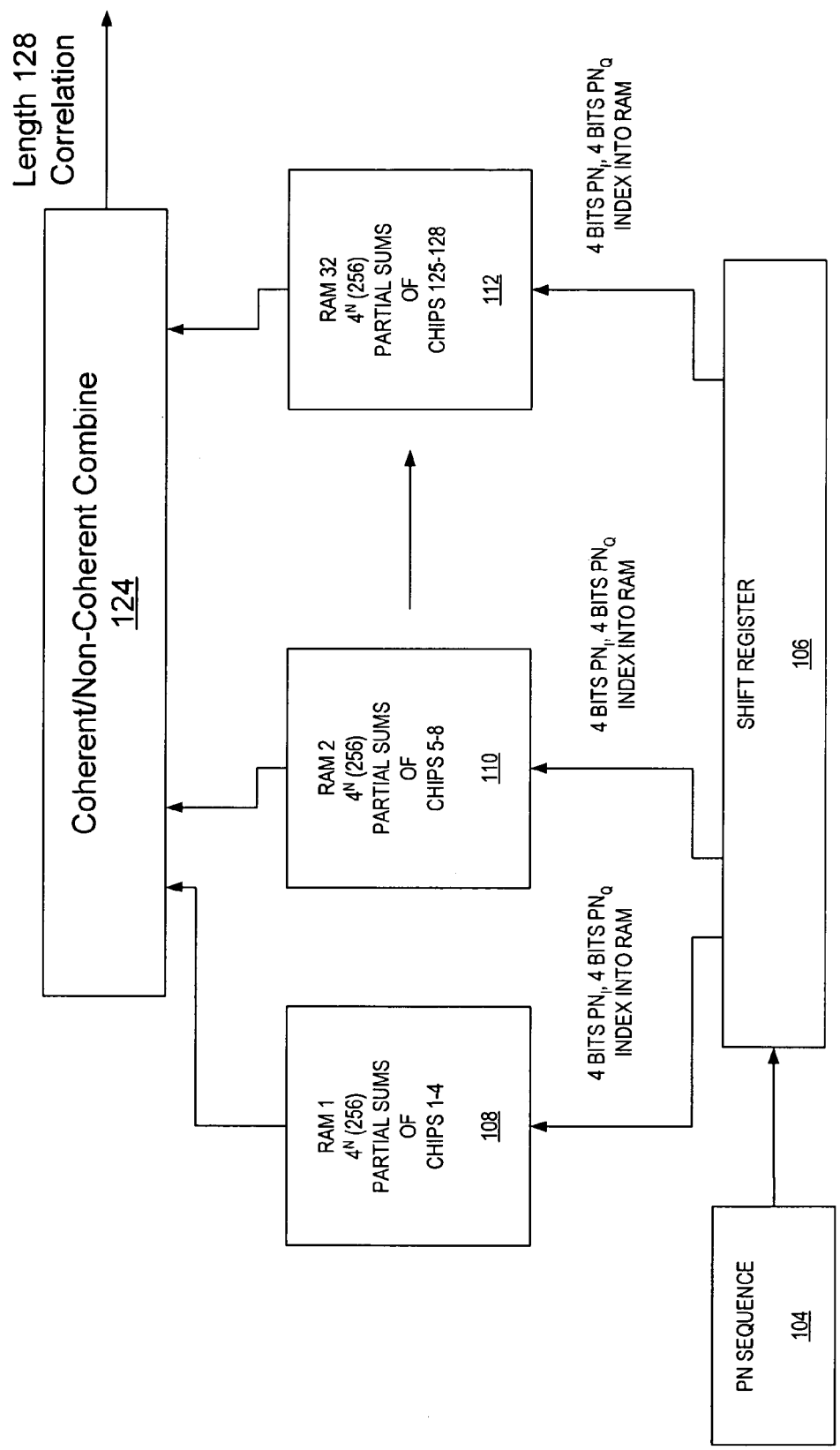
FIG. 15 is a diagrammatic representation of a second phase of an exemplary windowed search process.

FIG. 15 illustrates a second phase of the exemplary windowed search process. In the second phase, the computed combinations from phase one are used to find correlations over multiples of 4 chips. The correlations can be coherent and non-coherent. In the example shown, 128 correlations are found.

In an exemplary embodiment, a PN sequence 104 is received by shift registers 106. Shift registers 106 direct processed chips from the PN sequence 104 to a number of RAM devices (e.g., RAM 1-32). RAM device 108 includes, for example, partial sums of chips 1-4. RAM device 110 includes partial sums of chips 5-8. RAM device 112 includes partial sums of chips 125-128. Correlations from the RAM devices are combined using a combining apparatus 124.

The computation of phase one can be amortized across a large number of hypothesis such that it becomes negligible in the analysis. Advantageously, the number of computations becomes close to a factor of 4 reduction relative to conventional algorithms, given a sufficiently large set of PN hypothesis to be correlated against.

Conventional techniques for searching for CDMA multi-paths typically involve a "windowed" search where correlations are made within a specified window of chips of known energy, looking for a correlation that is greater than a specified threshold. This function is performed with a separate finger in the conventional correlator called a searcher.

Figure 16:
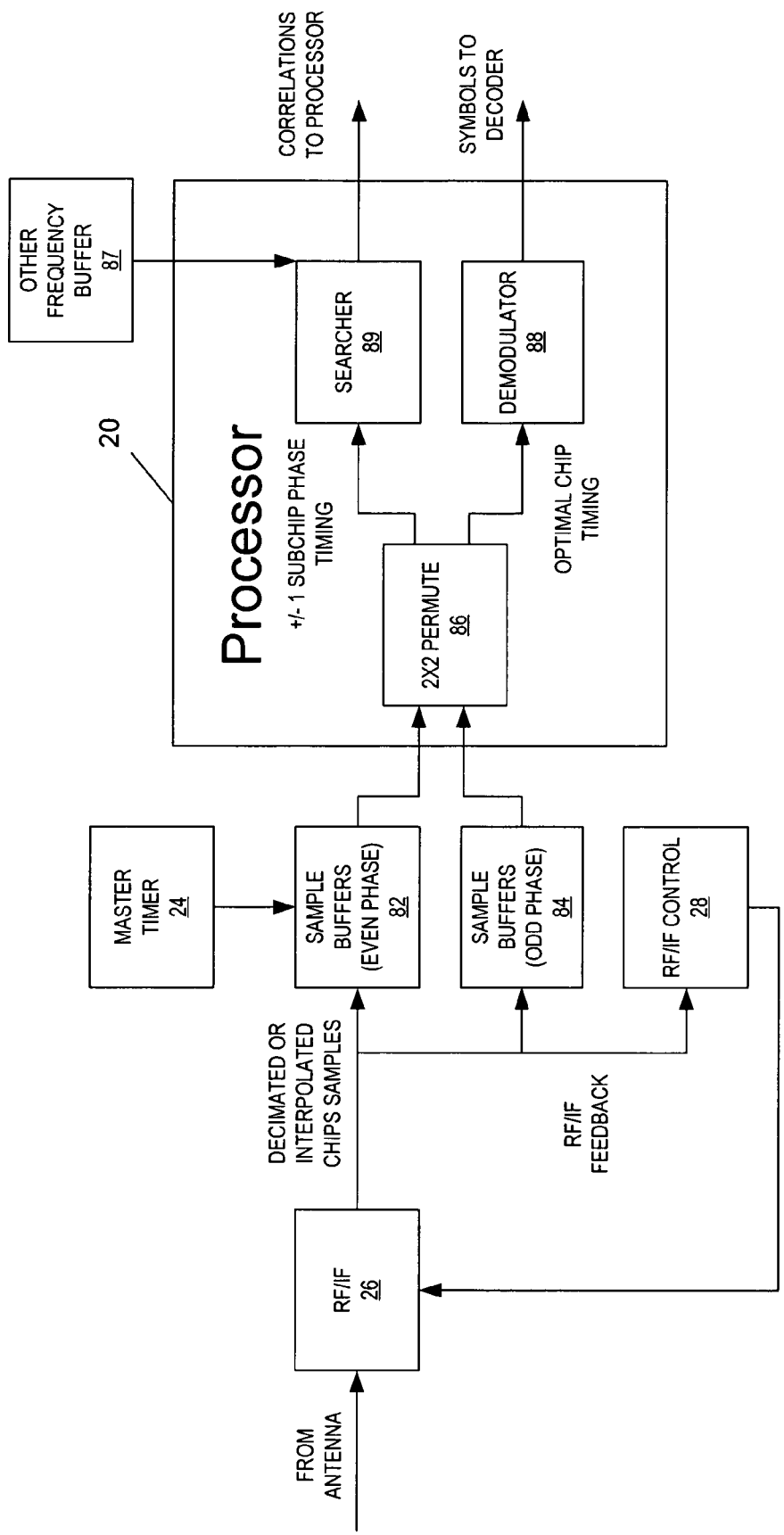
FIG. 16 is a diagrammatic representation of a windowed searcher implementation in accordance with an exemplary embodiment.

The processor 20 described with reference to FIG. 2 can perform a windowed search. An additional search functionality referred to as a convergent searcher is described below with reference to FIGS. 20-21. Referring now to FIG. 16, the processor 20 receives samples from sample buffers 82 and 84. The sample buffer 82 provides even phase samples and the sample buffer 84 provides odd phase samples. A 2×2 permute block 86 supplies a demodulator 88 with on-time samples such that the signal energy is maximized. The other set of sample buffers is for use with a searcher 89. The searcher 89 gets either the odd phase or the even phase samples, whichever is not used by the demodulator 88, whenever the searcher 89 and the demodulator 88 contend for the same memory block.

After acquisition, the searcher 89 operates on samples that are either $\frac{1}{8}^{th}$ chip early or $\frac{1}{8}^{th}$ chip late, but this slight degradation in energy impacts operation of the searcher 89 only minimally.

In operation, the windowed searcher function performs a sufficient number of correlations, then shuts down until a new block of data is available. As such, hardware idle cycles are avoided. In an exemplary embodiment of a frequency search feature, a buffer 87 is used to store digital samples obtained at a different frequency than an original frequency. Using an additional buffer has the advantage of storing samples for possible use later. Alternatively, the digital samples obtained at a different frequency can be placed in sample buffers 82 and 84 for a receive iteration and a processing iteration.

Figure 17:
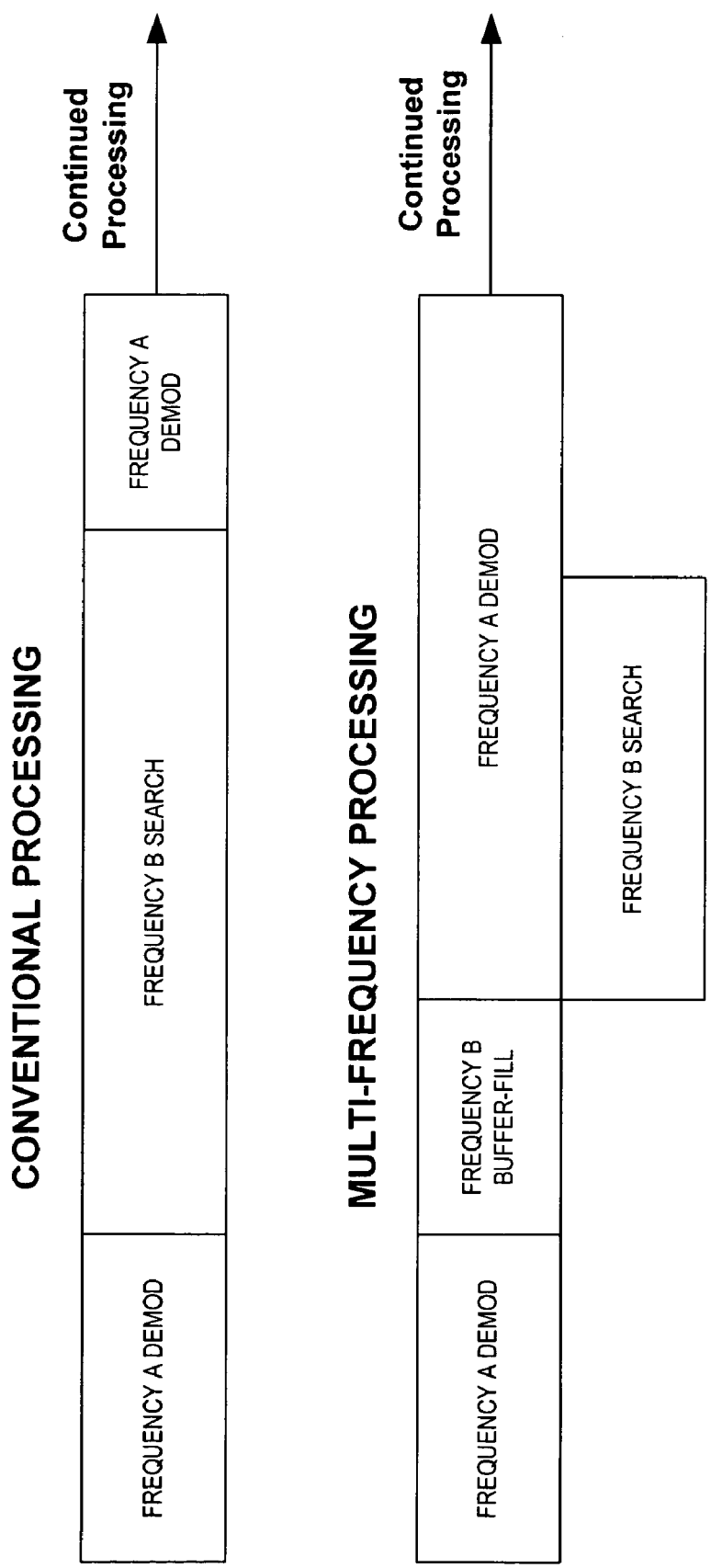
FIG. 17 is a diagrammatic representation comparing a frequency search feature of an exemplary embodiment to conventional processing.

FIG. 17 illustrates a frequency search feature of an exemplary embodiment compared with frequency search accomplished by conventional processing. In an exemplary embodiment, the processor 20 allows for baseband processing of signals while the RF is either shut-off or tuned to a different frequency. One benefit of this technique is a more effective inter-frequency search.

FIG. 17 shows that a search for base stations at other frequencies can be performed "off-line" after an initial buffer fill. One benefit is that the time-consuming process of testing various PN offsets via coherent and non-coherent combinations of correlations can be performed while tuned to the demodulation frequency. This potentially enhances system performance by either: reducing the amount of time necessary for making other frequency measurements, or allowing for less data loss from the current frequency assignment during other frequency measurements.

In an exemplary embodiment, the frequency search feature utilizes the same sample buffers used with the original frequency. The sample buffers receive the digital samples from the new frequency in one iteration and process them in a next iteration. After the original frequency is returned to, the sample buffers continue in use. In another exemplary embodiment, a separate buffer is used for new frequency, such as buffer 87 described with reference to FIG. 17. Use of a separate buffer has the advantage of maintaining the digital samples received at the new frequency even after returning to the original frequency.

FIG. 18 illustrates a convergent searcher operation. A received chip, $r_n$, is multiplied by channel reliability, R, to obtain a channel measurement, $S_{channel}$. Channel reliability can be computed from the equation:

$$R = 4\left(\frac{Ec}{No}\right)\left[\frac{1}{\sqrt{Ec}}\right]$$

The convergent searcher operation converges to the correct PN state using noisy chip measurements of the pilot. Channel measurements are used as a soft input and added to a soft output feedback from a soft combiner 91. This soft input is used to compute log-likelihoods. The soft combiner 91 performs a mod 2 addition to a group of channel measurements, $S_{n-1}$ though $S_{n-15}$. The soft combiner 91 can be implemented by a series of soft XOR operations as described with reference to FIG. 19. A soft XOR operation is a combining operation where the output $S_T$ from inputs $S_1$ and $S_2$ is defined by the following mathematical relationship:

$$S_T = \ln\left(\frac{\frac{e^{S_1+S_2}}{(1+e^{S_1})(1+e^{S_2})} + \frac{e^{-(S_1+S_2)}}{(1+e^{-S_1})(1+e^{-S_2})}}{\frac{e^{S_1-S_2}}{(1+e^{S_1})(1+e^{S_2})} + \frac{e^{-(S_1-S_2)}}{(1+e^{-S_1})(1+e^{S_2})}}\right)$$

In an exemplary embodiment, the soft XOR operation is implemented via a look-up-table.

Advantageously, the convergent searcher operation of FIG. 18 acquires PN synchronization without a priori knowledge of a last known PN like conventional searchers. The convergent searcher operation is capable of finding dominant multi-paths in fewer operations than a windowed searcher operation. Other advantages possible by the convergent searcher operation include the following. First, the operation provides for rapid acquisition of strong pilots that may be missed by a conventional windowed searcher when the path comes in rapidly. Second, the operation enables neighbor set maintenance during idle mode to be performed much more rapidly, which results in a 2× increase in stand-by time for a mobile device. Third, the operation provides for rapid acquisition.

FIG. 19 illustrates a detailed implementation of the soft combiner 91 of FIG. 18. The convergent searcher operation of FIG. 18 is specific to the PN I (In-Phase) sequence for and defined by the recursion:

$$I_n = I_{n-15} + I_{n-10} + I_{n-8} + I_{n-7} + I_{n-6} + I_{n-2}$$

The Ec/No for quick convergence (around 0 dB) of this technique is higher than the power at which the pilot currently operates. In an exemplary embodiment, the base station dedicates slots of time at which the pilot signal is transmitted at 100% of the operating power.

Figure 20:
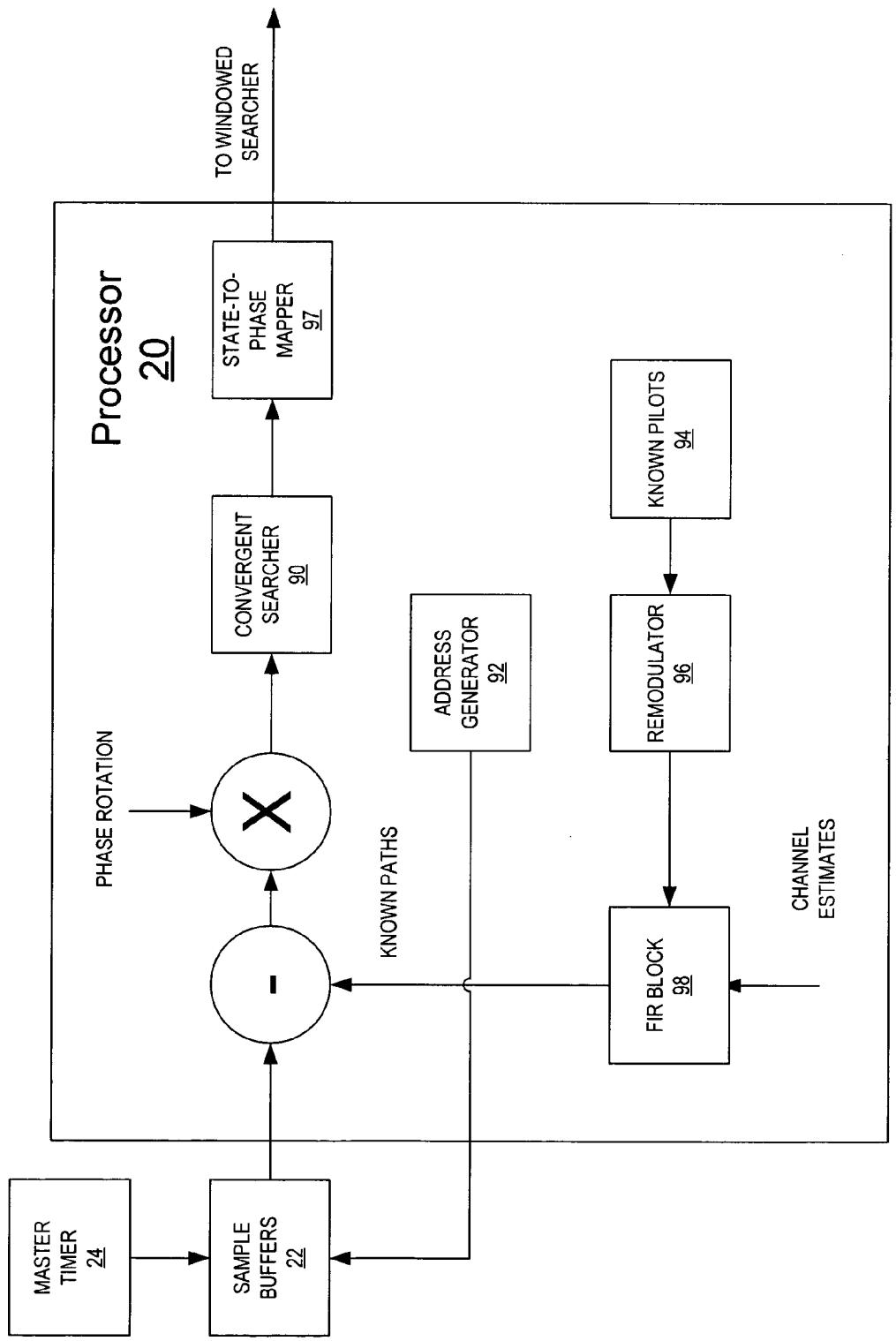
FIG. 20 is a diagrammatic representation of a convergent searcher implementation in accordance with an exemplary embodiment.

FIG. 20 illustrates an exemplary implementation of the convergent searcher operation by the processor 20. The convergent searcher 90 receives samples including a phase rotation from a subtraction of samples from the sample buffers 22 and known paths from a FIR block 98. FIR (finite impulse response) block 98 is a pulse shaping filter. Known paths 94 are re-modulated by a re-modulator 96 and provided to the FIR block 98 along with channel estimates.

Figure 21:
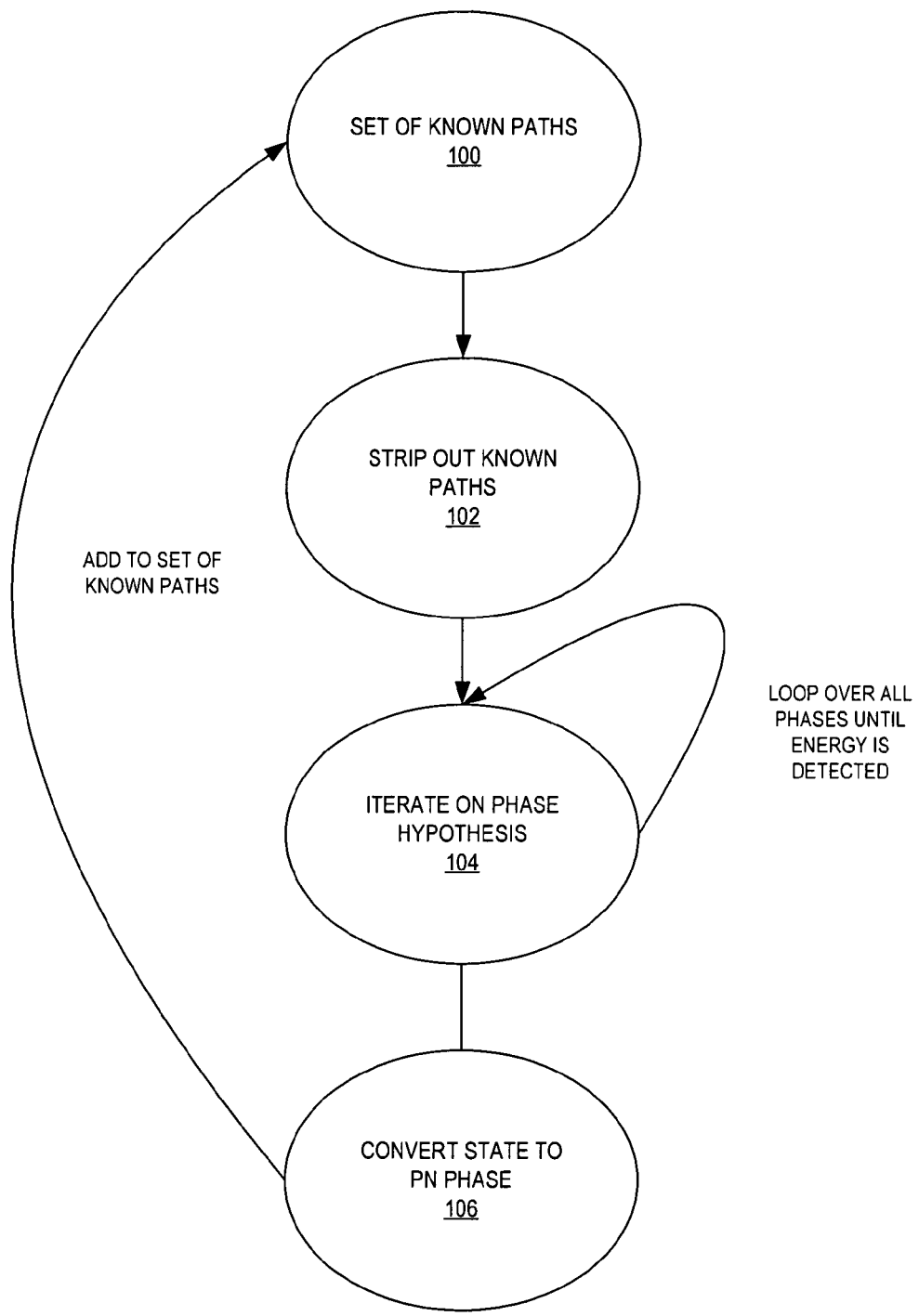
FIG. 21 is a state diagram depicting operations in the convergent searcher implementation of FIG. 18.

FIG. 21 illustrates a state diagram depicting convergent searcher operations performed by the processor 20. In operations 100 and 102, the current set of known paths (which is empty during acquisition) is re-modulated and subtracted out. This separation aids in finding the weaker multi-paths once the stronger ones have been detected. In addition, the instantaneous fading of strong multi-paths aids in this process.

The phase rotation is introduced before the convergent searcher block because phase rotation of the multi-path is not known. In an operation 104, the phase rotation hypothesis is iterated upon. Once the phase rotation aligns with the phase of the strongest unknown pilot, convergence is indicated. Hard decisions are made on the soft-decision states, and this state is mapped to a PN phase in an operation 106 which is sent to the windowed searcher for verification and accurate measurement.

Figure 22:
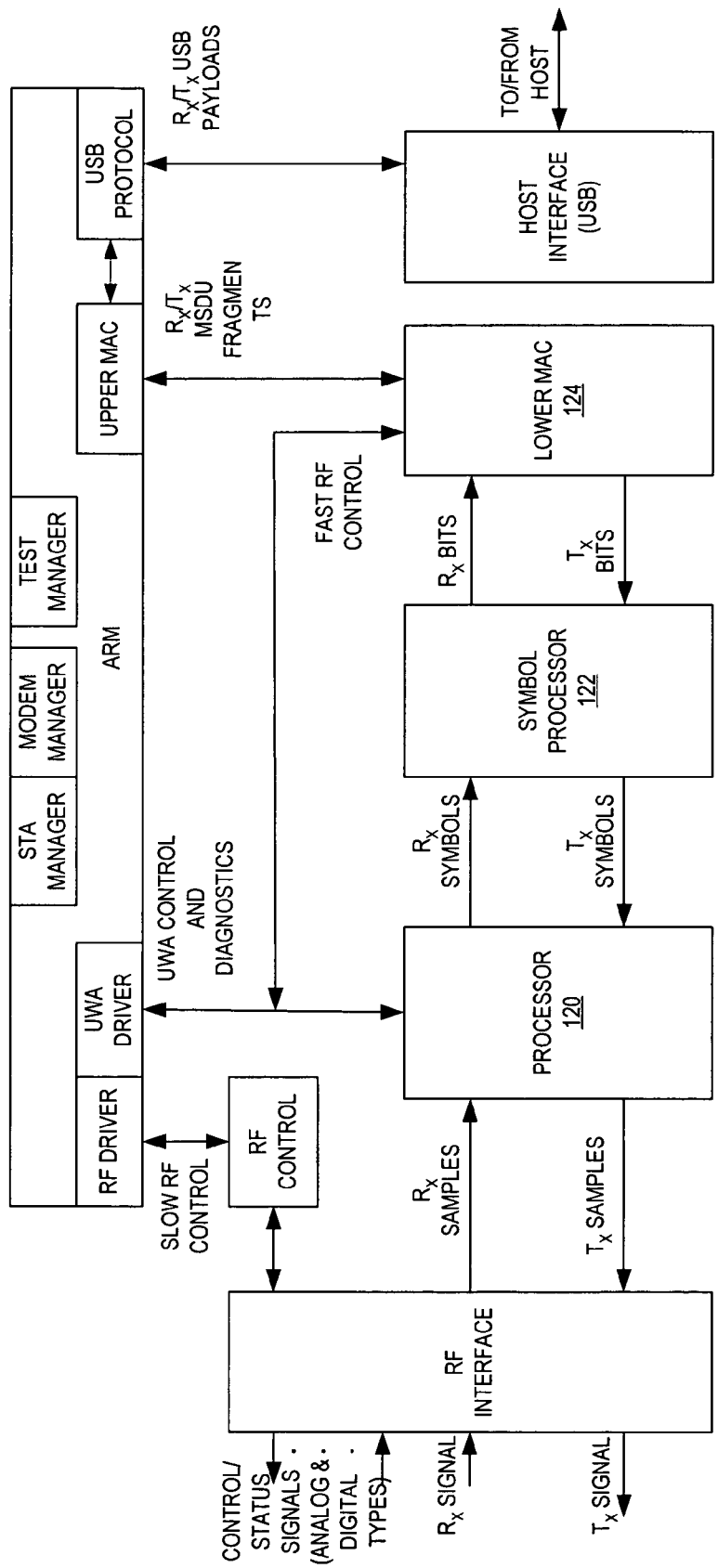
FIG. 22 is a diagrammatic representation of a communication system in accordance with an exemplary embodiment.

In an exemplary embodiment, the processor 20 described with reference to FIG. 2 can be adapted for use with 802.11 specifications. The adapted processor is referred to as processor 120 and is described with reference to FIG. 22. As known by a person of skill in the art, 802.11 refers to a family of specifications developed for wireless LAN technology. 802.11 specifies an over-the-air interface between a wireless client and a base station or between two wireless clients.

In general, 802.11 applies to wireless LANs and provides 1 or 2 Mbps transmission in the 2.4 GHz band using either frequency hopping spread spectrum (FHSS) or direct sequence spread spectrum (DSSS). The 802.11a specification is an extension to 802.11 that applies to wireless LANs and provides up to 54 Mbps in the 5 GHz band. 802.11a uses an orthogonal frequency division multiplexing encoding scheme rather than FHSS or DSSS. The 802.11 b specification (also referred to as 802.11 High Rate or Wi-Fi) is an extension to 802.11 that applies to wireless LANS and provides 11 Mbps transmission (with a fallback to 5.5, 2 and 1 Mbps) in the 2.4 GHz band. 802.11 b uses only DSSS. The 802.11g specification applies to wireless LANs and provides 20+ Mbps in the 2.4 GHz band.

The processor 120 includes features, such as branch support, indirect addressing via dynamic initialization of address generators, instruction pointers, vector-oriented instructions, configurable data path, and customized processing units. Vector-oriented instructions refers to execution of multi-element operations, thereby avoiding frequent access of program memory.

The processor 120 can include processing units that are customized for the common vector processes inherent to demodulation. For example, a Unit A is optimized for a convolution operation where a convolution output is calculated each clock. A Unit B is optimized for FFT functionality where a Radix-4 butterfly is performed each clock. A Unit C is optimized for other vector operations including: de-spreading, vector addition, vector subtraction, dot product, and component-by-component multiplication. Preferably, each of the units have individual clock-trees that are implicitly enabled by the instruction set when a particular unit is used.

FIG. 20 illustrates an exemplary system incorporating the processor 120. The processor 120 performs demodulation operations. A master control within the processor 120 fetches instructions from a program RAM and executes the instructions via processing units A, B, and C. The input to the processing units is either from buffers that contain the original samples from the A/D, or from other buffers that contain intermediate results.

When the processing is completed by the firmware stored in the program RAM, the communication symbols are burst over to a symbol processor 122. The symbol processor 122 does the de-mapping, de-interleaving, and decoding and, at this point, the decoded bits are sent to a MAC (media access control) 124. On the transmit side, the processor 120 is used to perform the FFT of the transmitter functionality.

Figure 23A:
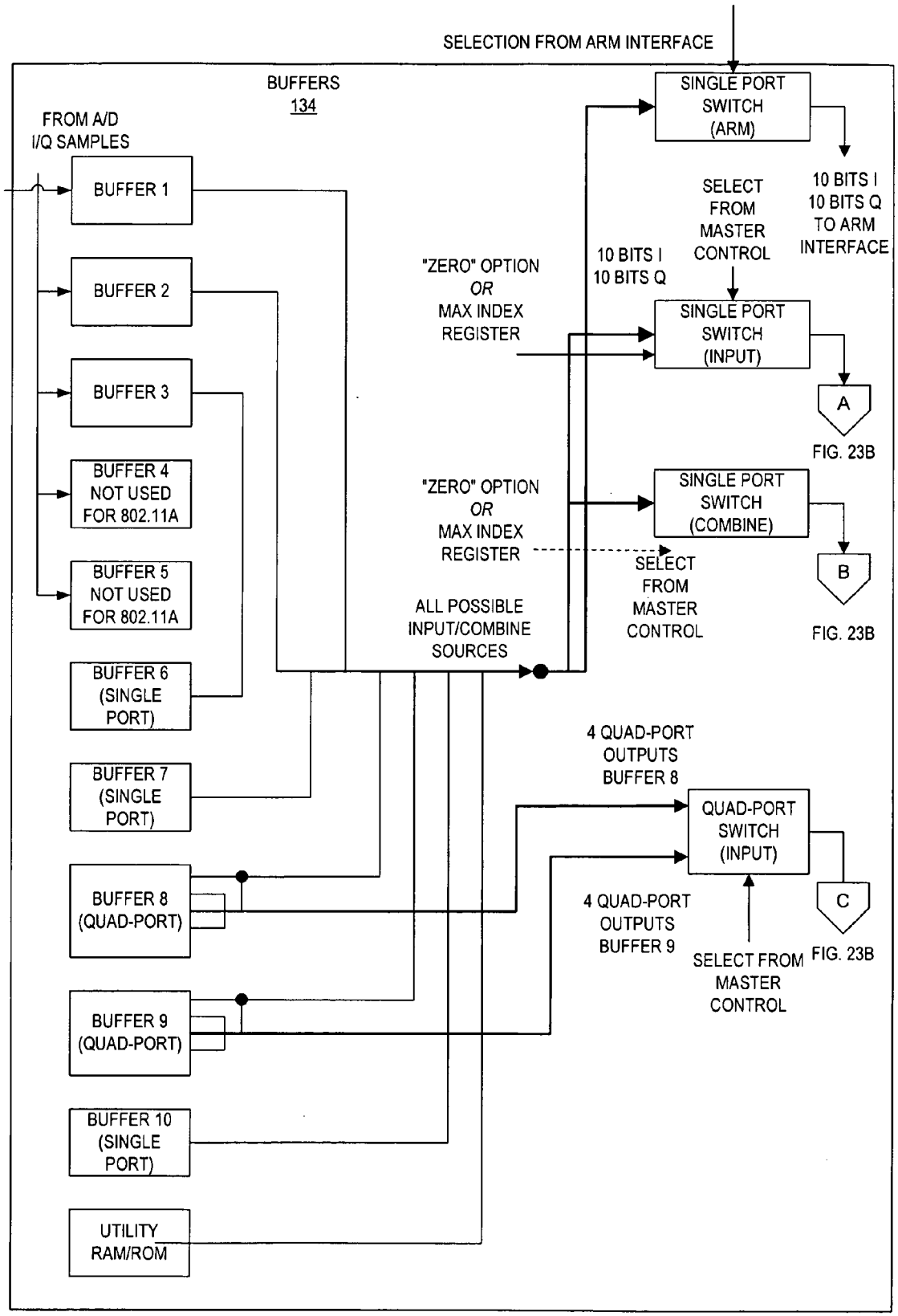
FIG. 23 is a diagrammatic representation of the processor of the communication system of FIG. 22.

FIG. 23 illustrates a portion of the processor 120 including buffers 132, a Unit A 134, a Unit B 136, a Unit C 138, a master control 140, a program memory 142, an ARM interface 144, and buffers 146. The master control 140 controls the processor 120. For example, the master control 140 controls the sequence of instructions in program memory from either sequential incrementing of the Instruction Pointer or Conditional/Unconditional Branching from the instructions in program memory. The master control 140 also controls the synchronization of the processor 120 with the synchronous sample control and the routing of the parameters in the instruction bus to the appropriate places in other blocks. The master control 140 also contains the state machine responsible for operating multi-cycle instructions.

The Instruction Pointer is a state variable describing the current instruction in program memory to be executed. The Instruction Pointer is adjusted by either a sequential increment or based upon program flow control. The Instruction Pointer is stalled during the operation of a multi-cycle vector operation.

Figure 24A:
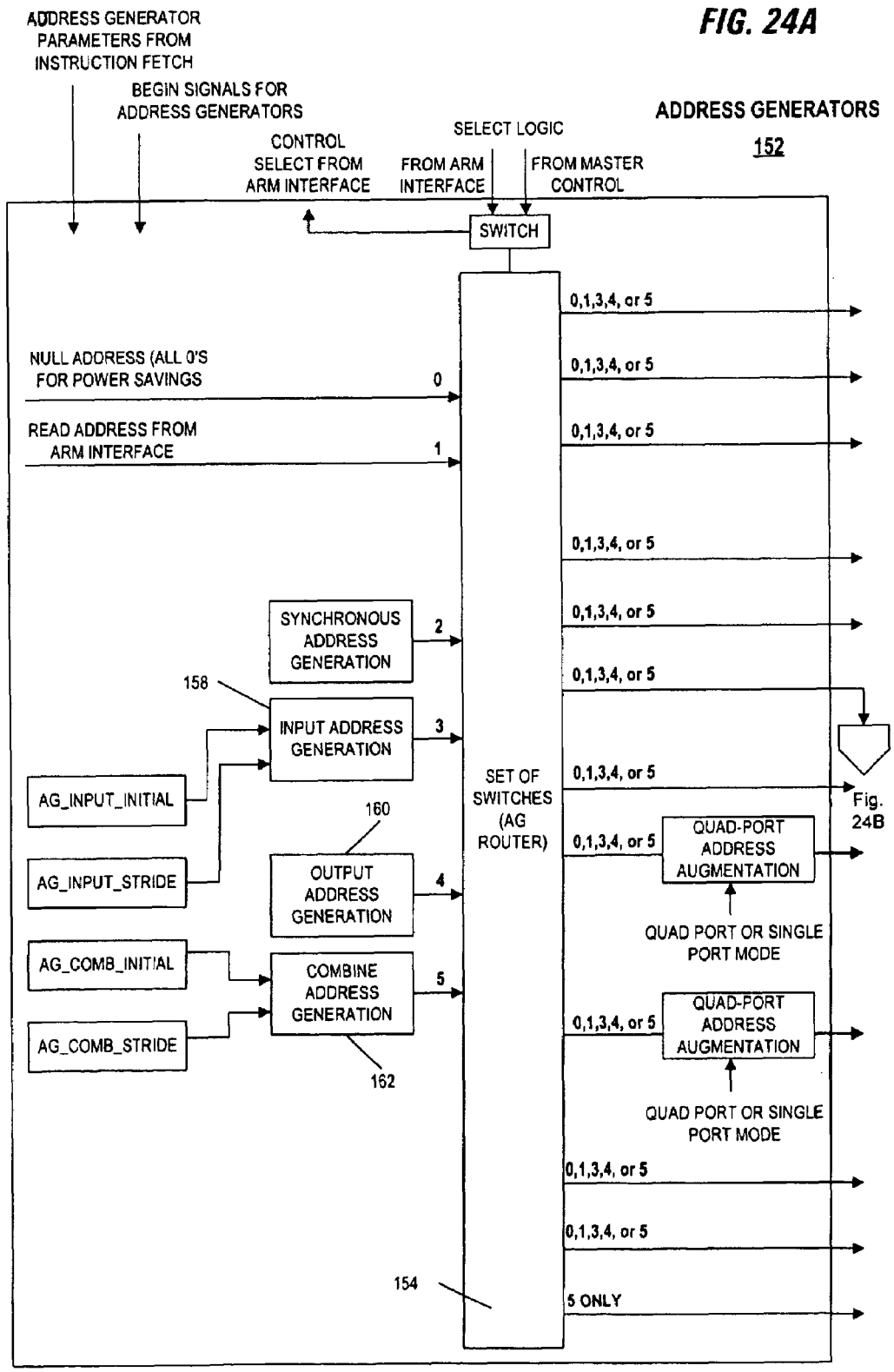
FIG. 24 is a diagrammatic representation of the processor of the communication system of FIG. 22.
Figure 24B:
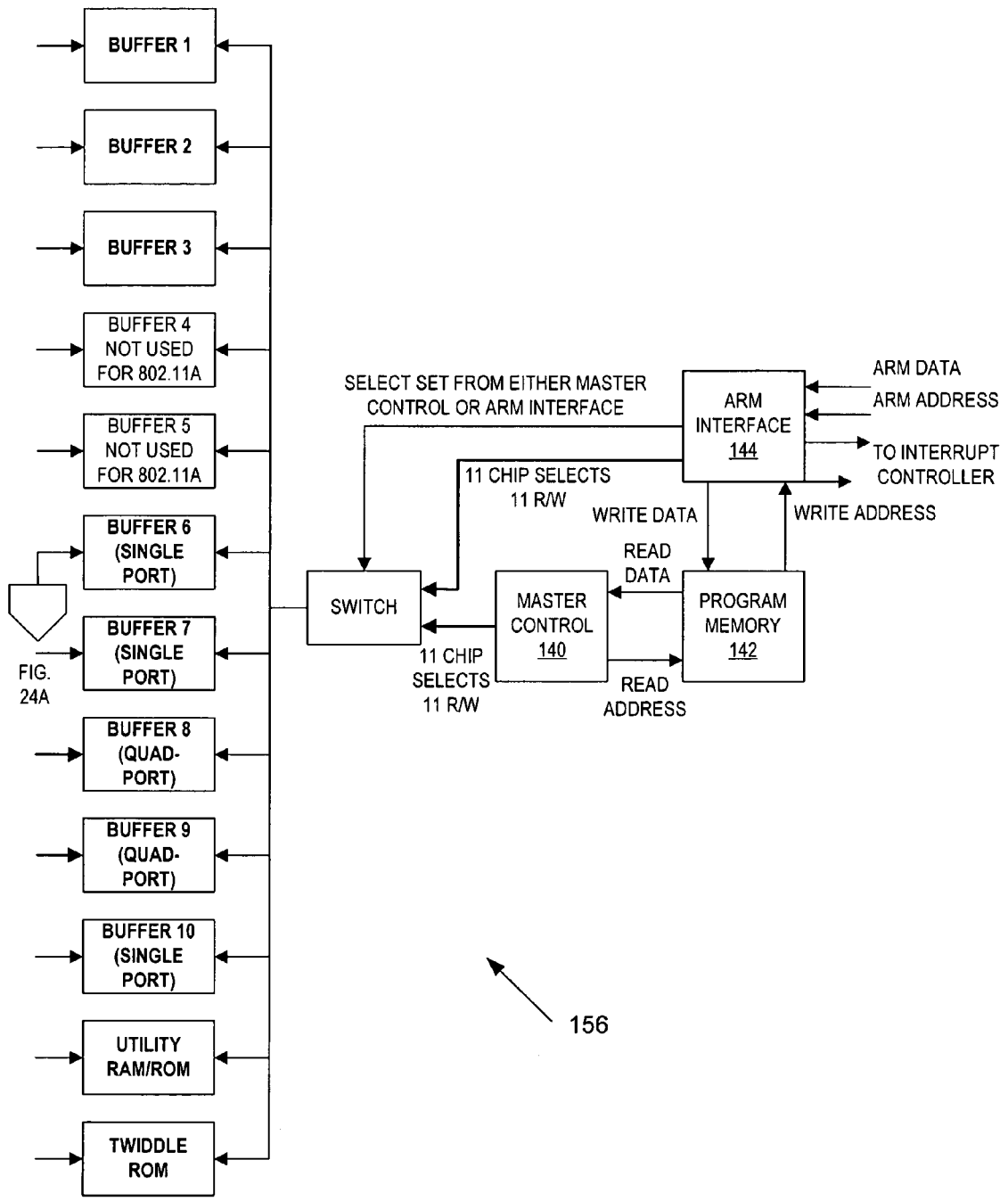
Figure 25:
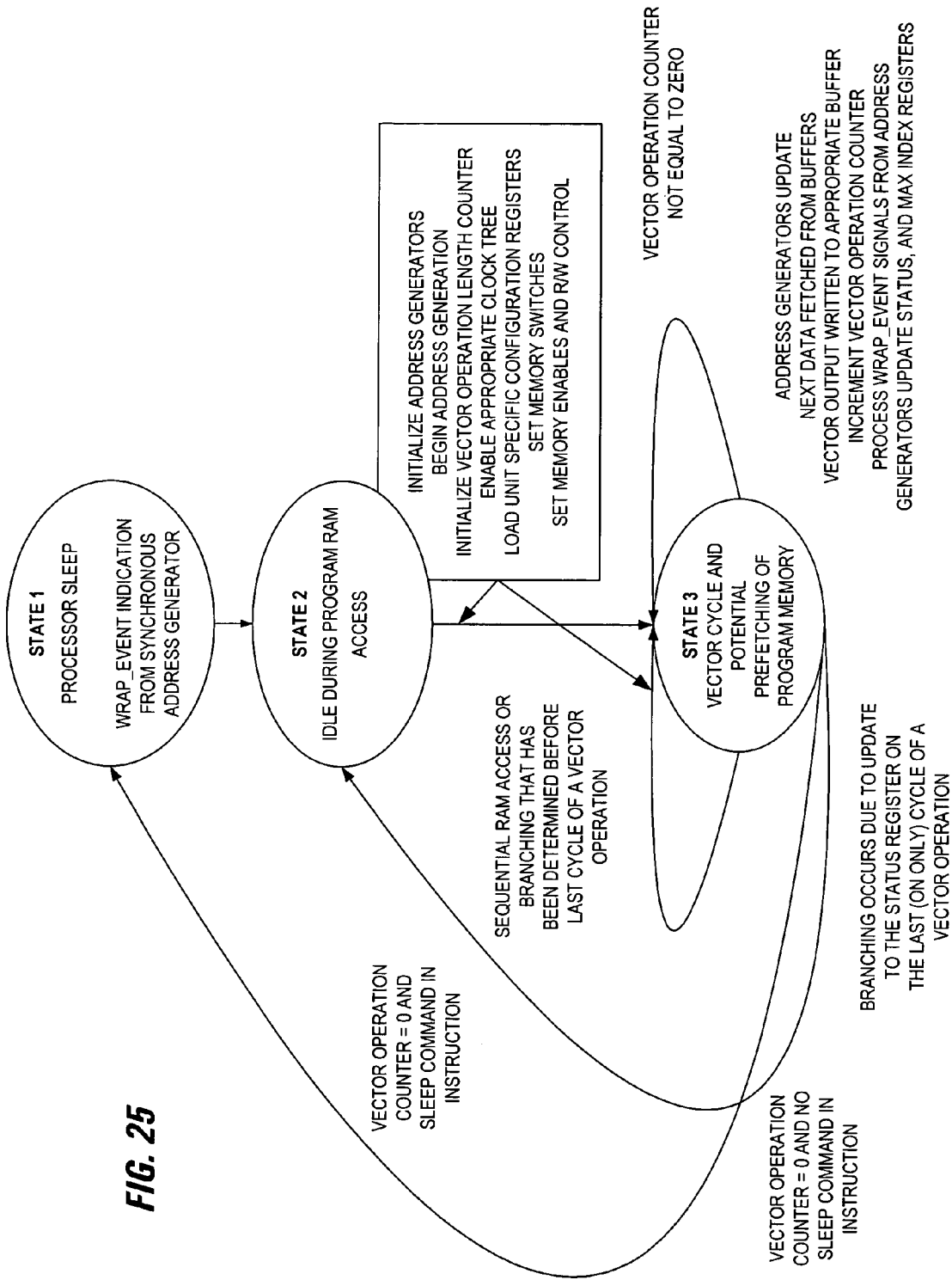
FIG. 25 is a state diagram depicting operation states of the control state machine of the communication system of FIG. 23.

FIG. 24 illustrates a portion of the processor 120 including address generators 152, switches 154, and switches 156. FIG. 25 shows exemplary operation states of the master control state machine 140. From State 1 (SLEEP state), a signal indicates that a buffer fill has occurred, starting an iteration and transition to State 2 (Program RAM Access). The following events occur during State 2: Initialization of Address Generators from the instruction fields, Initialization of Vector Operation Length Counter, turning the correct clock-trees on, setting of appropriate memory switches, and setting of appropriate memory enables and proper selection of R/W.

At this point, the Input/Combine/Output buffers are in place and enabled for read/write as appropriate. The address generators are at the correct values for fetching data from the buffers appropriate for the particular vector arithmetic being executed, and the output of this vector arithmetic is sent to the correct address of the appropriate buffer. Alternatively, the Max_index and Status Time Stamps can be used as either the input source or the combine source in lieu of buffers. Or alternatively, one of the following 3 registers of the Address Generators can be the output in lieu of buffers: AG_Input_Initial, AG_Comb_Initial, and AG_Comb_Stride.

During State 3, data is read every clock from the appropriate buffers, and output is ready for the output buffer either every clock or at the decimated rate for Unit C. During State 3, the Input Address Generator and the Combine Address Generator potentially generate a Wrap_Event signal which updates the Sample Buffer access to the next physical buffer by enforcing the 3-buffer scheme.

If there is a Unit C operation, then additionally there is circuitry to track either a maximum or above threshold of its output. At the end of the Unit C vector operation, there exists either the first occurrence of a value over the threshold specified in the instruction field along with the contents of the Vector Operation Count that during this value as a timestamp, or the maximum value of the vector instruction output along with the contents of the Vector Operation Count that during this value as a time-stamp. The state variable Vector Operation Count is decremented each clock cycle. Zero indicates that the vector operation is complete and the current vector operation has reached an end. At this point, there is a high probability that the previous clock has the correct value of the next valid instruction to be executed, in which case the Program RAM data bus contains the correct value such that the State 2 idle state need not be transitioned. However, if the last (or only) clock of the vector operation has caused an update to the next instruction to be fetched (due to a branching condition being valid in that cycle), then a clock is required for the valid instruction to appear on the Program RAM data bus (State 2 is visited).

The SLEEP field set to 1 in the instruction indicates completion of the iteration where the Vector Instruction State Machine remains until SYNC_WRAP_EVENT is asserted.

Figure 26:
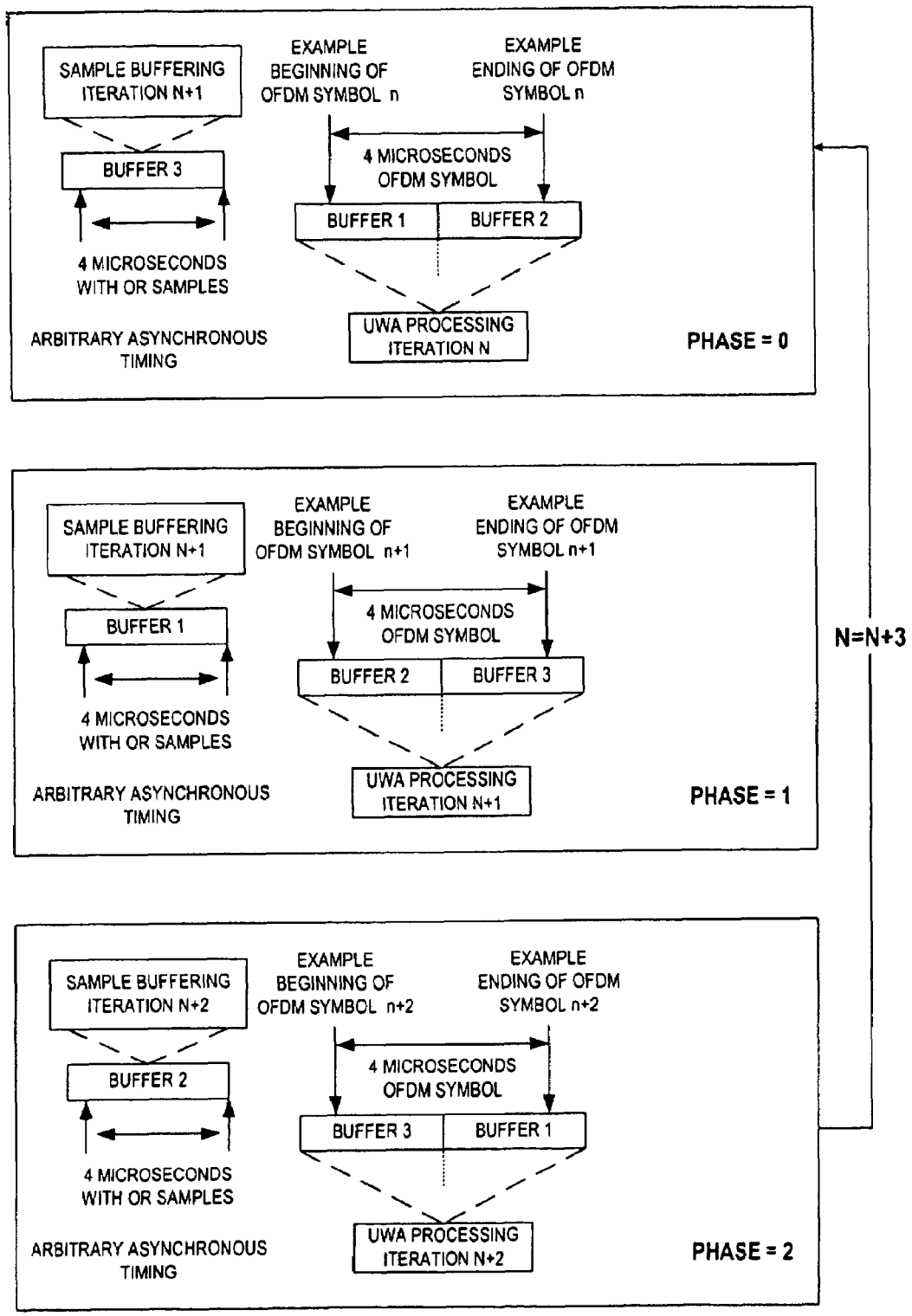
FIG. 26 is a diagrammatic representation of a buffer operation in accordance with an exemplary embodiment.

As shown in FIG. 26, at any given time, the processor 120 has access to two of the buffers that are logically functioning as one. The buffering of scheme of FIG. 24 is substantially the same as the buffering scheme described with reference to FIG. 4. During iteration N=O, Buffer 1 and Buffer 2 are serving as a single logical data source for the processor 120 operation. Those symbols whose earliest paths occur in Buffer 2 are not processed until iteration N+1 as shown in FIG. 26. Meanwhile, Buffer 3 is receiving the samples occurring during the processing of the logical combination of Buffer 1 and Buffer 2. During iteration N+1, the processor 120 processes those symbols whose earliest sample is in Buffer 2 while using the contents of Buffer 3 as the necessary later arriving samples which also must be present to complete the symbol processing.

The input buffers look like a contiguous logical buffer to the instruction set. Therefore, the master controller 140 keeps track of whether the address generator assigned to sample buffer has wrapped.

Referring again to FIGS. 23 and 24, Buffers 7-10 are channel asynchronous buffers. These are the subset of buffers that the instruction set references specifically and are not directly loaded with A/D samples. The address to these buffers are generated from the address generators 152. The mapping of the physical RAMs to its role (input/output/combination) is set by the switches 154 based upon fields in the processor 120.

FIG. 24 shows the role of the address generators used for the buffers. The address generator router (switches 154) is responsible for routing the address generator output to the correct RAM. The following are the possible routing options coupled with the corresponding instruction fields. As shown in FIG. 24, there are a number of possibilities for the address lines of each of the RAMs (each possible source is assigned a number between 1-5). This would most likely correspond to a MUX in front of each of the RAMs with the switch settings enforcing one of the options shown in the figure.

The address generators 152 are instantiated three times—a generator 158 for input, a generator 160 for combine, and a generator 162 for output. The address generators 152 form the vector that can be expressed in MATLAB notation as a:b:c which means that a is the initial address, b is the "stride" through the buffer (the value the address generator adds each clock of the vector operation), and c is the ending value which is a dependent parameter of the vector operation length.

Figure 27:
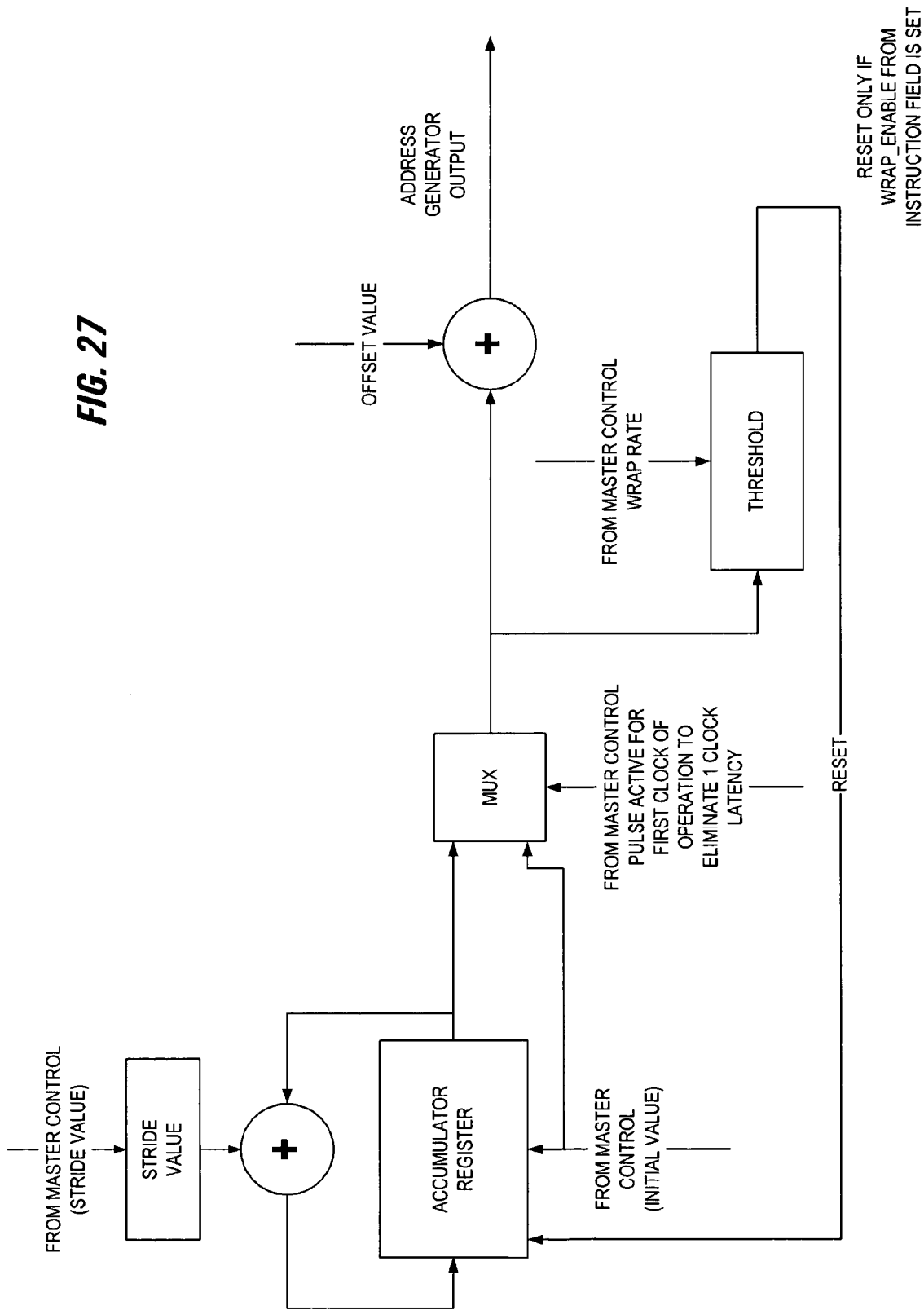
FIG. 27 is a diagrammatic representation of the address generators of FIG. 24.

FIG. 27 illustrates a more detailed view of address generators 152. Address generators 152 can be directly loaded with a particular initial value and stride. In addition, the address generators 152 can have an initial value and stride loaded indirectly via the output of a previous Unit C operation. The register load field in the instruction is set to allow an "indirect" address mode access during a future instruction. There is a wrapping functionality built in which causes a reset of the address when the address generators 152 reach a specified value. Therefore, when wrapping enable is set, address generators 152 output a:mod(floor(b/64), wrapping_rate):c. When wrapping occurs, an indication is sent to the master control 140 in case the wrapping was due to an access of the logical sample Buffer so that the master control 140 may update the buffer enables and R/W to reflect the current physical buffer. In addition, an offset can be added to the address output of the previous buffer which now becomes a:mod (floor(b/64), wrapping_rate:c+offset. The offset addition may be a concatenation of LSB's and MSB's so that an adder would not be physically required (i.e., the offset would be an integral multiple of $2^n$ would n is the number of LSBs.)

Figure 28:
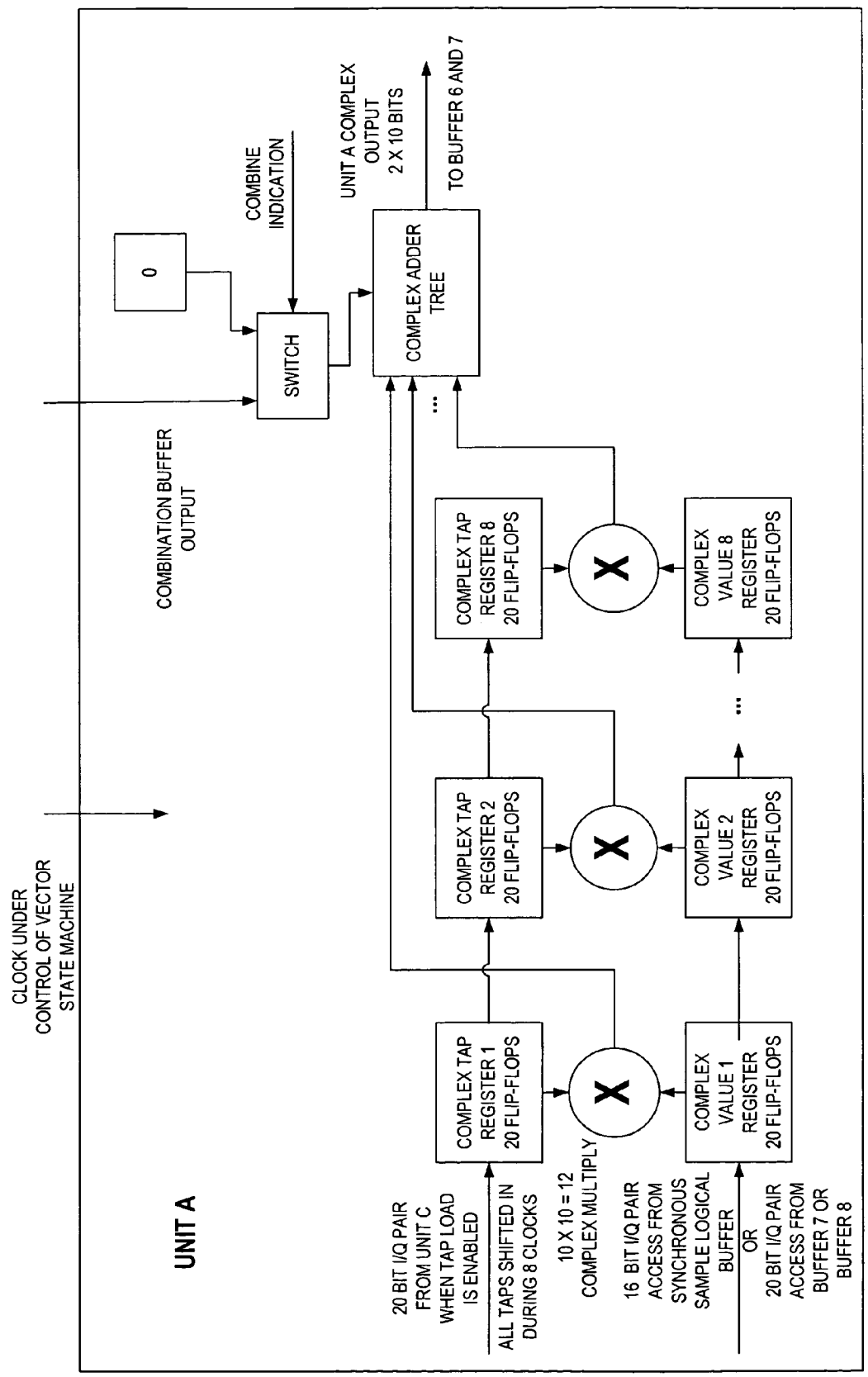
FIG. 28 is a diagrammatic representation of Unit A of the processor of FIG. 23.

FIG. 28 illustrates Unit A. Unit A 134 is the vector instruction engine responsible for performing a convolution (aka FIR filtering). An 8-tap FIR is performed in this mode as the constituent operation. There can be two modes of Unit A operation: Tap Loading and FIR Operation. In Tap Loading, the master controller 140 asserts a signal for the duration of the vector operation (which will be set to 8 to load all of the taps.) This signal causes the shifting in of taps values from the Input Buffer. In FIR Operation, the input of the FIR operation is physically from the Single Port Switch (input) and determined logically from the instruction field. This is the stream of data that is convolved with the taps. The convolved stream is added to the data stream from the Single Port Switch (combine) and determined logically from the instruction field.

In Tap Loading, the master controller 140 asserts the signal Unit_A_FIR for the duration of the vector operations. This signal causes the shifting of the Input Buffer contents through the data path with the calculated FIR filter value appearing at the output.

Figure 29:
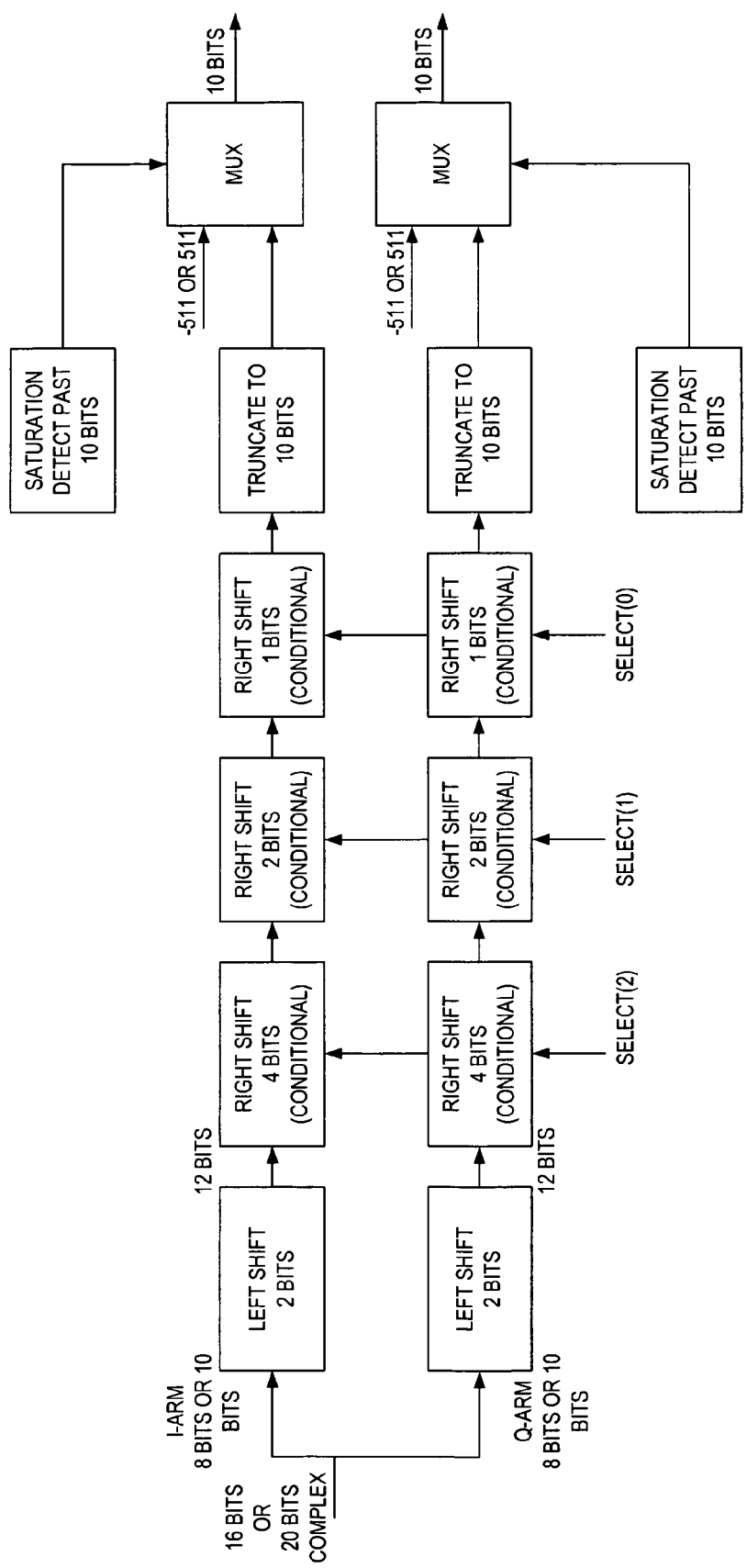
FIG. 29 is a diagrammatic representation of the input shifter of the processor of FIG. 23.

FIG. 29 illustrates the input shifter that allows the left shifting of the input data by 2, the right shifting of the data by 5, and everything in between. A saturation detect follows the left shifting operation to eliminate the need for saturation detect upon inversion. The bits in the SELECT field of the instruction map directly to mux settings as shown.

Figure 30:
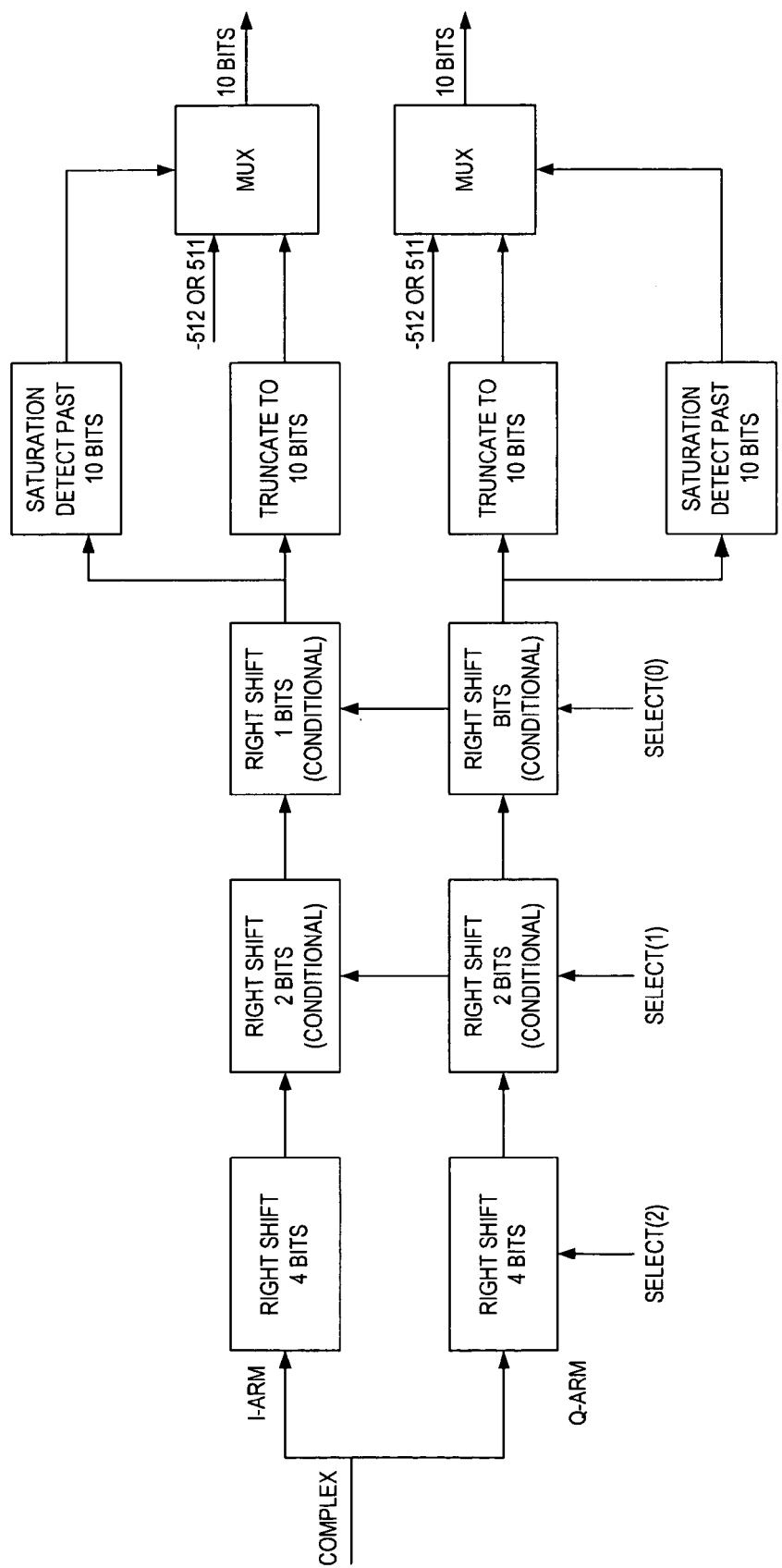
FIG. 30 is a diagrammatic representation of the output shifter of the processor of FIG. 23.

FIG. 30 illustrates the output shifter that allows the right shifting of the data by any shift between 0 and 7 inclusive. The bits in the SELECT field of the instruction map directly to mux settings as shown. The Output Shifter supports saturation detection for the situation where the output does not fit within the 10 LSBs after shifting.

Figure 31:
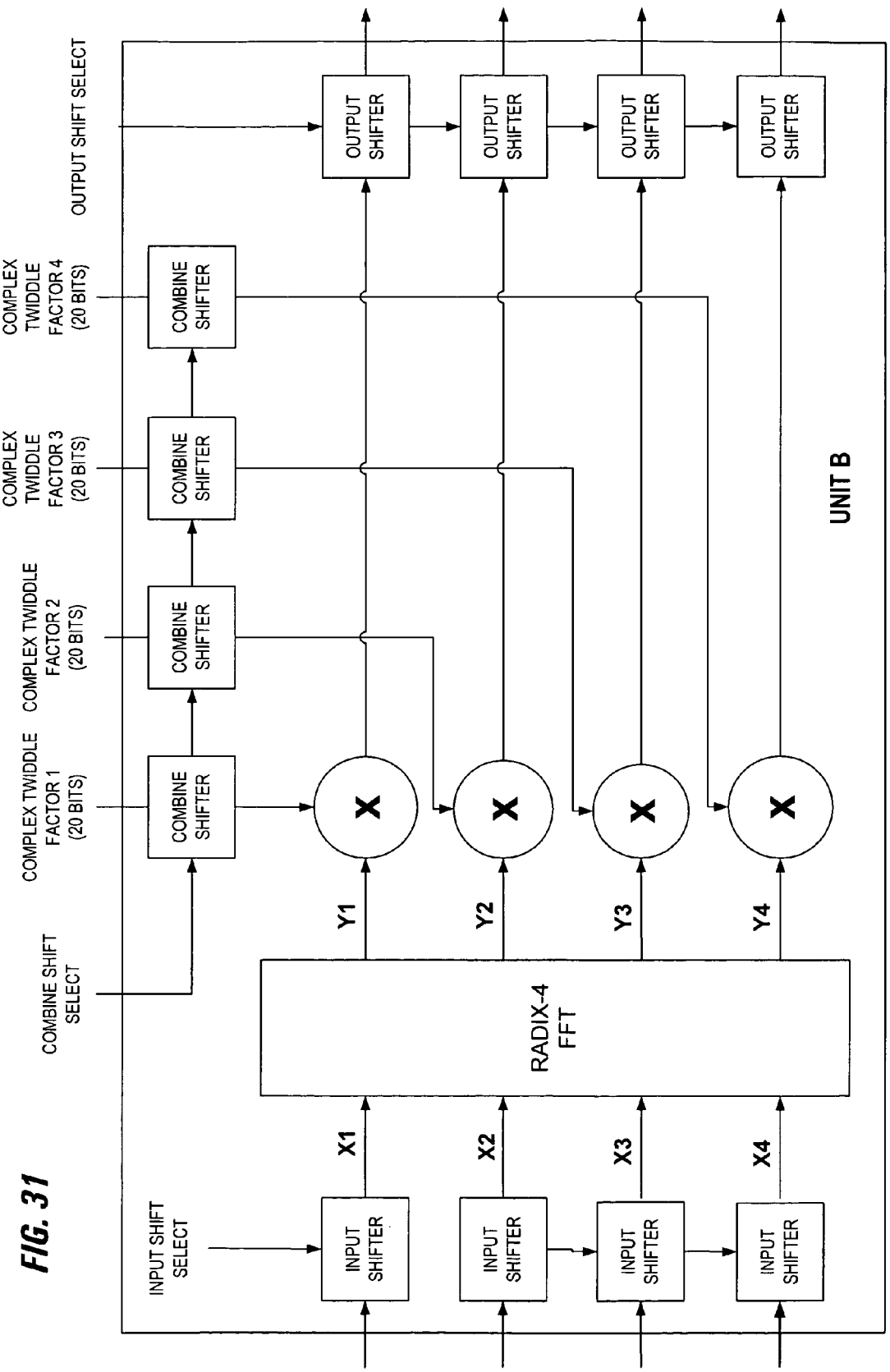
FIG. 31 is a diagrammatic representation of Unit B of the processor of FIG. 23.

FIG. 31 illustrates Unit B. Unit B handles the FFT operation which takes its input from one of two quad-port RAMs (Buffer 8 or Buffer 9) and outputs to one of two quad-port RAMs (Buffer 8 or Buffer 9).

The addresses for Unit B can actually be generated from the Unit B Augmented Address Generation. The Twiddle Factors sit in a separate ROM because they require 80 bits access (unlike the Utility RAM).

The Radix-4 FFT engine is optimized such that 8 complex additions are performed to produce 4 outputs. The Radix-4 consists of 2 sets of cascaded adders. The first set of adders produce the following partial sums based on the 4 complex inputs:

$P1=X1+X3$ $P2=X1-X3$ $P3=X2+X4$ $P4=X2-X4$

A second set of adders computes the outputs based upon the partial sums as:

$$Y1=P1+P3$$

$$Y2=P2-j*P4$$

$$Y3=P1-P3$$

$$Y4=P2+j*P4$$

where multiply by j is implemented via switching I and Q and inverting the I output. The output of each of the scalar twiddle factor multiplications will be truncated to 11 bits. Therefore, the output of the complex multiplier will be 12 bits. Bits [10:1] will be mapped to the output of the Unit B block.

Figure 32:
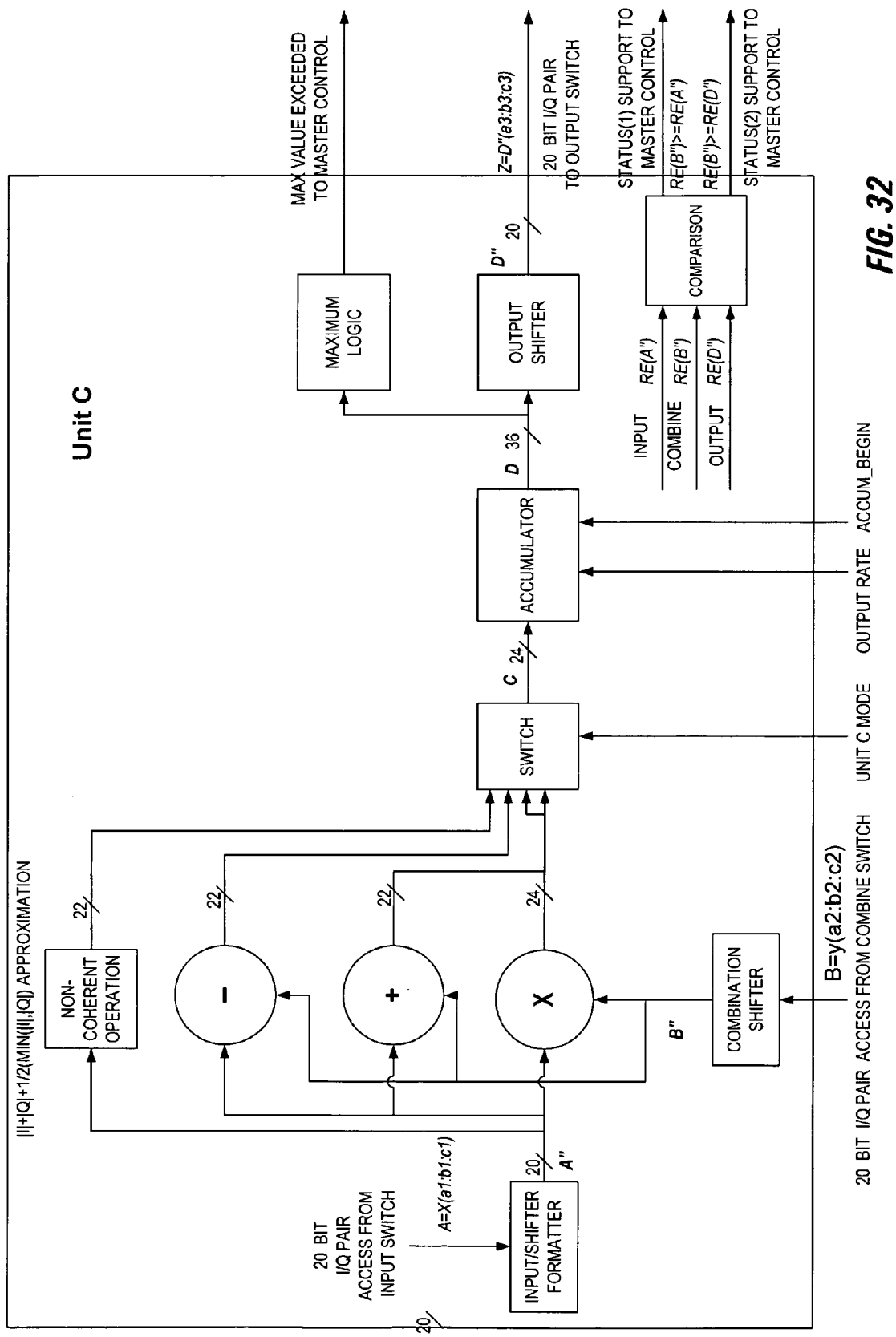
FIG. 32 is a diagrammatic representation of Unit C of the processor of FIG. 23.

FIG. 32 illustrates Unit C which serves as the vector instruction engine for those vector operations not specifically contained in Unit A (FIR functionality) and Unit B (FFT functionality). The maximum circuitry in Unit C keeps track of the max and the index of the max for a Unit C vector operation. When the current max for a particular vector operation is exceeded, a Max Value Exceed notification is sent to the Master Control which causes Master Control to latch the current value of the Vector Instruction Counter.

Table 1 below is a representation of the vector engine processing of Unit C. The inputs to the engine come from the buffers that are switched in as the Input Buffer and the Combination Buffer and are referred to as X and Y respectively in the Table. The output of the vector engine goes to the buffer that is switched in as the Output Buffer which is referred to as Z in the table. There are multiple operations that occur each clock in a pipelined fashion in such a way that one set of vector inputs is processed each clock. The intermediate variables A,A',A'',B,B''',C,D, and D'' are not directly output, rather are used to represent the processing of the Unit C vector engine.

TABLE 1

| Unit C Vector Arithmetic | |
|---|---|
| Input Selection (external to Unit C) | A = X(a1:b1:c1) |
| Comb. Selection (external to Unit C) | B = Y(a2:y2:c2) |
| Input Format | A' = A |
| | A' = real(A) |
| | A' = imag(A) |
| | A' = abs(real(A)) |
| | A' = abs(imag(A)) |
| Input Fixed Point Shift | A'' = A' × $2^n$ |
| | with saturation where |
| | n is a member of a subset of |
| | specific positive |
| | and negative integers. |
| Comb. Fixed Point Shift | B'' = B × $2^n$ |
| | with saturation where |
| | n is a member of a subset of |
| | specific positive |
| | and negative integers |
| Vector Operation | C = A'' + B'' |
| | C = A'' − B'' |
| | $C_i = A_i'' \times B_i''^*$ |
| | $C_i \cong |A_i''|$ |
| Accumulation | $D_n =$ |
| | Sum(C(Ln + 1:Ln + L)) |
| Output Fixed Point Shift | D'' = D' × $2^n$ |
| | with saturation |
| | where |
| | n is a member of a subset of |
| | specific positive |
| | and negative integers |
| Output Selection (external to Unit C) | Z = D''(a3:y3:c3) |

Unit C receives its stream of input from the output of the Single Port Switch (input) depicted in FIG. 23. The Input Address generator is used to index into the appropriate buffer and is represented in the Table via the MATLAB notation X(a1: b1: c1) which means that a1 is the initial address, b1 is the "stride" through the buffer (the value the address generator adds each clock of the vector operation), and c1 is the ending value which is a dependent parameter of the Vector Operation Length.

Unit C receives its stream of combine input from the output of the Single Port Switch (input) depicted in FIG. 20. The Combination Address generator is used to index into the appropriate buffer and is represented in the Table via the MATLAB notation Y(a2: b2: c2) which means that a2 is the initial address, b2 is the "stride" through the buffer (the value the address generator adds each clock of the vector operation), and c2 is the ending value which is a dependent parameter of the Vector Operation Length.

The vector operation is configured via the main switch depicted in FIG. 29. The following are four types of vector operations that Unit C supports.

Vector Addition—In general, Unit C performs complex addition of the input vector with the combination vector.

Vector Subtraction—In general, Unit C performs complex subtraction of the combination vector from the unit vector.

Vector Multiplication—In general, Unit C performs complex component-by-component multiplication of the input buffer with the combination buffer. This operation also performs the complex conjugate the contents of the combination buffer.

Magnitude—Unit C performs an accurate approximation vector component-by-component of the magnitude of the complex quantity originating from the input buffer. The combination buffer is not used in this mode. A good approximation for magnitude would be:

$$C_i = \mathrm{real}(A_i'') + \mathrm{imag}(A_i'') - \tfrac{1}{2}(\min(\mathrm{real}(A_i''), \mathrm{imag}(A_i'')))$$

Accumulation is the mechanism for performing a variety of required vector operations efficiently such as dot products, de-spreading, etc. The output of the vector operation is accumulated over a variable number of clocks and output at this decimated rate.

Figure 33:
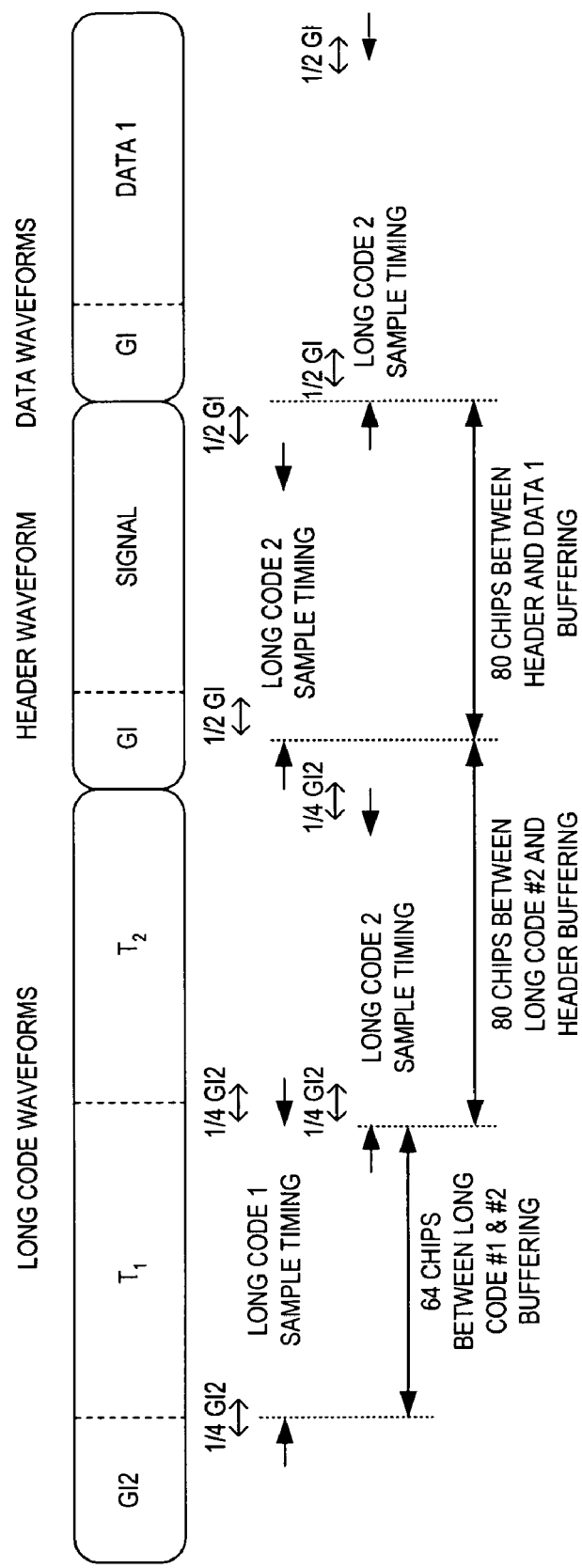
FIG. 33 is a diagrammatic representation of a timing diagram.

Once symbol timing is acquired, the state machine adjusts its time-domain timing to properly process the First Long-Code Sync, which starts 24 chips into the guard interval, or equivalently 8 chips before T1. After the First Long-Code is buffered (state 5), the state machine adjusts to the Second Long-Code Sync timing which starts place 8 chips before T2. The timing changes because the Second Long-Code Sync symbol occurs 64 chips after the First Long-code, while the processor 120 is buffered in 80 chip increments thus changing the timing by 16 chips. Subsequently, for the header symbol and the data symbols, the timing remains the same, at 8 chips before each symbol. The timing remains constant because the beginning of the header and data symbols take place in multiples of 80 chips after the Second Long-Code sync symbol. The sample timing of the two long syncs as well as the header and data symbols is shown in FIG. 33. It should be noted that ¼ of guard interval 2 (GI2) is equivalent to ½ of guard interval 1 (GI1) at a value of 8 chips.

In the frequency domain (i.e. after an FFT), buffer contents are no longer indexed by chip timing but by the sub-carrier number. The sub-carriers range in number from −32 to 31, but in reality only −26 to 26 are used (excluding the zeroth sub-carrier as well) since the extreme frequencies are set to zero. Since MATLAB allows only positive indexing, the sub-carriers are indexed from 1 to 64 within a buffer. If we exclude the zero sub-carriers, the indexing is 7 to 59. All sub-carriers contain modulated data except for the pilot sub-carriers which are at −21, −7, 7, 21 and indexed to 12, 26, 40, 54 within the buffers.

Figure 34:
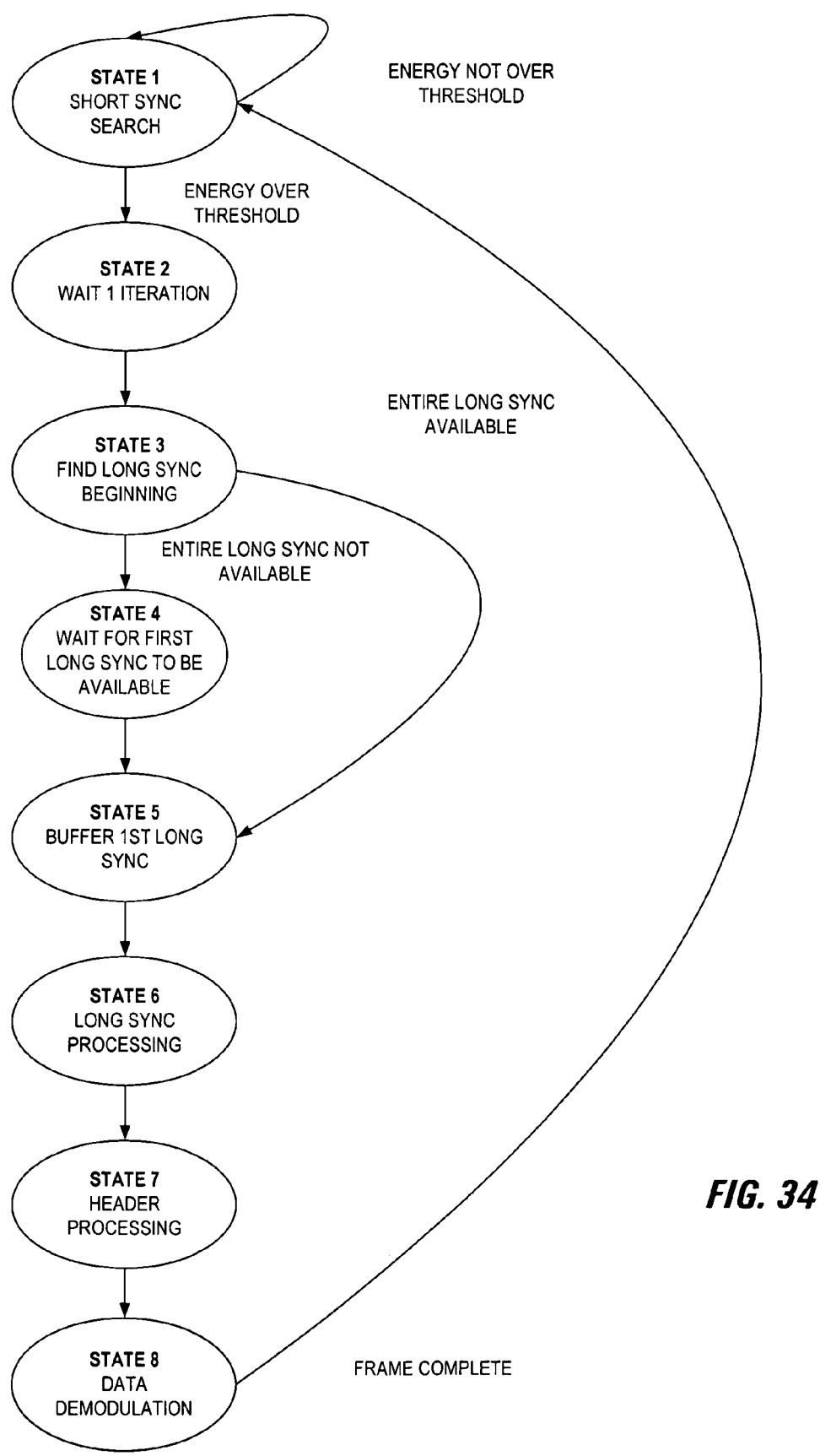
FIG. 34 is a state diagram depicting operation states for the instruction set of the processor of FIG. 23.

FIG. 34 shows the operation states used in the instruction set of processor 120. States 1-3 are used to obtain timing information. In particular, state 1 is used to obtain sub-symbol timing while state 3 is used to obtain symbol timing. States 4-6 continue to predominantly take place in the time domain where frequency offset is estimated and (mostly) corrected. Only state 6 contains some frequency domain processing wherein initial sub-carrier channel estimates are made based on the sub-carrier values of the combined Long-codes. State 7 handles Header processing while state 8 handles data processing. While State 7 and state 8 include some time domain processing (e.g. rotation of data to counter frequency offset) the processing predominantly takes place in the frequency domain. In State 8 in particular, both residual frequency offset and timing drift are estimated and corrected from and within the sub-carriers themselves.

In Short Sync Search (State 1), there are 10 repeated Short Sync symbols that are transmitted by the AP which spans 8 microseconds. Advantageously, the processor 120 only searches a fraction of samples for a short sync symbol. State 1 involves searching for a Short Sync symbol only at the end of the sample buffer. Since the iteration is 4 microseconds in duration, the requirement is that the RF/analog provides at least 4 microseconds worth of clean, valid short sync sequence to guarantee that the short sync sequence exists at the end of one of the buffers during at least one iteration.

In this state, the processor 120 only performs the processing required to find the 16 possible correlations against the known time domain short sync symbol. If one of these exceeds a threshold, then detection of a short sync symbol is assumed which gives us sub-symbol timing which will be stored for future use. If none of these correlation exceed a threshold, then the processor 120 goes to sleep until the next iteration.

Unit A is used for both of the channel filtering and the "matched filter" functionality that will compute all 16 correlations concurrently because both operations can support the 8× parallelism of this unit.

Unit C is used to form the non-coherent output of the matched filter ($I^2+Q^2$) and gauge the energy of the incoming samples which is required to normalize the matched filter outputs.

Instruction mapping of the processor 120 during State 1 includes a first iteration of 2 to build up 16 tap short sync matched filter at end of the buffer. The last 23 complex samples are input as determined by the 3-Buffer scheme into Unit A. Unit A holds off the output for the first 7 samples (as the box-car is filling) and outputs 16 correlation against the low half of the short-sync (complex quantity). The complex result is stored at the beginning of Buffer 6. Currently the 10 Isb's are discarded on output.

There is a second iteration of 2 to build up 16 tap short sync matched filter at end of the buffer. Again, the last 23 complex samples are input as determined by the 3-Buffer scheme into Unit A. Unit A holds off the output for the first 7 samples (as the box-car is filling) and, this time, outputs 16 correlation against the high half of the short-sync (complex quantity). The output of the correlation is added to the contents of Buffer 6 to build up to the full 16 sample correlation. The complex result is stored at the beginning of Buffer 7. Currently the 10 Isb's are discarded on output.

The processor 120 computes the non-coherent ($I^2+Q^2$) value of the 16 correlations. The phase of the short sync symbol is unknown—so the rotationally invariant quantity $I^2+Q^2$ is computed on the complex contents of Buffer 7 to wipe out the phase information. The maximum tracking circuitry is enabled such that the value of the maximum along with the sample index at which this occurs are stored in registers.

The processor 120 finds the signal energy for the baseline comparison. The energy of the received signal (or noise) will not be known with certainty due to potentially non-ideal AGC functionality, therefore the matched filter output needs to be normalized by the received energy level. This functionality is performed by Unit C using the last 33 samples using the non-coherent functionality ($I^2+Q^2$) on each of the input samples, and using the accumulation functionality of Unit C which will add the 33 non-coherent outputs together and output only a single real value to the first address of Buffer 6. Currently, the last 7 Isb's will be discarded which, along with setting the dynamic range of the output, also divides by the required power of 2 that makes the thresholding in the next step yield suitable performance at high SNRs (but probably not low SNRs).

The processor 120 determines if a "matched filter" spike is present. Unit C is used to determine whether the maximum found in step 3) is greater than the quantity found in step 4) (which has been divided by an appropriate power of 2). This condition will set the appropriate bit in the Status Register (which is not currently modeled in the simulation), which will be unmasked by the Status Mask Register and cause a branching that will functionally result in entering State 2.

In State 2, the processor 120 waits for one iteration, and in State 3, the processor 120 finds the long sync beginning. Now that a probable OFDM (orthogonal frequency division multiplexing) frame has been found, the sub-symbol timing is known via State 1. The next step is to find the OFDM symbol timing. Based on the known duration of the short sync sequence and the length of the sample buffers, the first 16 samples of the long sync are guaranteed to be inside of the sample buffer at this point. This state determines exactly where in the buffer the long sync symbol begins.

The mechanism for finding the long sync symbol involves using the sub-sync symbol timing to perform a series of correlations against the known short sync time domain waveform. This should result in a series of "spikes" that will be output at a 16× decimated rate relative to the input. Unit C is used to perform this operation since the timing is known and a matched filter functionality is not required.

Similarly, using the same timing, correlations are performed on the same set of data but this time correlating against the known partial long sync (first 16 samples) time domain waveform.

The set of correlations against the short sync are subtracted from the set of correlations against the partial long sync. Where this value exceeds 0 is the signature of the beginning of the long sync symbol. To compute the address actually corresponding to long sync timing involves calculating the quantity T=16*(V−1)+24=16V+9 where V is the number of correlations before the partial long sync is the winner.

Where this value occurs also indicates whether the entire long sync is present in the buffer—if the value occurs early enough, this guarantees that the entire long sync is present and State 4 is entered (unlike other state transitions, this transition happens without waiting for the next iteration for access to the next 4 microseconds worth of data.) If this value occurs late enough in the buffer, then it is known that the next iteration will yield a fully accessible first long sync symbol and so State 5 is transitioned which involves waiting for the next iteration.

Instruction mapping for the processor 120 includes setting up address generator correctly using degenerate Mode C operation and store this value for future use as well. Indirection must now be performed to access samples based on this value. Unit C is allowed to output into the Initial Address Register of the address generator governing the input of Unit C so that the next "button" push can begin at this pre-configured address. This is referred to as a "degenerate" mode because this button push does not perform any data processing, rather, it is used to set up correct operation for the data processing of the next "button push." In this case the input to Unit C is selected as the maximum index register, and the output is stored in a location in Buffer 7 designated for this purpose (currently we use address 1000) for future use. Unit C is configured such that the output of this operation is identical to the input and this output is used to initialize the address generator with the value corresponding to sub-symbol timing (in other words Unit C acts as a "wire" in this instruction).

The processor 120 correlates with known timing of the known time domain short sync symbols. Since the address generator is initialized to the correct sub-symbol timing, Unit C is now used to perform correlations with this timing of the entire waveform stored in the sample buffer against the short sync time domain waveform. The multiplication mode of Unit C is selected and the combine buffer selected is the Utility Buffer. The address generator associated with this combine buffer is initialized to point to a vector that contains the short sync time domain waveform repeated 10 times. The accumulator functionality of Unit C is set to 16 to perform successive correlations of the entire contents of the sample buffer with the short sync train stored in the Utility Buffer. The complex output of this operation comprises 10 values which are placed in the beginning of Buffer 6 after discarding the 10 lsb's after the accumulation.

The processor 120 correlates with known timing of the known time domain partial long sync symbols. Since the address generator is initialized to the correct sub-symbol timing, Unit C is now used to perform correlations with this timing of the entire waveform stored in the sample buffer against the partial long sync time domain waveform. The multiplication mode of Unit C is selected and the combine buffer selected is the Utility Buffer. The address generator associated with this combine buffer is initialized to point to a vector that contains the partial long sync time domain waveform repeated 10 times. The accumulator functionality of Unit C is set to 16 to perform successive correlations of the entire contents of the sample buffer with the partial long sync train stored in the Utility Buffer. The complex output of this operation comprises 10 values which are placed in Buffer 6 beginning at address 11 so as not to overwrite the output of step 2). The 10 lsb's are discarded upon output.

The processor 120 forms non-coherent calculation ($I^2+Q^2$) on short sync correlations. The 10 values at the beginning of Buffer 6 that correspond to a series of short sync correlations serve as input to Unit C. Unit C is configured to perform the non-coherent calculation and outputs this value to the beginning of buffer 7 after discarding the 7 lsb's.

The processor 120 forms non-coherent calculation ($I^2+Q^2$) on partial long sync correlations. The 10 values beginning at location 11 in Buffer 6 that correspond to a series of partial long sync correlations serve as input to Unit C. Unit C is configured to perform the non-coherent calculation and outputs this value to the beginning of buffer 10 after discarding the 7 lsb's.

The processor 120 finds where partial long sync correlation exceeds short sync correlation. The very beginning of Buffer 7 and 10 are selected for the subtraction mode of Unit C. The 10 values of short sync correlations are subtracted from the 10 values of partial long sync correlations. The thresholding circuit of Unit C is enabled with the actual threshold set to 0. This has the functionality of flagging at which sample the partial long sync correlation exceeds that of the short sync correlations. This index of this occurrence is placed in a register by the thresholding circuit.

The processor 120 multiplies index by 16. Unit C is used to select the index returned in step 6), multiply this by 16 using the Utility Buffer, and store in the beginning location of Buffer 7. This is the first step in the arithmetic to form the address corresponding to the long sync symbol timing. Currently, the utility buffer contains values corresponding to the input index for the lower values (i.e address 1 contains value 1, address 2 contains value 2, etc.) so the complexity of multiple addressing modes need not be implemented (only indirect arithmetic need by supported.)

The processor 120 adds 9 to the previous result. Unit C is used to select the value in Buffer 7 produced by the previous result, add 9 to the result using the utility buffer, and place in Buffer 6. The processor 120 adds this result to sub-symbol timing to compute long sync symbol timing. The short sync timing currently stored in memory location 1000 of Buffer 7 is added to the value computed in step 8) and residing at the beginning of Buffer 6. This quantity is currently stored location 1000 in Buffer 10. This corresponds to the beginning of the long sync waveform of interest.

The processor 120 decides whether entire long sync is available. If the result of 9 is greater than 96, then the entire long sync is not currently available and state 4 is entered using the branching functionality of the processor 120. If the result is less than 96, then the long sync processing may continue by entering state 5 without waiting for the next iteration.

In State 4, the processor 120 waits for the first long sync to be available. Since the entire long sync symbol is not available until the following iteration, it is necessary to subtract 4 microseconds of samples (currently a value of 80) form the long sync symbol timing computed in State 3 to be able to correctly address the first long sync symbol in State 5.

Instruction mapping for the processor 120 subtracts 80 from symbol timing. Unit C is used. The original estimate in Buffer 10 is used as input, the Utility Buffer is selected with an address of 80 (which contains the value of 80), subtraction is performed, and the result is placed into address 1000 of Buffer 7.

The processor 120 writes back to original location in Buffer 10. Unit C is used to transfer from Buffer 7 to Buffer 10. In State 5, the first long sync symbol is buffered. This step is where the first long sync symbol must be stored for future use. Since the symbol timing is known, the exact 64 samples can be grabbed. Instruction mapping for the processor 120 sets up input address generator. Degenerate mode which uses Unit C to place the contents of Buffer 10 (long sync symbol timing) in the input address generator initial value register.

The processor 120 grabs first long sync symbol and put in Buffer 6. Unit C is used to grab its input from the sample buffer for 64 clocks and directly output this to Buffer 6.

The processor 120 sets up address generator for second long sync in upcoming iteration. The beginning of the second long sync resides 64 addresses away from the beginning of the first. So, the address generator is configured for operation by subtracting 16 (80–64) so that the correct long sync access will be made in State 6. In addition the result is stored for future use in state 8.

In State 6, long sync processing is performed. Both long sync symbols are now available for processing. A cross correlation is performed between the long sync symbols. The complex phase of this quantity is due to the frequency offset of the receiver relative to the transmitter and will be used to set the characteristics of a numerically controlled rotator (NCO) functionality. This rotator is then applied to both of the long sync symbols to correct the frequency offset. At this point, the long sync symbols are summed together for a 3 dB SNR enhancement, and finally an FFT is performed which will yield the estimate of the channel as a function of the subcarrier.

Instruction mapping for the processor 120 includes forming the dot product of Buffer 6 and Input Buffer. Functionally, this step takes time domain samples of Long Code symbol number 1 (found in Buffer 6) and correlates it against the time domain samples of Long Code symbol number 2 (found in the Input Buffer). By correlation it is meant that Buffer 6 is multiplied sample by sample with the complex conjugate of the Input Buffer followed by an accumulation. The accumulation takes place after each multiplication such that the entire step takes 64 clocks. Because of the accumulation only one complex correlation value is outputted into Buffer 10c The final output is currently right-shifted by 9 bits.

The processor 120 places addresses into an inverse look-up-table. It is desired to find the inverse of the absolute real output of step 2 found in Buffer 10. An inverse LUT is used for this purpose. In this step, the proper address to that LUT is formed. To compute the final address both the offset address for the start of the LUT as well as the address within the LUT is needed. The first is obtained from Utility Buffer location 101, which contains the offset address (currently at 1001). The second comes from the absolute real value of the sample written in step 2. The input format of Unit C has to be set to perform the absolute of the real. The two are added together and the result is used to initialize the input address generator at the next step.

The processor 120 gets an inverse value from the look-up-table. Here the address to the inverse LUT is accessed (via the initialization command from step 3), and the value at that address is written to Buffer 6. The utility buffer is used as the input buffer since it contains the LUT.

The processor 120 uses the previous operation to find quotient (angle tangent). This step finds the quotient between the imaginary part of Buffer 10 (written in step 2) and the real part. It uses the inverse value in Buffer 6 as the input buffer and it uses the absolute imaginary part of Buffer 10 as the combination buffer. The combination buffer format of Unit C must be set to the absolute of the imaginary. Unit C is set to multiplication between the input and combination buffer, and the output is written to buffer 7 with a right shift of 7.

The processor 120 forms address into arctangent look-up-table. This step is almost exactly the same as step 3. Here the output of step 4 found in Buffer 7 is used as the input buffer and the arctangent LUT offset is found in the Utility Buffer location 102.

The processor 120 determines angle from the LUT and adds an adjustment to get to the right quadrant. The address to the arctangent LUT is accessed (via the initialization command from step 6), and the value at that address is utilized to write into Buffer 6. By "utilized" it is meant that the proper adjustment must be added to get to the right quadrant. Currently this process is not modeled in the UE Matlab code, so what follows is a functional description for now. The complex value of the sample written in step 2 (Buffer 10) needs to be used in picking the right adjustment. If both the real and imaginary values of that complex sample are positive, then LUT value can be used "as is". If the real is positive and the imaginary is negative then the negative of the LUT value should be outputted. If both the real and imaginary are negative then 180 degrees needs to be subtracted from the LUT value. Finally, if the real value is negative and the imaginary value is positive then the LUT value needs to be subtracted from 180. Currently buffer 10 is written to, but since buffer 10 is also needed for determining the adjustment, the buffer schemes may change.

In addition to buffer 10 being written to, the Unit C combination buffer stride is also initialized to the output buffer value. This sets up the stride in the next step.

The processor 120 performs rotator operation on first long sync symbol. Overall this step rotates the first 64 complex samples from Buffer 6 by selected contents of the rotator LUT found within the Utility Buffer. Hence, Buffer 6 is selected as the input buffer while the Utility Buffer is selected as the combination buffer. Ultimately all 64 samples from Buffer 6 must be rotated separately into Buffer 10, so this entire step is a vector operation of length 64 without accumulation.

Since the rotator table starts at address 4001 of the Utility buffer, the combination buffer offset is set to 4001. The process of rotation at each of the 64 clock operations is now described. First, the baseline combination address is initialized to the combination buffer initial value which here is zero. (Since this is the first symbol to be rotated it makes sense that the initial rotation value be set to the very beginning of the rotator table.) Second, the baseline combination address is utilized to obtain the exact address into the combination buffer. More precisely it is divided by 64, floored, and added to the Combination Buffer Offset to obtain the final combination buffer address.

The value of the combination buffer at this address is then used for the current rotation operation on the current input buffer sample. Here the complex conjugate value of the combination buffer sample is multiplied by the input buffer sample via the Unit C multiplication operation. The output is written to Buffer 10 at the first address.

At the next rotation iteration, the baseline combination address is incremented by the combination stride value initialized from step 6. It is then used utilized in the same fashion described above to obtain the next final combination buffer address. Again, multiplication between the combination buffer sample and input sample buffer occur with the input buffer address having been incremented by 1. The output is written to the next address of Buffer 10, and the process repeats for a total of 64 times.

The processor 120 sets a rotate pointer and stores for future use in state. Since Buffer 10[1003] estimates the AFC drift per input symbol sample, 64 times this value would represent the drift between the $1^{st}$ long code symbol and $2^{nd}$ long code symbol. Hence the value of 64*Buffer[1003] is desired to be used for the de-rotation of the $2^{nd}$ Long code symbol. In addition this resultant value needs to be stored in a buffer to update the rotator pointer again in state 7.

Buffer 10 is used as the input buffer and the input buffer address is currently set to 1003. The combination buffer is set to the utility buffer, the $64^{th}$ address of which is used since the contents therein are conveniently set to 64. Unit C is set to multiply the input and combination buffers, and the output is written to address location 1003 of Buffer 7. In addition the unit combine address generator in Unit C is initialized to this output for the next step of de-rotating the second long sync symbol.

The processor 120 sets up the input address generator for rotation of data symbols. The value contained in Buffer 6[1007] is used to setup the input address generator for rotation of the $2^{nd}$ long sync symbol in the next step. This value is the proper starting address for the input buffer which contains the time domain data.

The processor 120 performs rotation on second long sync symbol. This step proceeds almost exactly as step 7. Here the baseline combination buffer address is initialized from the step 8 and the input buffer address is initialized from the last step. Also, the output is written to Buffer 6.

The processor 120 sums the two long sync symbols together. The operation of summing the de-rotated long sync symbols is accomplished here. The input buffer is set to Buffer 6 (containing the $1^{st}$ long sync) while the combination buffer is set to buffer 10 (containing the $2^{nd}$ long sync). Unit C is set to addition, which takes place sequentially using addresses 1 through 64 of the two buffers. After a right shift of 1, the outputs are written sequentially from addresses 1 to 64 into Buffer 8. For this to be accomplished Unit C must have a vector operation length of 64 and its output rate must be set to 1 so that there is an output written at all 64 clocks.

The processor 120 performs a FFT stage. Each of the three FFT stages are processed by Unit B in the same manner except for the read and write buffers. In the $1^{st}$ stage buffer 8 is read while buffer 9 is written to; in the $2^{nd}$ stage buffer 9 is read and buffer 8 is written to; the $3^{rd}$ stage repeats the $1^{st}$.

There are two key factors in understanding the FFT operation: 1) Address generation for inputs, outputs, and twiddle factor generation; and 2) A radix butterfly operation. First, in address generation, each stage takes 16 clocks or iterations to complete. The address generation based upon the UNIT_INPUT counter is a function of the iteration. In addition, the twiddle factors are also a function of the iteration so they would be grabbed from different segments of the TWIDDLE FACTOR ROM. In general, there are 8 addresses generated each clock (though the input and output addresses are usually the same) based upon the UNIT_INPUT counter. Four addresses each are required for the quad-port input RAM and the quad-port output RAM (which is either buffer 8 or buffer 9).

At each iteration there are 4 samples inputted into the radix butterfly operation. The circuit performs the following operation (let x be the input to the butterfly and y be the output):

$y1 = x1 + x2 + x3 + x4$ $y2 = x1 - j*x2 - x3 + j*x4$ $y3 = x1 - x2 + x3 - x4$ $y4 = x1 + j*x2 - x3 - j*x4$

It is important to note that this operation requires no multipliers because multiplication by j involves simply interchanging real and imaginary parts of the complex quantity.

The next step is multiplication of each of the y values with the appropriate twiddle factor (note that 4 twiddle factors are grabbed from the TWIDDLE_FACTOR_ROM each clock).

output1 = $y1*w1$;

output2 = $y2*w3$;

output3 = $y3*w3$; and output4 = $y4*w4$.

The second FFT Stage is the same similar to the first FFT Stage but with different read and write buffers. The third FFT State is the same as stage 12. The processor 120 correlates the FFT output with the long code frequency domain sequence. Here the FFT output, contained in Buffer 9, is multiplied by the long code frequency domain sequence, contained in the Utility Buffer. Buffer 9 is set as the input buffer while the combination buffer is set to the Utility Buffer. Since the first 6 carriers are zero the initial input address is set to 7. Currently, address 501 of the combination buffer is used for the initial address, since this is the address offset to the non-zero long code sequence. Since the last 5 sub-carriers are also zero, the multiplication takes places over 53 successive clocks with no accumulation enabled. After each multiplication the result is written into Buffer 7 at successive address locations, starting in location 7.

In State 7, header processing is performed. In an exemplary embodiment, this state simply sets up operation. No header demodulation yet occurs. The rotator pointer is incremented by 80 strides due to header symbol being 80 samples in length. Since the pointer moves by this amount in state 8, the amount is stored for future updates.

Instruction mapping of the processor 120 includes determining the amount to move the rotator pointer from this state on. Every symbol contains 80 time domain samples. Thus, to properly account for frequency drift, the rotator pointer must be move 80 times the single-sample frequency offset estimate given by the value in Buffer 10[1003].

Buffer 10 is used as the input buffer and the input buffer address is currently set to 1003. The combination buffer is set to the utility buffer, the $80^{th}$ address of which is used since the contents therein are conveniently set to 80. Unit C is set to multiply the input and combination buffers, and the output is written to address location 1005 of Buffer 6.

The processor 120 updates the rotator pointer. The results from the last step are added from the current rotator pointer value to obtain the new rotator pointer value. Buffer 7 is set as the input buffer with an initial address of 1003, while Buffer 6 is set to the combination buffer with an initial address of 1005. Unit C is set to addition with a wrapping of 364*64 enabled. This means that the value of the sum is taken modulus 364*64. The resultant value is written into Buffer 10 at location 1004.

In State 8, data demodulation is performed. This state buffers frequency domain symbols used by the Symbol Processing unit. In addition this state buffers channel estimates also used by the Symbol Processing unit so that such effects as timing drift and frequency offset can be accounted for. It does so on a symbol by symbol basis until the entire frame is ready for demodulation. Thus, this state is executed $N_{sym}$ times where $N_{sym}$ equals the number of symbols in the payload.

To prepare a single OFDM symbol for demodulation several things are done in state 8. First, the received time domain symbols are properly accessed from the input buffers using the same beginning address as the second long code symbol (see step 3 of state 5). These symbols are then rotated in a similar fashion as the $2^{nd}$ long code using the same stride with an updated rotator pointer. (At each symbol the rotator pointer must be incremented by 80 rotation strides.) After rotation, a three stage FFT operation is performed to yield the value of the sub-carriers. These data values are stored in a separate buffer for demodulation. In addition, as described below, they are used to update the channel estimates that are also used for demodulation.

After the FFT, state 8 must now correct for residual frequency offset and timing offset. It uses the long-code frequency domain sub-carriers as a starting point to estimate these two effects. At the first symbol, the angle between its pilot sub-carriers and the long-code pilot sub-carriers is computed. The average of these angles will determine the residual frequency offset whereas the difference between the first and the fourth derive the timing drift. The frequency offset correction is relatively constant over all sub-carriers whereas the timing drift induces a linear phase across the sub-carriers. The two estimates are used to rotate the long-code sub-carriers in the proper fashion to later compensate for both effects. The former as well as the initial linear phase induced determined from the latter are used to compute a rotator address. The latter is used to compute the stride of the rotate. The rotated data is now used in two ways. First the data sub-carrier values are stored in another buffer for demodulation. Second, this rotated data replaces the long-code's sub-carriers' job at the next symbol iteration, becoming the new baseline channel estimates.

Instruction mapping of the processor 120 includes setting the stride to be used on rotation of the data symbols. The single-sample frequency drift amount is stored in Buffer 10[1003]. This is the amount the rotator needs to move per symbol sample. This value is read into the output buffer via Unit C degenerate mode. The combination buffer stride is initialized to the output buffer value. This step sets up the stride in step 5.

The processor 120 stores the rotator pointer so that it can be properly updated. The rotator pointer must be incremented every symbol by the value in Buffer 6[1005] (see step 1 of State 7). Therefore, it is necessary to store the current rotator pointer value before updating it. Buffer 10 is set to the input buffer with the address set to 1004. There is no combination buffer. Unit C is set to degenerate mode since there is no combine and the output is written to address 1003 of Buffer 7.

The processor 120 updates the rotator pointer and set its value to the combiner buffer's address for rotation. The rotator pointer is now incremented by the value in Buffer 6[1005] which contains the symbol by symbol rotation adjustment. Thus Buffer 6[1005] is added to Buffer 7[1003] and after taken modulus 360*64 written to Buffer 10[1004]. In addition this sum is used to set up the combination buffer initial value for the rotation of step 5.

The processor 120 sets up input address generator for rotation of data symbols in step 6. The value contained in Buffer 6[1007] is used to setup the input address generator for rotation of data symbols in step 6. This value is the proper starting address for the input buffer which contains the time domain data.

The processor 120 performs rotation on data symbols. This step proceeds very similar to state 6. The input buffer used in now the sample buffer whose initial address has been initialized. Here the baseline combination buffer address is initialized. The output is written to Buffer 8.

The processor 120 performs a first FFT stage. This proceeds exactly the same as described in state 6. The second FFT state is performed the same as state 6 but with different read and write buffers. The third FFT stage correlates between the current channel estimate and the pilot symbols. Functionally, this step multiplies the channel estimate pilot sub-carrier samples (Buffer 7), written at the previous symbol iteration on state 8, and the complex conjugate of the pilot sub-carriers of the current symbol. Thus, there are four multiply operations corresponding to the 4 pilot sub-carriers. Also note that there is no accumulation and that there are 4 write operations. The read addresses are initialized to 12 corresponding to the location of the first pilot sub-carrier. Both read strides are set to 14 corresponding to the sub-carrier separation of each of the pilots. The writing, however, is done sequentially into Buffer 10.

The processor 120 forms address into the inverse look-up table (LUT). This step is similar to step 2 of state 6 where it is desired to find the inverse of the absolute real output of step 9. This step is entered a total of four times (see step 12). Each time a different read address from Buffer 10 is used. The first time address 1 is used, and subsequently the read address is incremented by 1.

The processor 120 gets an inverse value from LUT. This step is similar to step 3 of state 6 where the address to the inverse LUT is accessed. This step is entered a total of four times (see step 12). Each time a different write address is used on Buffer 6. The first time address 1000 is used, and subsequently the write address is incremented by 1.

The processor 120 forms addresses into the inverse LUT and obtains the inverse value from the LUT three more times. These values are used to find quotients (i.e., angle tangents). This step is similar to state 6 where the quotient between the imaginary parts of Buffer 6 and its real parts are determined. The difference is that this step must determine 4 quotients instead of 1. Thus, the number of vector operations is 4 and a write occurs at each multiply. The outputs are written sequentially into Buffer 7 starting at location 1001.

The processor 120 forms addresses into an arctangent look-up table (LUT). This step is similar to state 6 and is entered a total of 4 times. The input buffer read address depends on how many times this step has already been entered. If zero, then it reads from location 1001 of Buffer 7. Each subsequent time the read address location is incremented by 1.

The processor 120 determines angle from the LUT and adds adjustment to get to the correct quadrant. This step is similar to state 6 and is entered a total of 4 times. The write address depends on the how many times this step has already been entered. If zero, then location 1000 of Buffer 10 is written to. Each subsequent time the write address location is incremented by 1.

The processor 120 forms addresses into an arctangent LUT, determines angles from the LUT, and adds an adjustment to get to the correct quadrant three times. Using these angles, the timing drift correction factor is determined. Functionally this step determines the difference between outputted angle the first time, and the outputted angle when step 15 was entered the fourth time. The difference is then multiplied by a constant very close to 1/42.

The input buffer is set to Buffer 10 which contains the four angles. Since only the first and fourth addresses are needed the stride is set to 3. The combination buffer is set to the Utility Buffer where locations 601 & 602 are used. Thus, the initial combination address is set to 601 with a stride of 2. The values at these LUT addresses are approximately $8*2^7*1/42$ and $-8*2^7*1/42$ respectively. The "8" exists in the LUT so that the output contains 3 fractional bits. These fractional bits improve the performance of the demodulator.

Unit C is enabled to multiplication and accumulation over a vector operation of 2. The output is right shifted by 7. This right shift eliminates the $2^7$ factor which exists in the LUT.

Using the angles determined from the arctangent LUT, the residual frequency offset correction factor is determined. Functionally this step determines the average of the four outputs. Thus, each angle element from Buffer 10 needs to be multiplied by one and then summed together.

The input buffer is set to Buffer 10 which contains the four angles. The combination buffer is set to the Utility Buffer. Conveniently, address 1 contains the value one which is used to multiply all four angles. Thus, the combination initial address is set to 1 and the stride is set to zero. Unit C is set to multiply and accumulate over 4 operations. The output is written into address 1007 of Buffer 7.

The processor 120 multiplies the timing correction factor by 26. The timing correction factor is not applied uniformly to each sub-carrier. Instead, the timing correction factor ultimately needs to be multiplied by the sub-carrier number to obtain the timing correction for that particular sub-carrier. For instance, at sub-carrier −26 the timing correction needs to be multiplied by −26. Hence, the rotation stride set in step 21 will be the timing correction factor.

The initial rotator pointer is determined to determine the effect of timing drift on the initial rotator. Since the first data symbol occurs at sub-carrier −26, the timing correction factor is multiplied by the said number.

Since the Utility Buffer contains the value 26 at the same address number, this is used as the combination buffer. Unit C is set to multiply and the output is written into address 1000 of Buffer 6. Although a negative is needed to create the proper offset, this is not done until step 19 where subtraction is used instead of addition.

The processor 120 subtracts the output of the multiplication of the timing correction factor from the frequency offset correction factor to determine the rotator pointer address. The second aspect of setting the initial rotator pointer is the frequency offset. Since the frequency offset is constant over all sub-carriers, it is simply added to the negative of the output of the multiplication of the timing correction factor. The result is then divided by eight. This divide by eight is not simply a right shift by 3, for the LSBs are NOT discarded. This particular functionality has not yet been exactly modeled within the UE as seen by additional MATLAB code below the UE instructions.

The processor 120 sets the stride for the rotation to be performed. The combination buffer stride is now set to the value in address 1000 of buffer 7 divided by 8. This divide by eight is not simply a right shift by 3, for the LSBs are not discarded.

The processor 120 rotates the data to eliminate timing drift and residual frequency offset. This step proceeds similarly to state 6. Here, however, there is no divide by 64. In addition, since only 53 sub-carriers are of interest a vector operation of 53 is used instead of 64. This also means that the starting input read and output write addresses are seven since the first 6 sub-carriers have no content. Here the baseline combination buffer address is initialized from step 20, and the stride for the rotation is initialized from the previous step. There is also some branching involved in the output buffer of this step. The output buffer is Buffer 10 on even iterations and Buffer 7 on odd iterations.

Figure 35:
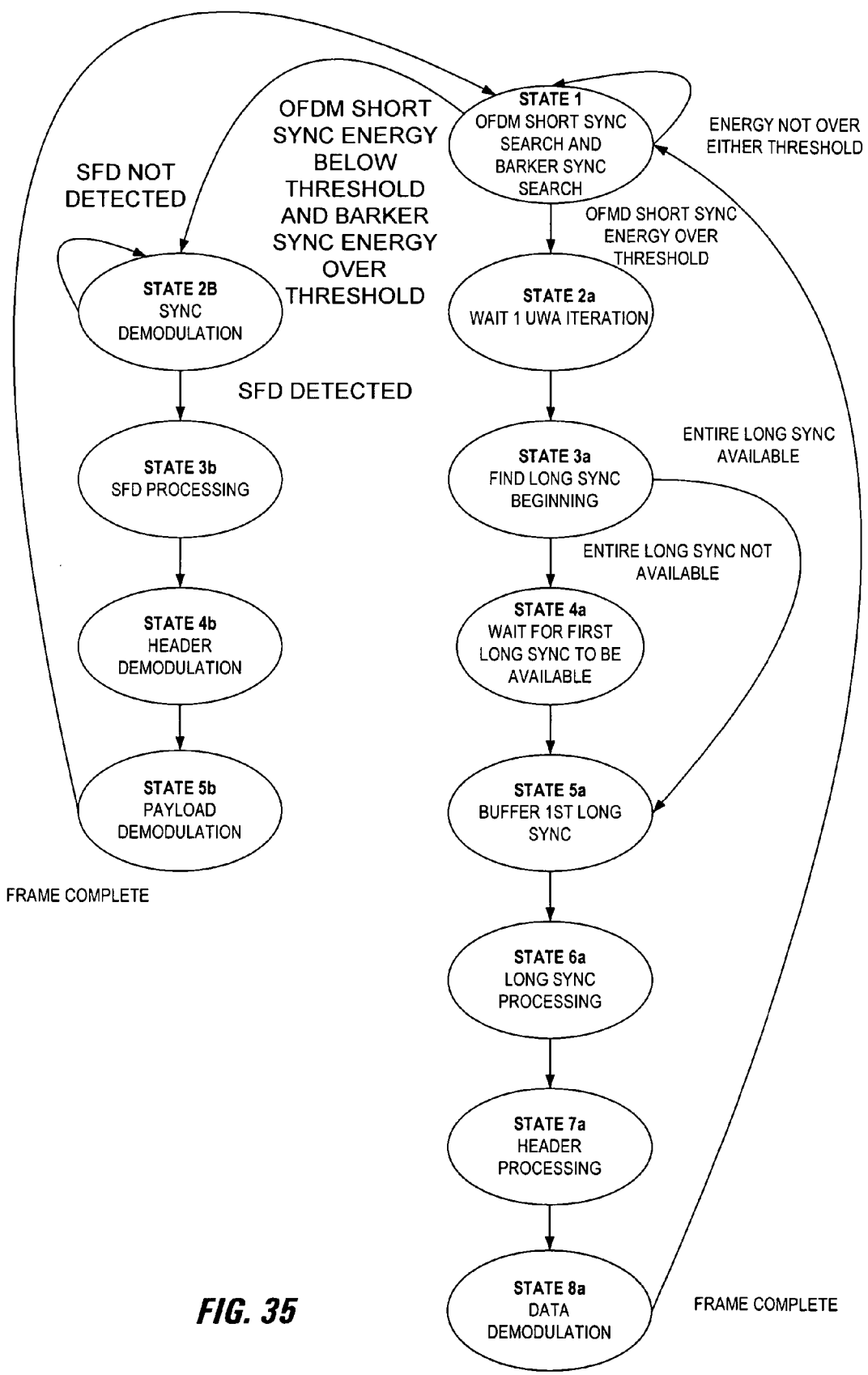
FIG. 35 is a state machine diagram for an 802.11 a/b/g multi-mode program in accordance with an exemplary embodiment.

FIG. 35 illustrates an exemplary state diagram for an 802.11a/b/g multi-mode program. In a State 1, a short sync match filtering is performed over 16 possible times for OFDM acquisition. In addition, a Barker Sync acquisition can be performed to enable multi-mode acquisition.

The instructions of state 1 culminate in the maximum short sync match filter energy being compared to a threshold. If the short sync threshold is exceeded, then OFDM demodulation takes place exactly as described in states 2-8 of FIG. 34. In FIG. 35, these states have been renamed to states 2a-8a to denote 802.11a-only states.

If the short sync threshold is not exceeded, then instructions are executed to perform Barker Sync acquisition. Here, and in any subsequent 802.11b states, channel filtering and interpolation is performed via Unit A. Interpolation uses a polyphase filter where the exact taps loaded in depends on C×8 timing determined by the time tracking instructions. Since the timing is unknown, the tap values corresponding to no time drift are loaded in. The output of the channel filtering and interpolation yields C×2 samples. As in OFDM, Unit A is used to perform the match filtering which is performed on the samples. Because the Barker length is 11 chips, Unit A needs three separate sets of instructions to build up the 22 hypotheses.

The rest of the Barker sync acquisition process is similar to the OFDM acquisition instructions. The phase of the 22 match filter outputs is eliminated via Unit C non-coherent operation and the maximum among these values is computed. This maximum value is compared against a threshold to determine if a Barker sync sequence has been sent. Upon exceeding the threshold, this state is exited and an address pointer is set (via a Unit C instruction) so that on-time Barker correlation (vis-à-vis match filtering) can subsequently take place.

In a State 2b, a Barker correlation against 11 chips takes places via a Unit C multiply and accumulate command using the Utility Buffer as source for the Barker sequence. The output of this instruction feeds into a non-coherent DBPSK (differential binary phase shift keying) set of instructions. The most recent set of outputs is multiplied by the complex conjugate of a delayed by one set of recent outputs to obtain the change of phase between bits. This can be accomplished via a Unit C multiply vector operation. The sign of the real part of these outputs can be used to determine the scrambled sync bit sent. This bit is sent to the RX Symbol Processor for descrambling and SFD detect. The sign is also used for modulation wiping which is used later for coarse frequency offset correction. If the sign is negative, then the complex output is multiplied by −1 and written sequentially into a buffer; otherwise it is written as is. This operation can be accomplished via individual branching instructions or via an additional Unit C format operation which would be based on the current abs (real(−)) circuitry. Ultimately, the contents of this buffer must be averaged.

State 2b is exited upon an SFD (start frame delimiter) detect indication from the RX Symbol Processor. In a State 3b, SFD processing is performed. In addition to providing an SFD detect indication, the RX Symbol Processor also provides the exact timing of the SFD detect. Such timing information is used by the processor to know when header as well as payload processing starts and finishes. A simple counter, implemented by simple Unit C copy, add, and compare instructions suffice to properly handle this timing information.

State 3b completes the process of coarse frequency estimation wherein it initially determines the final mean of the wiped data. The angle of the result is then determined. This angle is used as the stride of a rotator to perform coarse frequency correction on the Barker correlator output.

The last few (e.g. 5) decorrelated, derotated SFD symbols are used to determine the absolute phase used subsequently for phase tracking applied in coherent DBPSK demodulation. The symbols can be unwiped using the timing of the SFD detect, a lookup table (containing the relative phase reference of each of the symbols to the first) and a vector multiply instruction. The mean of these symbols is taken and the subsequent angle computed, all through previously described Unit C instructions. This mean angle is used as the initial phase reference for header and payload coherent demodulation.

In a State 4b, a header demodulation is performed. Barker despread data is once again derotated. The rotation instruction uses the same stride as before in State 3b. In addition, an offset is also needed. This is set to the negative of the initial phase from State 3*b* added to the final offset from the previous rotator operation.

The sign of the real part of the outputs of the rotator are then used to determine the scrambled header sequence sent. This sequence is sent to the RX Symbol Processor for descrambling. In addition, this sequence is used for modulation wiping so that the absolute phase estimate can be updated. The mean of the wiped sequence is taken and the angle computed. Instead of a mean, a 1-pole IIR filter can also be employed via simple copy and add instructions. This angle is added to the existing angle, and mapped to −180°-180° (via a look up table) to yield the updated estimated phase.

It should be noted that the phase is not continually being updated. The phase need only be updated every 5-10 symbols because residual frequency offset is small. This allows the processor to decrease the clock budget (e.g., derotation can be applied on a vector of despread data and the phase angle need only be computed every few symbols) and decrease power consumption.

The absolute phase is also used for the locked method of time tracking. Every time the phase wraps from 180° to −180° a wrap counter is incremented, and conversely, a wrap in the opposite direction will make the wrap counter decrement. This can be accomplished via Unit C branching, copy, add and subtract instructions. Once the wrap counter reaches a certain value, accomplished through more branch instructions, the address pointer feeding into the interpolation tap values is either incremented or decremented. As in phase adjustment, this set of instructions need not take place after each decorrelated, wiped output. Because timing drift is slow it can take place every N symbols so that clock budget and hence power is reduced.

In State 5*b*, a payload demodulation is performed. The RX MAC sends the processor an indication as to the type of demodulation needed at this point as well as the length of packet. If the modulation type is DBPSK, then this state is almost identical to State 4*a* with the difference being the number of symbols demodulated. If the modulation type is DQBPSK, then modulation wiping must be enhanced. Not only must the sign of real part of the decorrrelated output be used but also whether the sign of the real equals the sign of imaginary. If the signs are equal, the same logic as DBPSK wiping can be used. If the signs are different, the real and imaginary values must be swapped.

If the modulation type is CCK, then a Unit D must be used. Preferably, Unit D has specific circuitry used to accomplish a Fast Walsh Transform and max picker. Unit D inputs 8 chips at a time and outputs both the index of the max picker as well as the complex value corresponding to the index. The former can be used to derive the demodulated CCK bits via a combination of Unit C instructions and RX Symbol Processor logic. Upon processing the last symbol, the processor returns to State 1.

Figure 36:
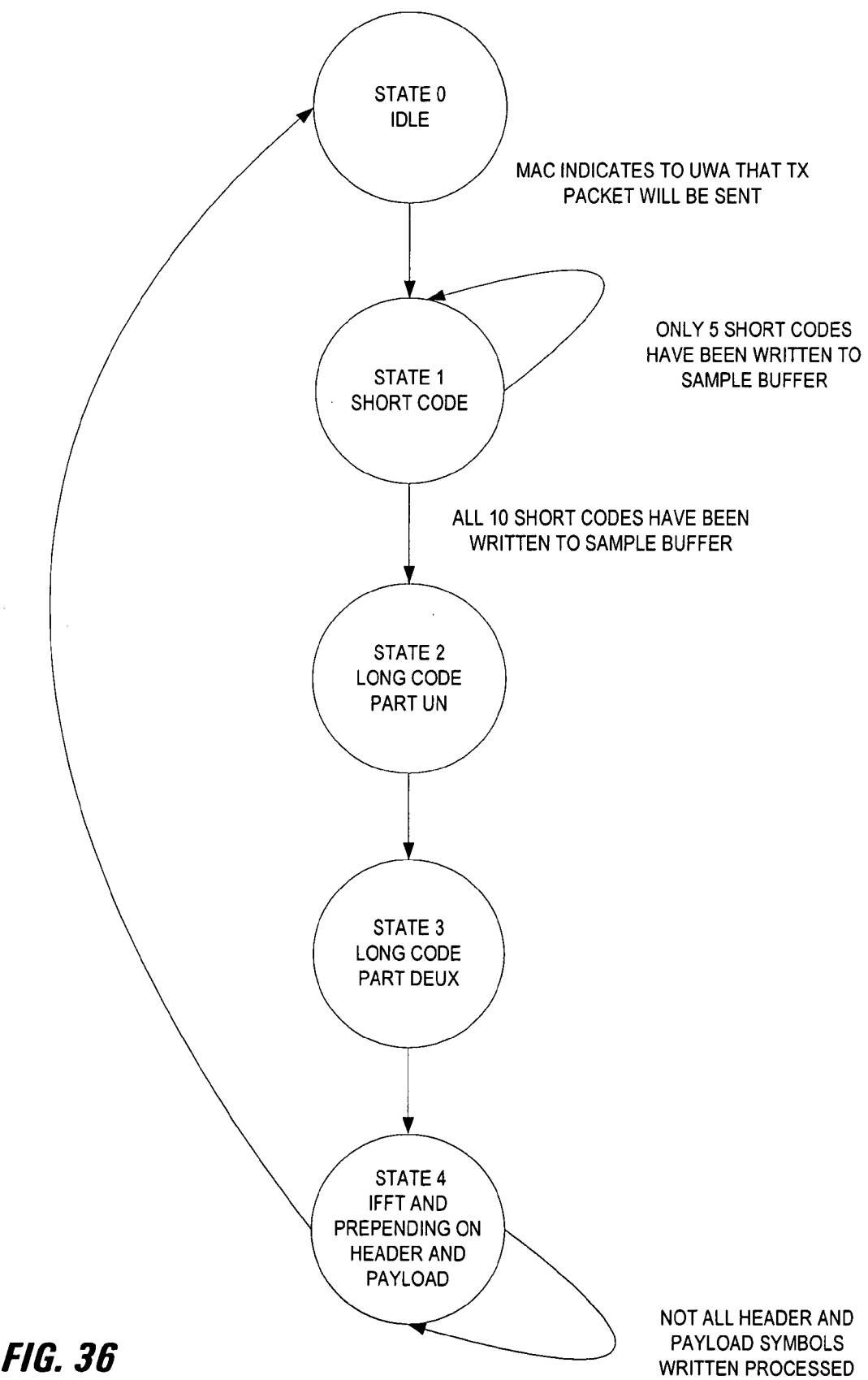
FIG. 36 is a state diagram for OFDM only transmit processing in accordance with an exemplary embodiment.

FIG. 36 illustrates an exemplary state diagram for OFDM only TX processing. In a State 0, the processor does no TX processing in this state. It waits for an indication from the MAC before exiting this state. In a State 1, the processor writes the short code five times to the sample buffer. Since the short code sequence is stored in the Utility buffer, this instruction is accomplished via a Unit C copy command with address wrapping enabled in the Utility buffer. This state is entered a total of two times so that all 10 short codes are written.

In a State 2, a 64 sample sequence of the Long Code is also stored in the Utility Buffer. The 32 Long Code guard interval samples as well as the first 48 samples of the first long code are written into the sample buffer using a Unit C copy command coupled with address wrapping. In a State 3, the last 16 samples of the first long code as well as all 64 samples of the $2^{nd}$ long code (which is equivalent to the first long code) are written into the sample buffer using a Unit C copy command coupled with address wrapping into the Utility Buffer.

In a State 4, the processor writes the pilot sub-carrier samples in the pilot subcarrier addresses by reading from the Utility Buffer wherein the scrambling LUT is located. Two different sets of operations are required, one for writing the pilot subcarriers at addresses 43 and 57 and the other for writing at addresses 7 and 21. Subsequently, the scrambling address pointer is incremented.

Next, the data subcarrier samples are written into the same buffer as the pilot subcarrier values according to proper shift address mapping. These data samples are modulated (e.g., 16-QAM) data written into the sample buffer by the TX Symbol Processor. Before an IFFT (inverse Fast Fourier Transform) can be performed on the data and pilot subcarriers, the outlying subcarrier addresses as well as the DC sub-carrier address are filled in with zeros. Both the data and zero filling are accomplished via a series of vectorized Unit C copy instructions.

The parsed data serves as the input to the 3-stage IFFT which is accomplished via Unit B instructions. The output of the IFFT output is written to the sample buffer including its prepended guard interval using address wrapping.

While the above exemplary embodiments have been described with regard to 802.11, other communication protocols and techniques can be utilized. Further, system parameters and design criteria can effect the particulars of the design without departing from the scope of the invention. The invention is not limited to a particular embodiment, but extends to various modifications, combinations, and permutations that nevertheless fall within the scope and spirit of the appended claims.

What is claimed is:

1. A method of multi-mode communications, the method comprising:
   receiving signals from multiple sources at a plurality of sample buffers;
   referencing the plurality of sample buffers for a first source at one time and referencing the plurality of sample buffers for a second source at another time; and
   communicating data from the referenced plurality of sample buffers to a processing unit, wherein the processing unit concurrently receives inputs from buffers in the plurality of sample buffers and outputs to other buffers in the plurality of sample buffers.

2. The method of claim 1, wherein samples from the first source are demodulated and samples from the second source are not demodulated.

3. The method of claim 1, wherein samples from the first source are demodulated and samples from the second source are partially processed.

4. The method of claim 1, wherein the multiple sources comprise communication sources operating using different communication protocols.

5. The method of claim 1, wherein the different communication protocols comprise any one of CDMA technologies, OFDM technologies, 802.11a, 802.11b, and 802.11g.

6. The method of claim 1, wherein the multiple sources comprise multiple communication receivers.

7. A method of multi-mode digital communications, the method comprising:
   asynchronously processing received communication samples at a processing unit, wherein the communication samples processed by the processing unit correspond to more than one communication protocol specification;

controlling the processing unit by programmed instructions; and updating the programmed instructions based on processing factors.

8. The method of claim 7, wherein the processing factors comprise any one of processing results, user preferences and system information.

9. The method of claim 7, wherein updating the programmed instructions comprise instructions to implement a new communication protocol specification.

10. A method of multi-mode digital communications, the method comprising:

asynchronously processing received communication samples at a processing unit, wherein the communication samples processed by the processing unit correspond to more than one communication protocol specification;

controlling the processing unit by programmed instructions; and selectively directing the communication samples from separate buffers to one processing unit of a plurality of processing units.

11. A system for multi-mode communications, the system comprising:

means for receiving signals from multiple sources at a plurality of sample buffers;

means for referencing the plurality of sample buffers for a first source at one time and referencing the plurality of sample buffers for a second source at another time; and means for communicating data from the referenced plurality of sample buffers to a processing unit, wherein the processing unit concurrently receives inputs from buffers in the plurality of sample buffers and outputs to other buffers in the plurality of sample buffers.

12. The system of claim 11, wherein samples from the first source are demodulated and samples from the second source are not demodulated.

13. The system of claim 11, wherein samples from the first source are demodulated and samples from the second source are partially processed.

14. The system of claim 11, wherein the multiple sources comprise communication sources operating using different communication protocols.

15. The system of claim 11, wherein the different communication protocols comprise any one of CDMA, 802.11a, 802.11b, and 802.11g.

16. The system of claim 11 further comprising means for selectively directing data from separate buffers to one processing unit of a plurality of processing units.

17. The system of claim 11, further comprising means for selectively directing data from separate buffers to one processing unit of a plurality of processing units, wherein the one processing unit is configured to perform vector processing operations.

18. The system of claim 17, further comprising means for accumulating results of successive outputs.

19. The system of claim 17, wherein the vector processing operations comprise a single instruction that drives calculation of a vector.

* * * * *